(12) United States Patent  (10) Patent No.: US 7,392,135 B2
Varsamis et al.  (45) Date of Patent: Jun. 24, 2008

(54) ADAPTIVE EQUALIZATION OF DOWNHOLE ACOUSTIC RECEIVERS

(75) Inventors: Georgios L. Varsamis, Houston, TX (US); Joakim Oscar Blanch, Houston, TX (US); Arthur C. H. Cheng, Sugar Land, TX (US); Calvin Wisner Kessler, Houston, TX (US); Denis Schmitt, Katy, TX (US); Batakrishna Mandal, Missouri City, TX (US)

(73) Assignee: Halliburton Energy Services Inc., Houston, TX (US)

( * ) Notice: Subject to any disclaimer, the term of this patent is extended or adjusted under 35 U.S.C. 154(b) by 0 days.

(21) Appl. No.: 11/323,674

(22) Filed: Dec. 30, 2005

(65) Prior Publication Data

US 2007/0156359 A1    Jul. 5, 2007

(51) Int. Cl.
 *G01R 29/00* (2006.01)
(52) U.S. Cl. .......................................................... 702/1
(58) Field of Classification Search ..................... 702/6; 73/152; 166/250; 175/40
 See application file for complete search history.

(56) References Cited

U.S. PATENT DOCUMENTS

| | | | |
|---|---|---|---|
| 4,870,627 A * | 9/1989 | Hsu et al. ..................... 367/69 |
| 6,366,531 B1 | 4/2002 | Varsamis et al. ............... 367/26 |
| 6,453,240 B1 | 9/2002 | Blanch et al. .................. 702/11 |
| 6,552,962 B1 | 4/2003 | Varsamis et al. ............... 367/25 |
| 6,564,899 B1 | 5/2003 | Arian et al. .................. 181/102 |
| 6,661,737 B2 | 12/2003 | Wisniewski et al. ........... 367/25 |
| 6,691,036 B2 | 2/2004 | Blanch et al. .................. 702/11 |
| 6,766,252 B2 | 7/2004 | Blanch et al. ................... 702/6 |
| 6,791,899 B2 | 9/2004 | Blanch et al. .................. 367/38 |
| 2003/0114989 A1 | 6/2003 | Blanch et al. .................. 702/14 |

OTHER PUBLICATIONS

Oilfield Review, spring 1998, p. 40-55.*
Verónica L. Martinez, et al., "Deconvolution in the Presence of Stratigraphic Filtering," University of Alberta, Edmonton, Canada, 2003.
Joakim Blanch, et al., "A Method for Fast and Slow Shear," Presentation in Salt Lake City, 2002.

* cited by examiner

*Primary Examiner*—Tung S Lau
(74) *Attorney, Agent, or Firm*—Paul R. Morico; Baker Botts L.L.P.

(57) ABSTRACT

Methods and apparatus are provided for reducing and/or substantially eliminating sensitivity mismatch of acoustic receivers used with acoustic sources to determine acoustic properties of geologic formations as a logging tool traverses the formations. Methods are directed to detecting waveform arrival times at receivers, determining places in a well where arrival times of waves are substantially the same at a plurality of receivers, and estimating effective receiver sensitivities and equalization factors using Stoneley wave amplitudes and windowed deconvolution of Stoneley waves. Methods are further directed to correcting wave amplitudes using estimated effective receiver sensitivities and equalization factors for receivers.

21 Claims, 20 Drawing Sheets

Figure 1:
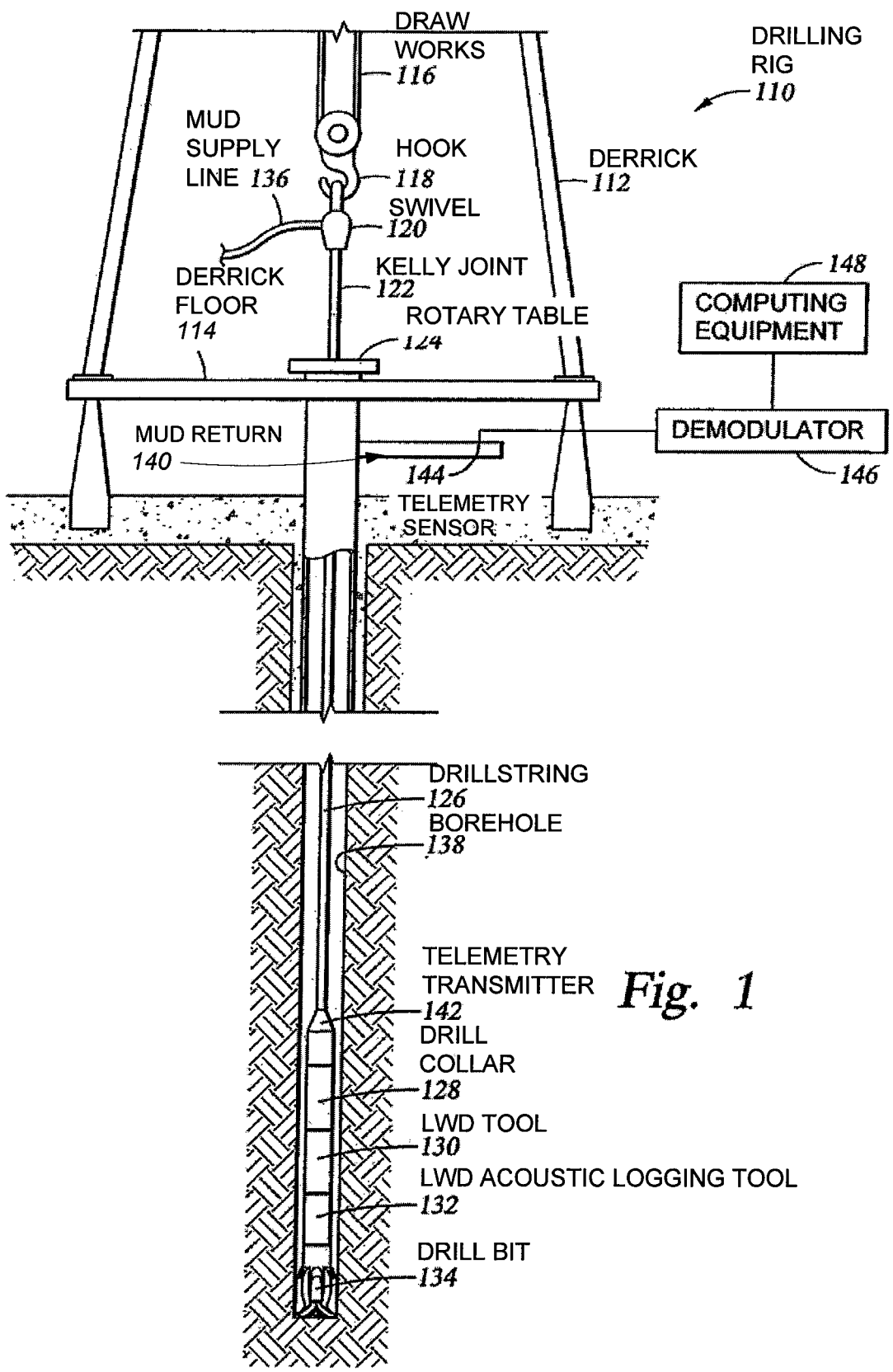

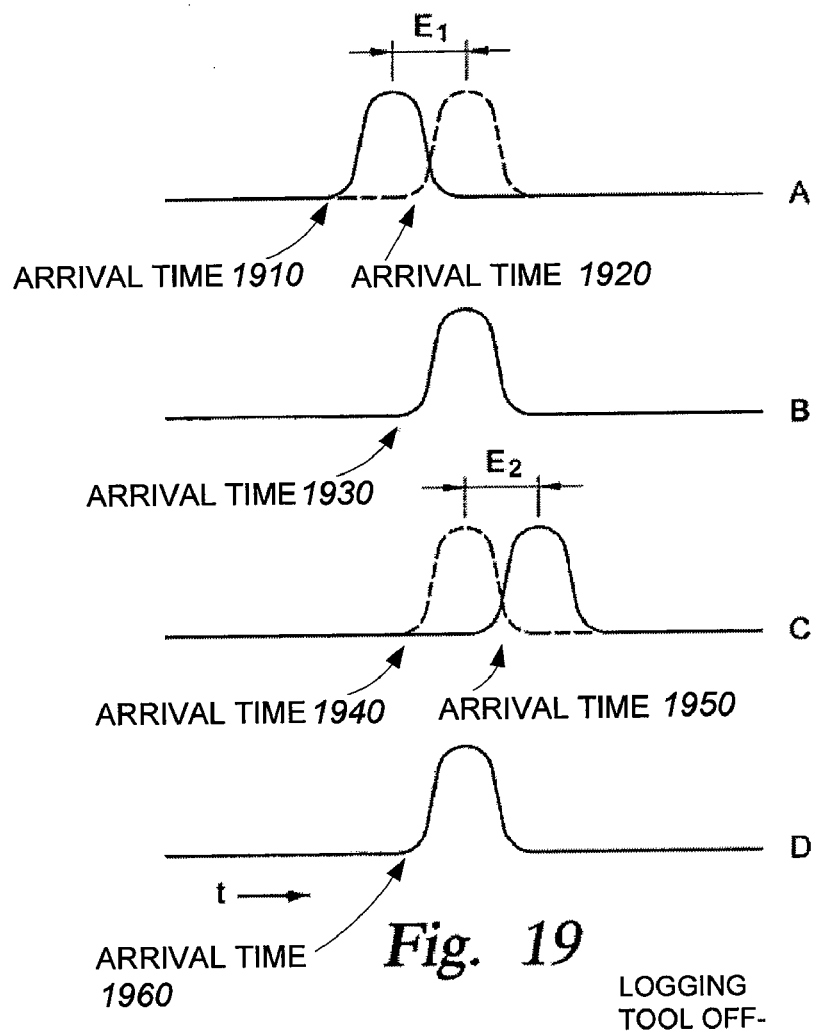
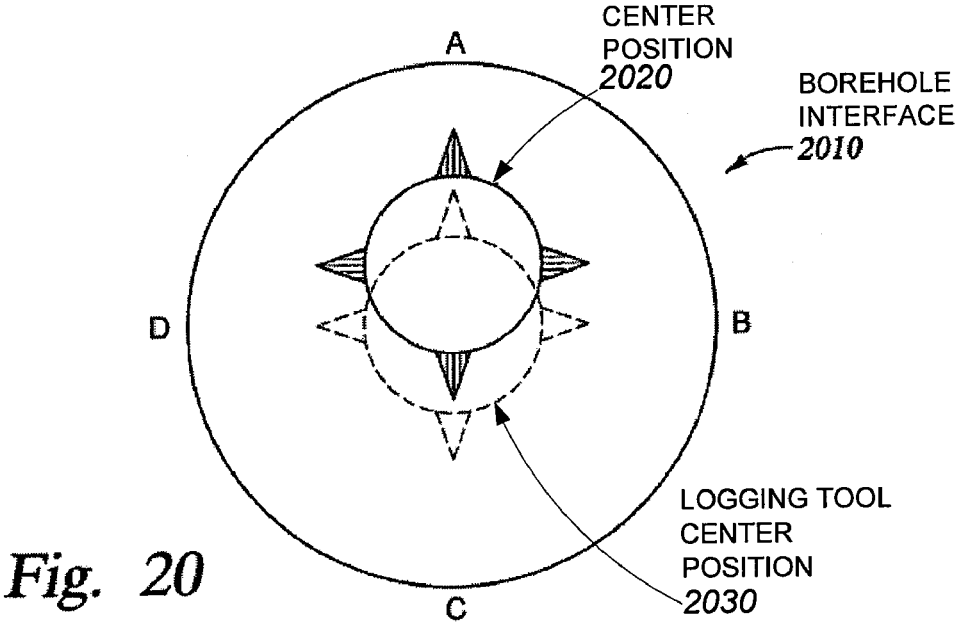

ADAPTIVE EQUALIZATION OF DOWNHOLE ACOUSTIC RECEIVERS

BACKGROUND OF THE INVENTION

The present invention relates generally to a method and apparatus utilized in hydrocarbon exploration. More specifically, the present invention relates to the utilization of acoustic sources and receivers to determine acoustic properties of geologic formations as a logging tool traverses them, be it a wireline logging tool and/or a logging-while-drilling (LWD) tool. More particularly, the present invention is directed to methods of, and apparatus for, adaptive equalization of receivers to reduce and/or substantially eliminate sensitivity mismatch.

Geologists and geophysicists are interested in the characteristics of the formations encountered by a drill bit as the drill bit is drilling a well for the production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed and/or a core can be bored along the entire length of the borehole. Alternatively, the drill bit can be withdrawn from the borehole and a "wireline logging tool" can be lowered into the borehole to take measurements. In still another approach, called "measurement-while-drilling" (MWD) and/or "logging-while-drilling" (LWD), tools make measurements in the borehole while the drill bit is working. There are a wide variety of logging tools, including resistivity tools, density tools, sonic and/or acoustic tools, and imaging tools, and the like.

An acoustic logging tool collects acoustic data regarding underground formations. One of the purposes of such a tool is to measure the "interval transit time" or the amount of time required for acoustic energy to travel a unit distance in a formation. In simple terms, this is accomplished by transmitting acoustic energy into the formation at one location and measuring the time that it takes for the acoustic energy to travel to a second location and/or past several locations. The measurement is complicated by the fact that the tool is roughly in the middle of a borehole of unknown diameter and is surrounded by mud. Furthermore, the formation along the borehole may have been disturbed by the action of the drill bit and may no longer have the same acoustic characteristics as the undisturbed formation.

Acoustic well logging is a well-developed art, and details of acoustic logging tools and techniques are set forth in A. Kurkjian, et al., "Slowness Estimation from Sonic Logging Waveforms," Geoexploration, Vol. 277, pp. 215-256 (1991); C. F. Morris et al., "A New Sonic Array Tool for Full Waveform Logging," SPE-13285, Society of Petroleum Engineers (1984); A. R. Harrison et al., "Acquisition and Analysis of Sonic Waveforms From a Borehole Monopole and Dipole Source," SPE 20557, pp. 267-282 (September 1990); and C. V. Kimball and T. L. Marzetta, "Semblance Processing of Borehole Acoustic Array Data," Geophysics, Vol. 49, pp. 274-281 (March 1984), all of which are hereby incorporated by reference herein.

An acoustic logging tool typically includes an acoustic source (transmitter), and a set of receivers that are spaced several inches or feet apart. An acoustic signal is transmitted by the acoustic source and received at the receivers of the borehole tool that are spaced apart from the acoustic source. Measurements are repeated every few inches as the tool passes along the borehole.

The acoustic signal from the acoustic source travels through the formation adjacent the borehole to the receiver array, and the arrival times, and perhaps other characteristics of the receiver responses, are recorded. Typically, compressional wave (P-wave), shear wave (S-wave), and Stoneley wave arrivals and waveforms are detected by the receivers and are processed. The processing of the data is often performed on the surface, although it may also be performed real-time in the tool itself. Regardless, the information that is recorded is typically used to find formation characteristics such as formation slowness (the inverse of acoustic speed) and anisotropy, from which pore pressure, porosity, and other formation property determinations can be made. With some tools, the acoustic signals may even be used to image the formation.

Acoustic logging tools are used for both wireline logging and logging-while-drilling (LWD) applications. In wireline logging, a probe, or "sonde," housing multiple logging tools is lowered into the borehole after some or all of the well has been drilled. The sonde is attached to a conductive wireline that carries power from the surface to the tools in the sonde, and that carries telemetry information to the surface. The sonde may be transported through the borehole by the wireline, or a separate transport means may be provided. For example, in "pipe-conveyed" logging, the sonde is mounted on a tubing string. The rigidity of the tubing string allows the sonde to be transported through highly deviated and horizontal boreholes.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there is a strong incentive to minimize the number of wireline logging trips. One way to do this involves collection of data during the drilling process. Designs for measuring conditions downhole including the movement and location of the drilling assembly contemporaneously with the drilling of the well have come to be known as "measurement-while-drilling" techniques, or MWD. Similar techniques, concentrating more on the measurement of formation parameters, commonly have been referred to as "logging-while-drilling" techniques, or LWD. While distinctions between MWD and LWD may exist, the terms MWD and LWD often are used interchangeably. For the purposes of this disclosure, the term logging-while-drilling (LWD) will be used with the understanding that this term encompasses both the collection of formation parameters and the collection of information relating to the movement and position of the drilling assembly.

Logging-while-drilling (LWD) tools are generally located as close to the drill bit as possible, so as to minimize the delay between reaching a formation and measuring the properties of the formation. When implemented as logging-while-drilling (LWD) tools, acoustic logging tools must overcome a number of obstacles to perform successfully. These obstacles include drilling noise, and acoustic properties of the thick tool body. Accordingly, acoustic logging tools in both wireline and logging-while-drilling (LWD) applications have challenges to overcome.

Furthermore, another well-known problem in acoustic well logging, especially for the acquisition of higher order modes, is that receiver matching is important in producing correct results. However, proper and complete receiver matching is very hard to achieve in downhole conditions.

SUMMARY

The present invention relates generally to a method and apparatus utilized in hydrocarbon exploration. More specifically, the present invention relates to the utilization of acoustic sources and receivers to determine acoustic properties of geologic formations as a logging tool traverses them, be it a wireline logging tool and/or a logging while drilling (LWD) tool. More particularly, the present invention is directed to methods of, and apparatus for, adaptive equalization of receivers to reduce and/or substantially eliminate sensitivity mismatch.

In various aspects, a method is provided, the method comprising detecting arrival times of a first wave at each of a plurality of receivers, determining a first place in a well when the arrival times of the first wave are substantially the same at each of the plurality of receivers, and estimating effective receiver sensitivities and equalization factors for each of the plurality of receivers using a Stoneley wave amplitude received by the plurality of receivers at the first place in the well. The method also comprises correcting amplitudes of a second wave received by the plurality of receivers using the estimated effective receiver sensitivities and equalization factors for each of the plurality of receivers.

In various other aspects, a method is provided, the method comprising detecting arrival times of a first wave comprising at least one of a compressional, a refracted shear, and a Stoneley wave at each of a plurality of receivers and determining a first place in a well when the arrival times of the waves are substantially the same at each of the plurality of receivers. The method also comprises estimating effective receiver sensitivities and equalization factors for each of the plurality of receivers using a Stoneley wave amplitude received by the plurality of receivers at the first place in the well and correcting amplitudes of a second wave received by the plurality of receivers using the estimated effective receiver sensitivities and equalization factors for each of the plurality of receivers.

In yet various other aspects, a method is provided, the method comprising detecting arrival times of a first wave comprising at least one of a compressional, a refracted shear, and a Stoneley wave at each of a plurality of receivers and determining a first place in a well when the arrival times of the waves are substantially the same at each of the plurality of receivers. The method also comprises estimating effective receiver sensitivities and equalization factors for each of the plurality of receivers using windowed deconvolution of a Stoneley wave received by the plurality of receivers at the first place in the well and correcting amplitudes of a second wave received by the plurality of receivers using the estimated effective receiver sensitivities and equalization factors for each of the plurality of receivers.

The features and advantages of the present invention will be readily apparent to those skilled in the art upon a reading of the description of the embodiments that follows.

DRAWINGS

The following figures form part of the present specification and are included to further demonstrate certain aspects of the present invention. The present invention may be better understood by reference to one or more of these drawings in combination with the description of embodiments presented herein.

Figure 2:
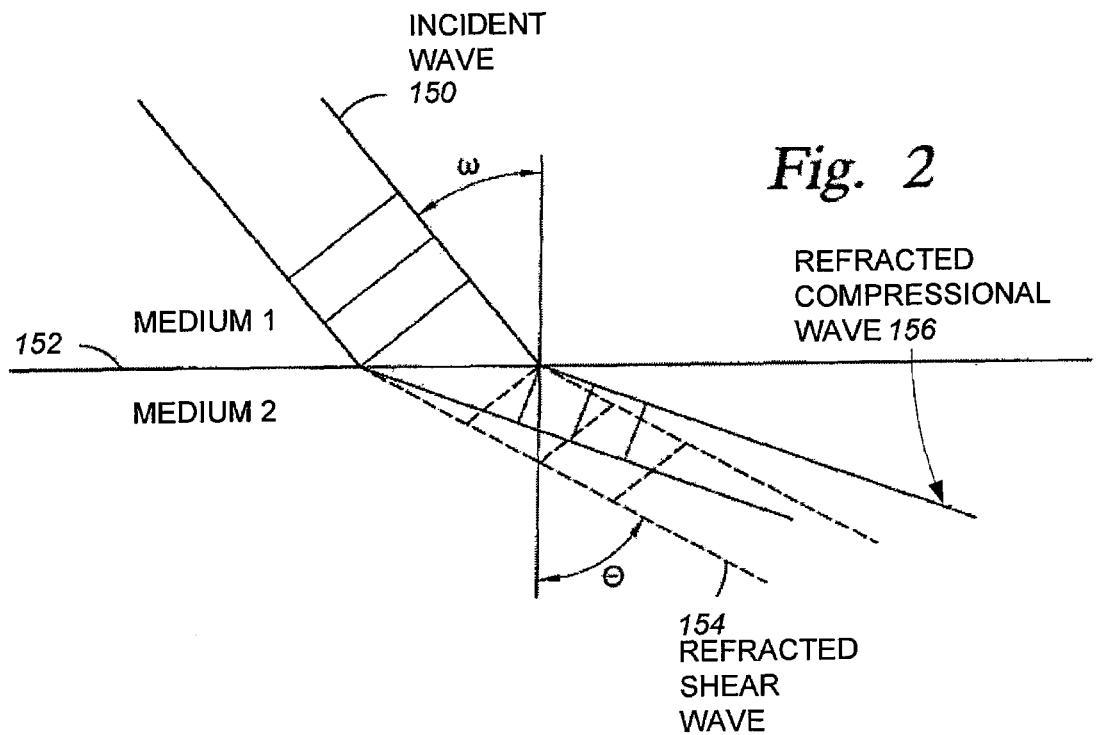
Figure 3:
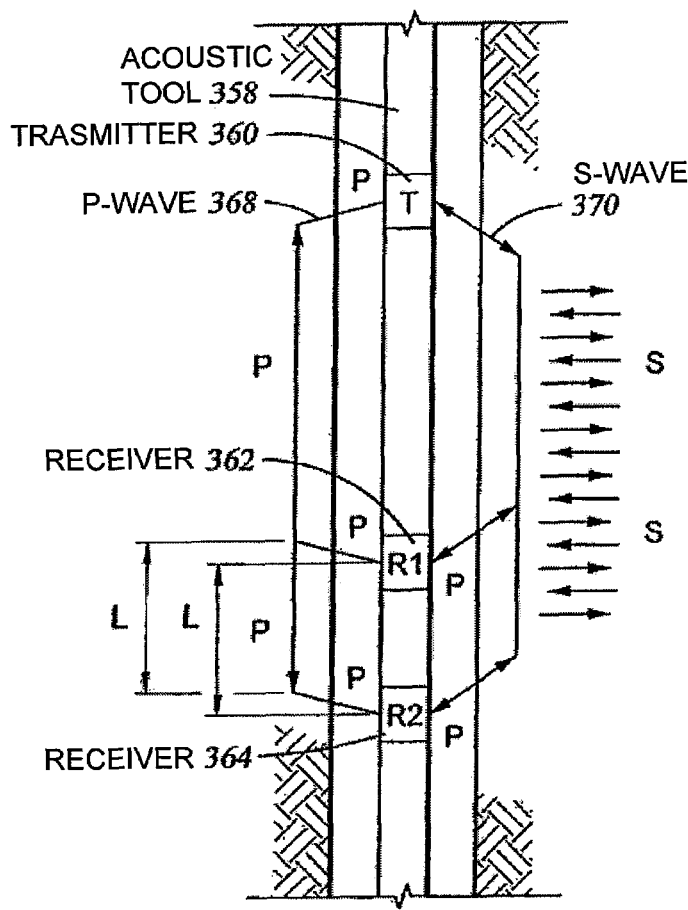
Figure 4:
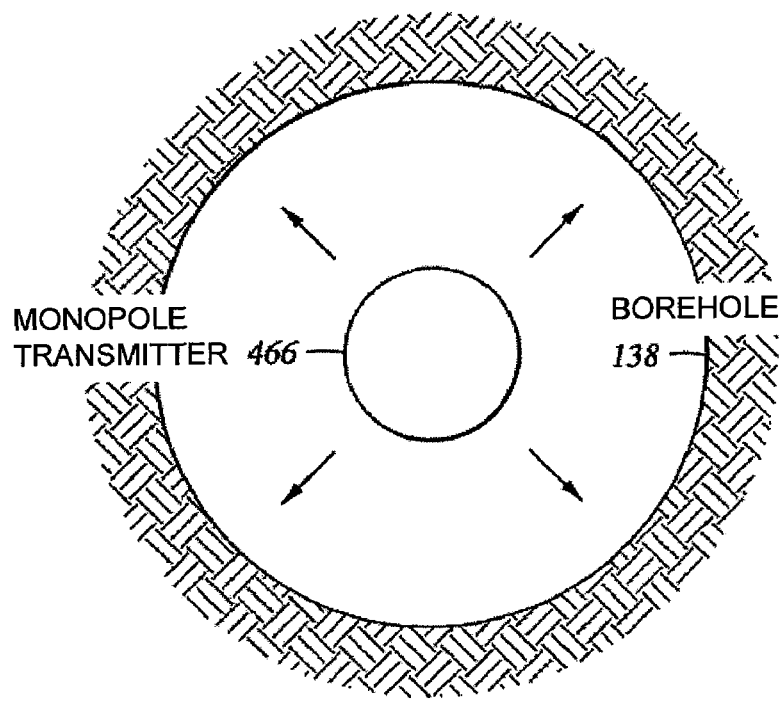
Figure 5:
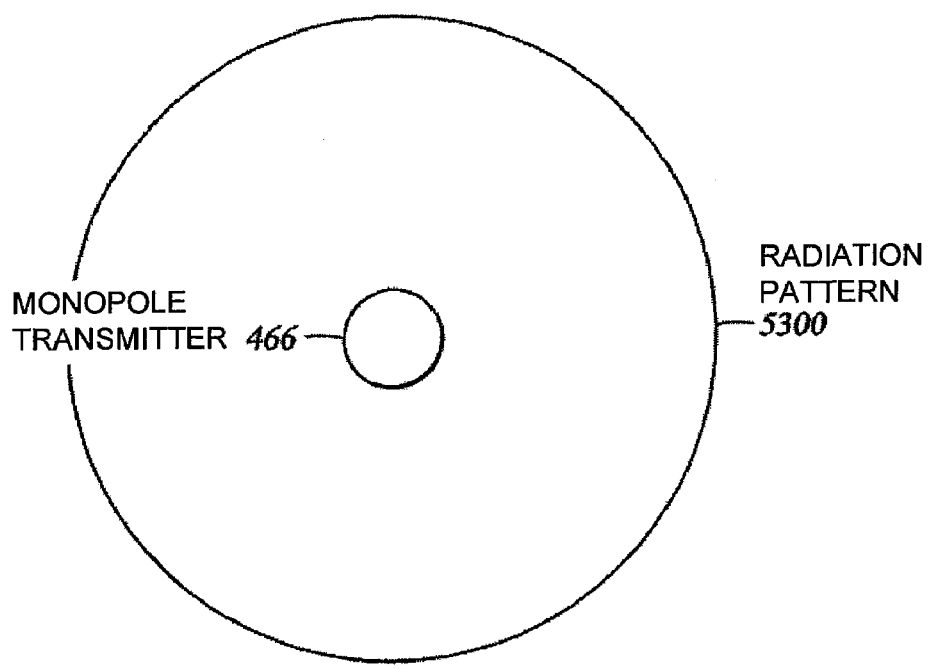
Figure 6:
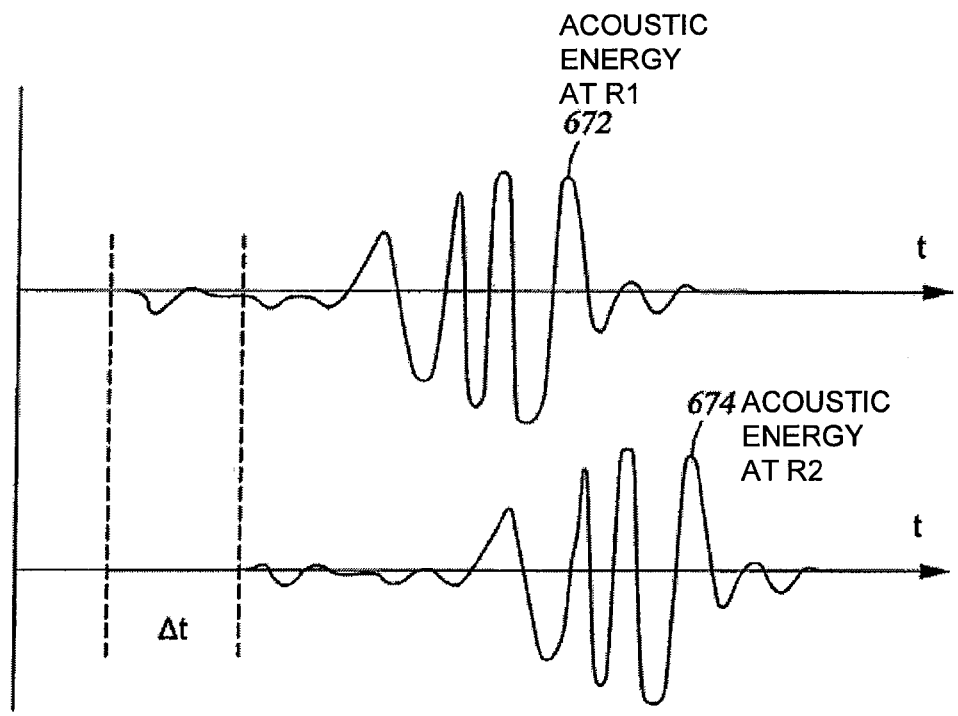
Figure 7:
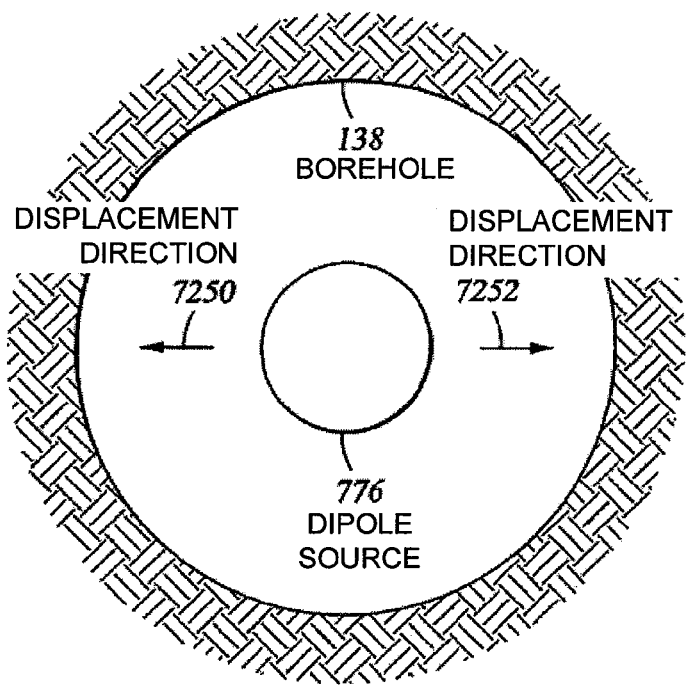
Figure 8A:
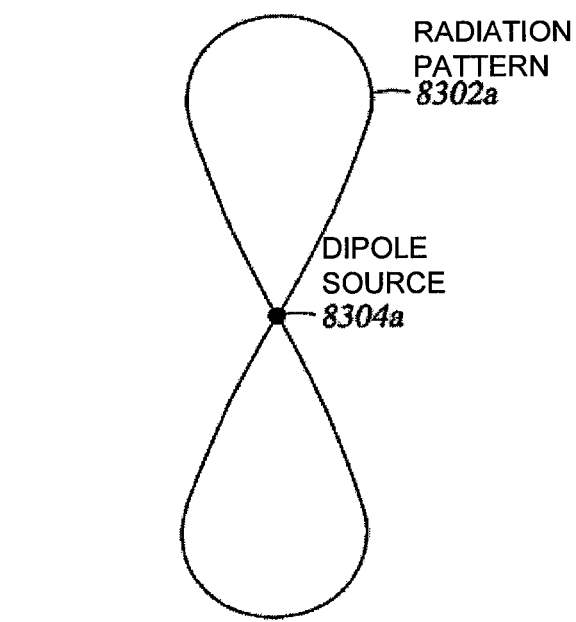
Figure 8B:
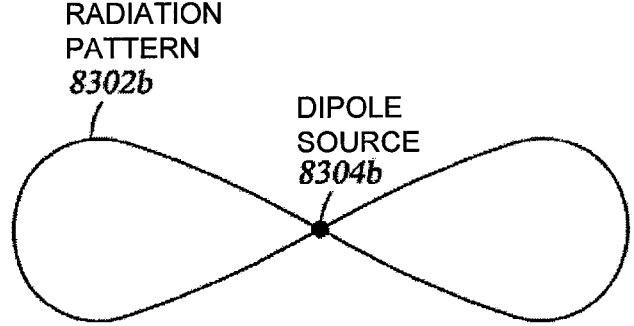
Figure 9:
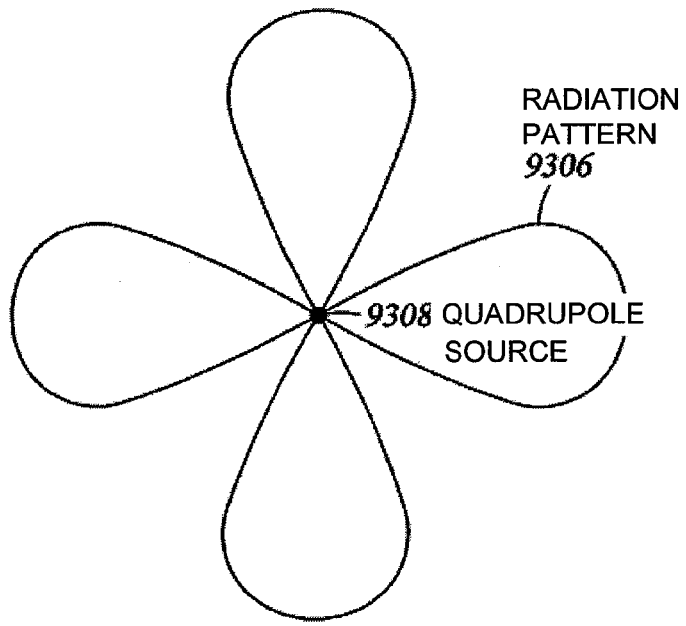
Figure 10:
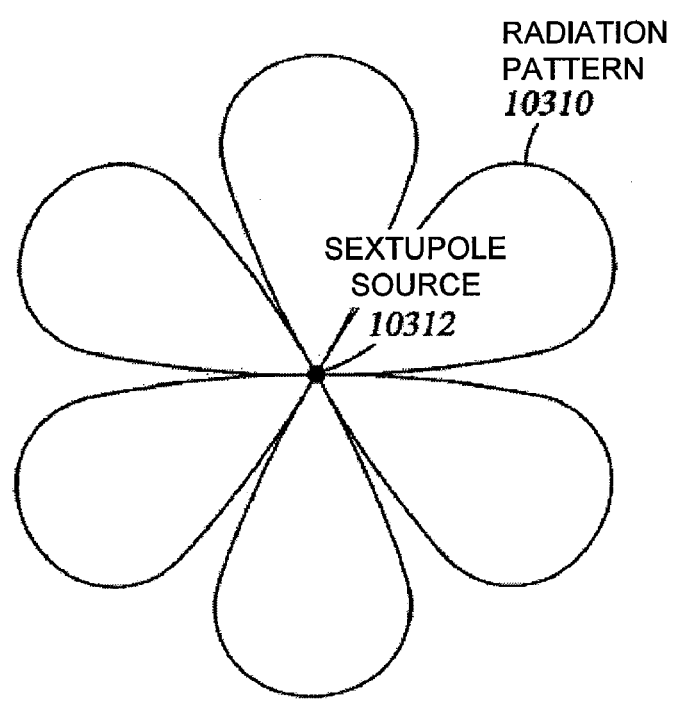
Figure 11:
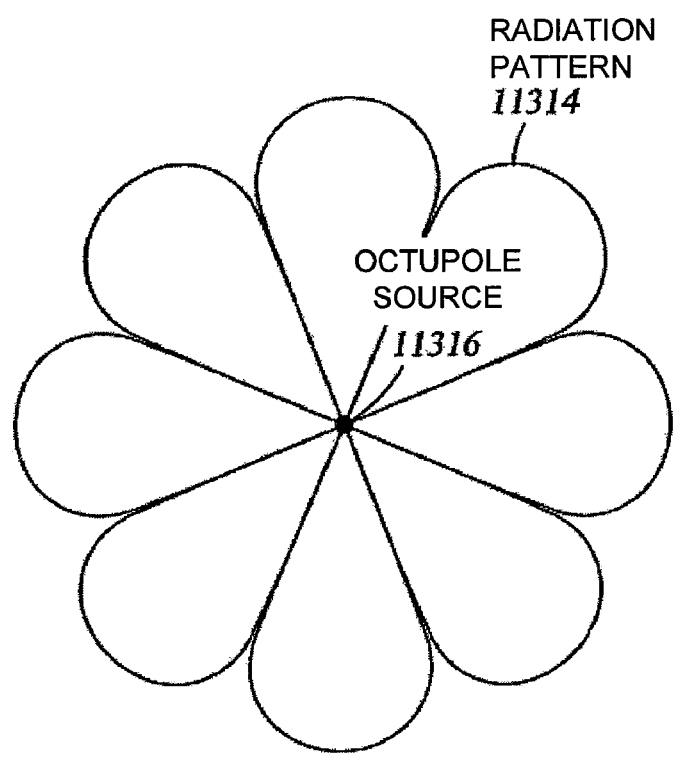
Figures 12, 13:
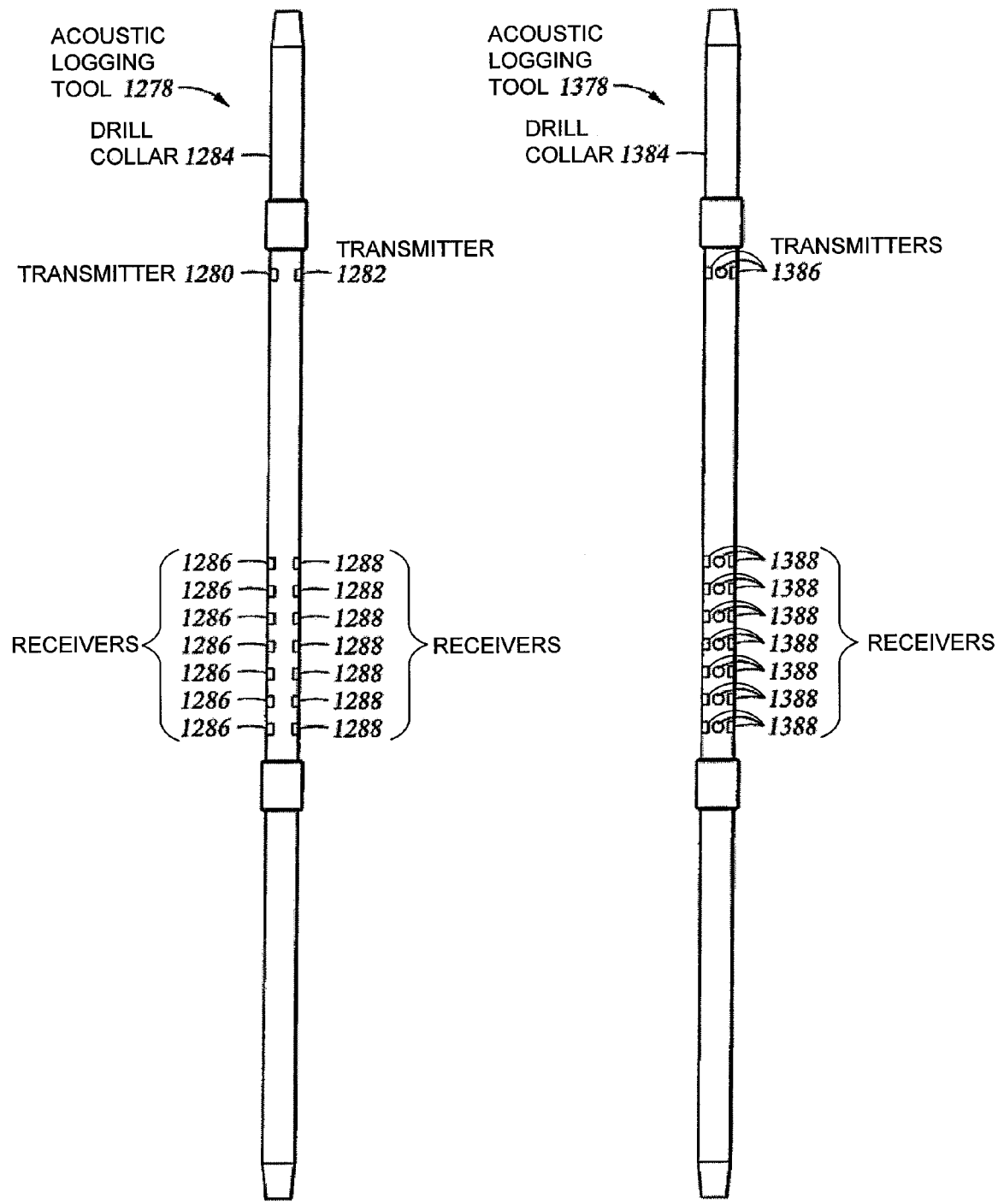
Figure 14:
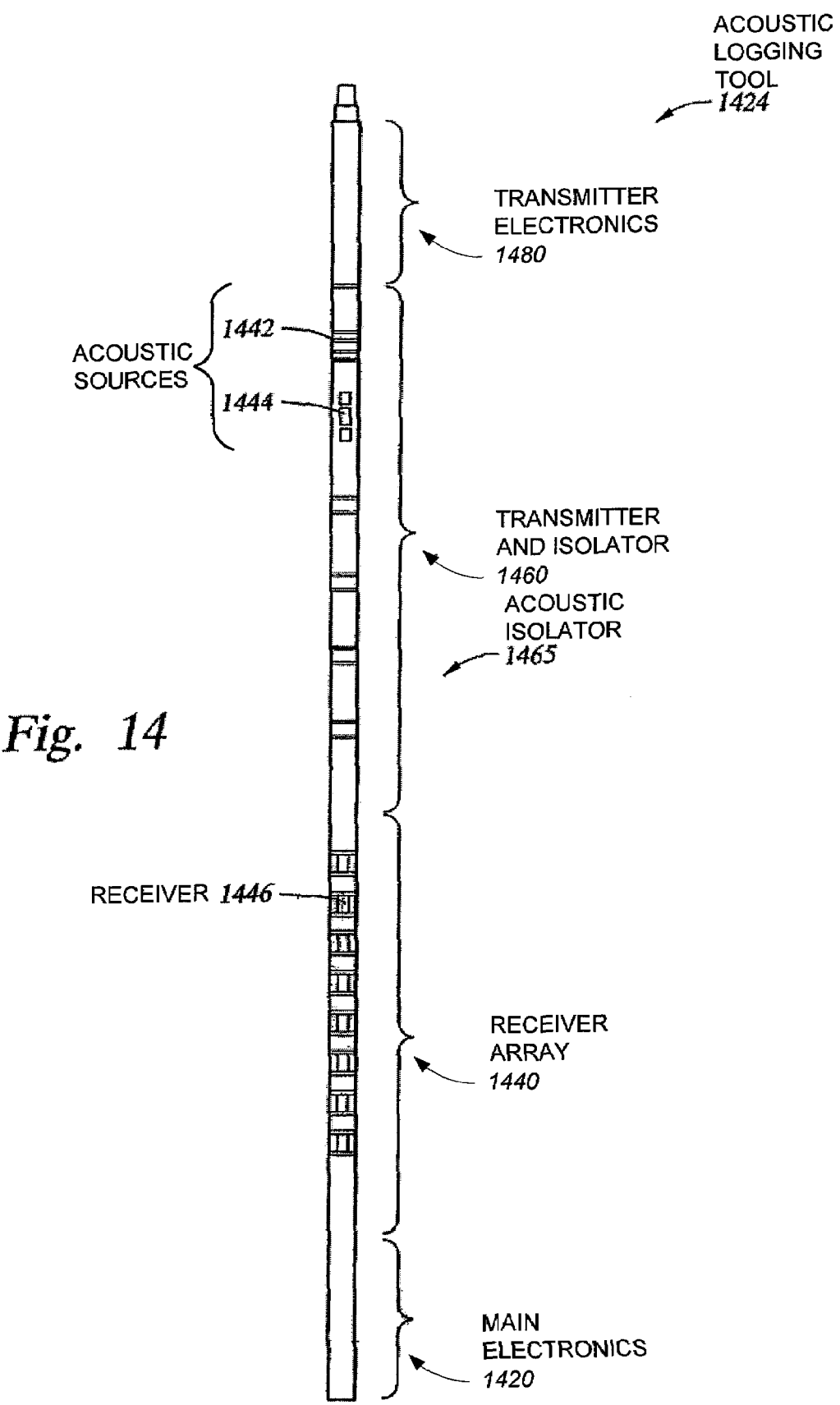
Figure 15:
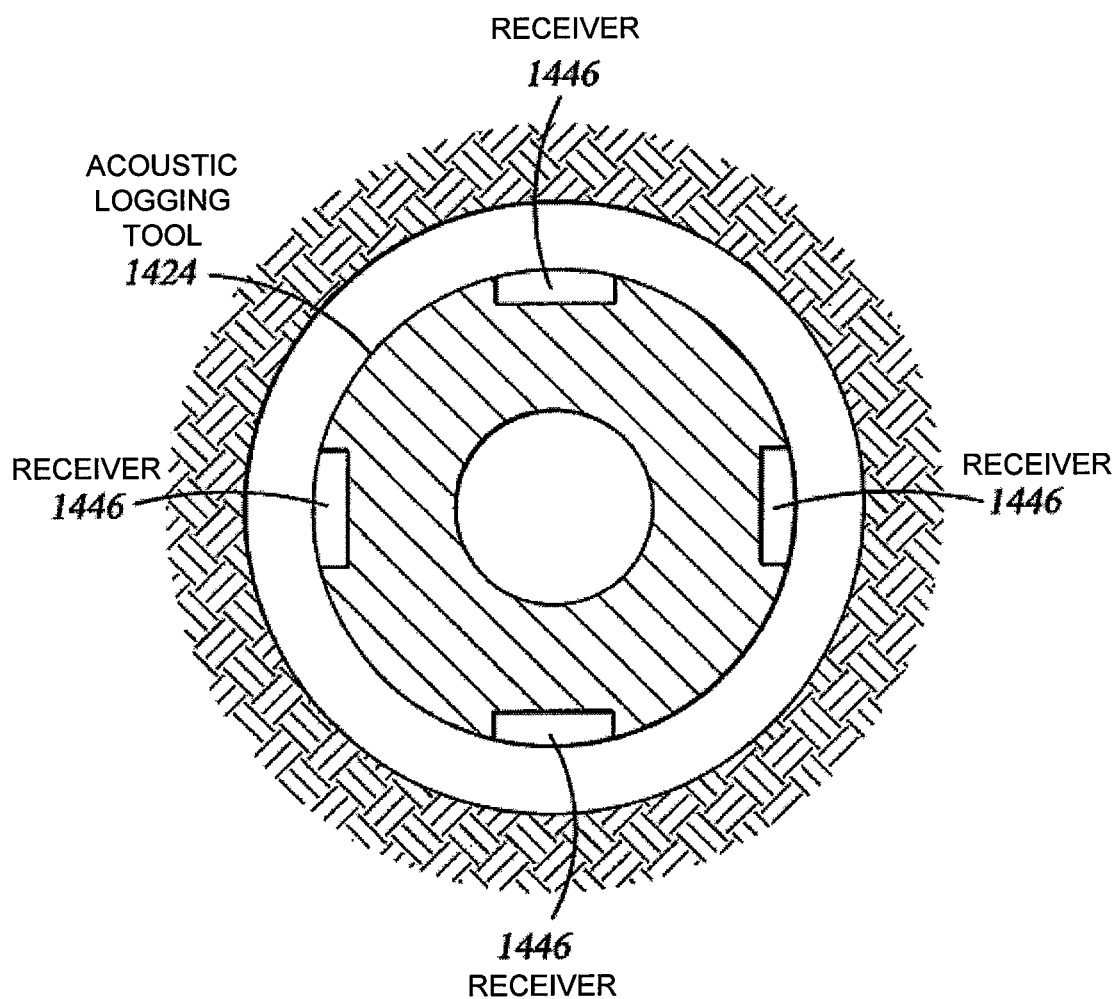
Figure 16:
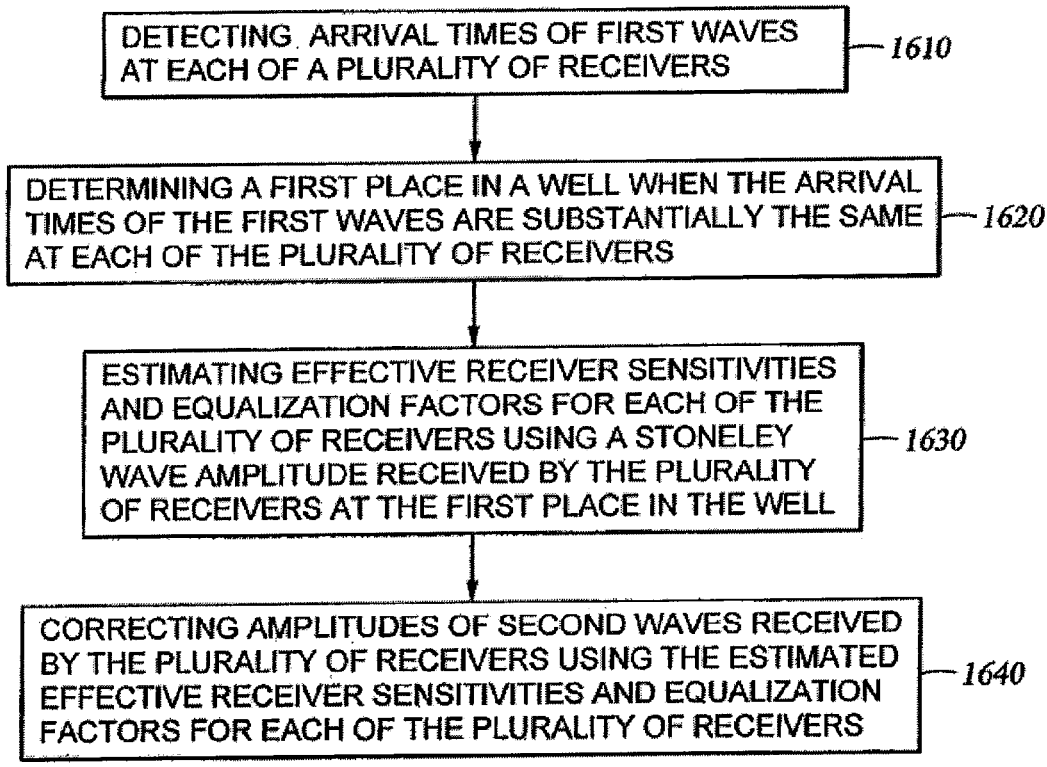
Figure 17:
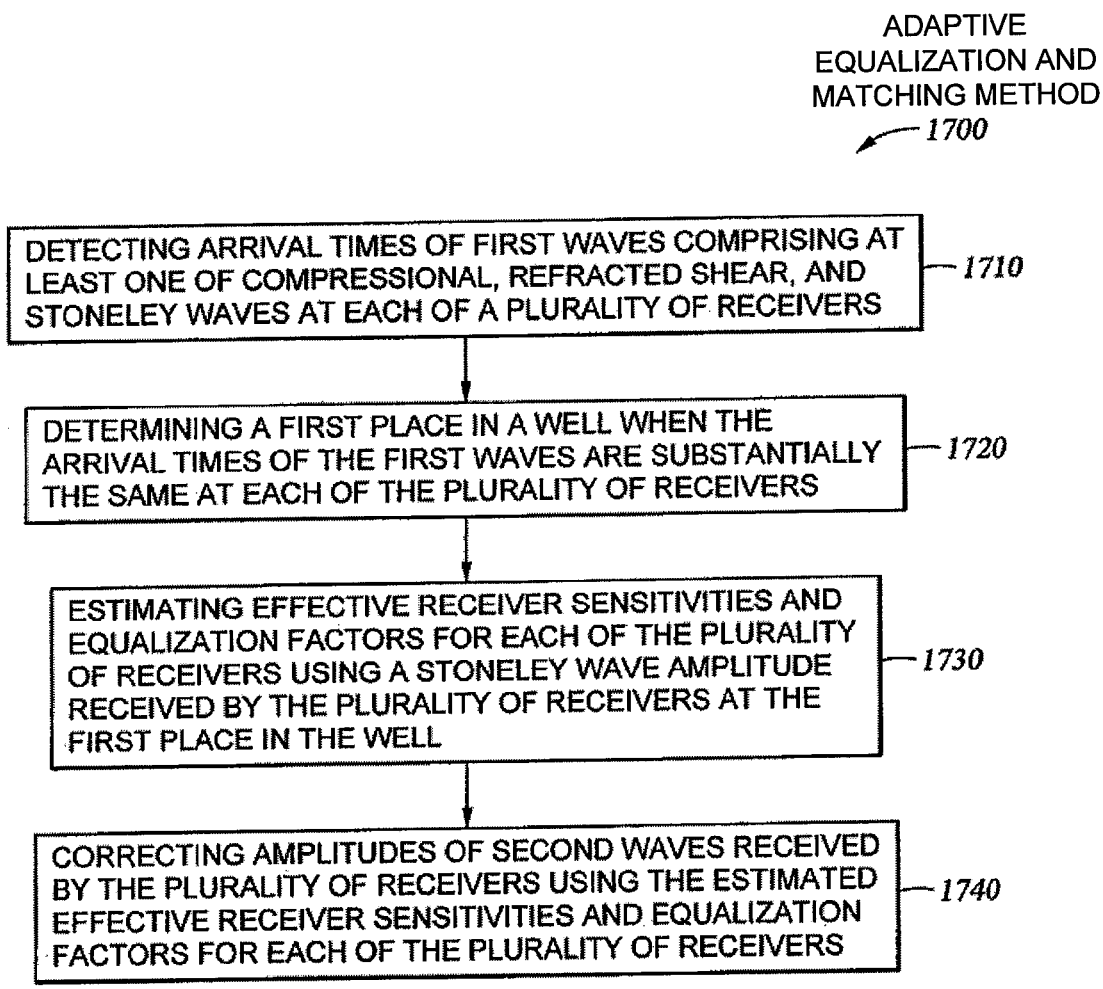
Figure 18:
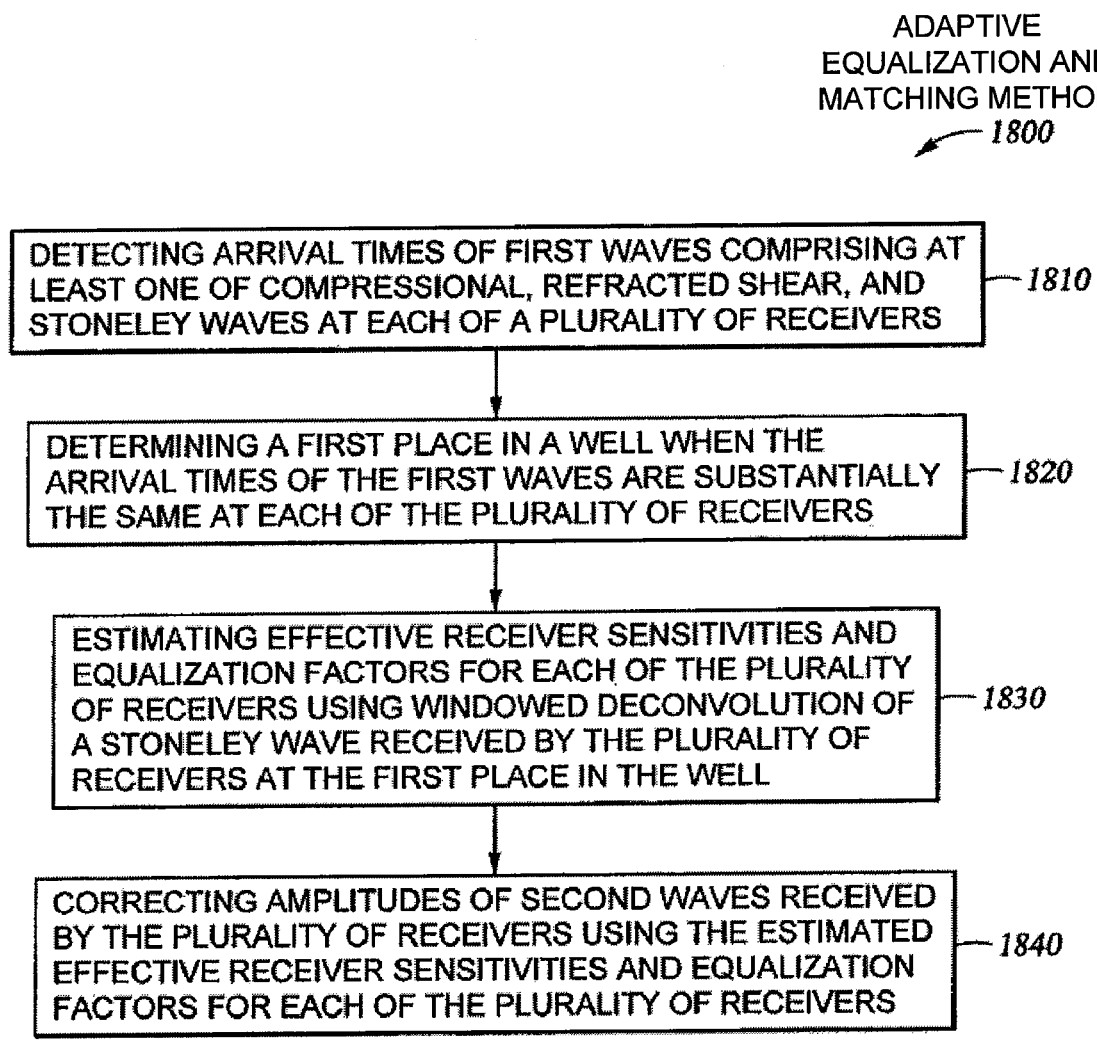
Figure 21:
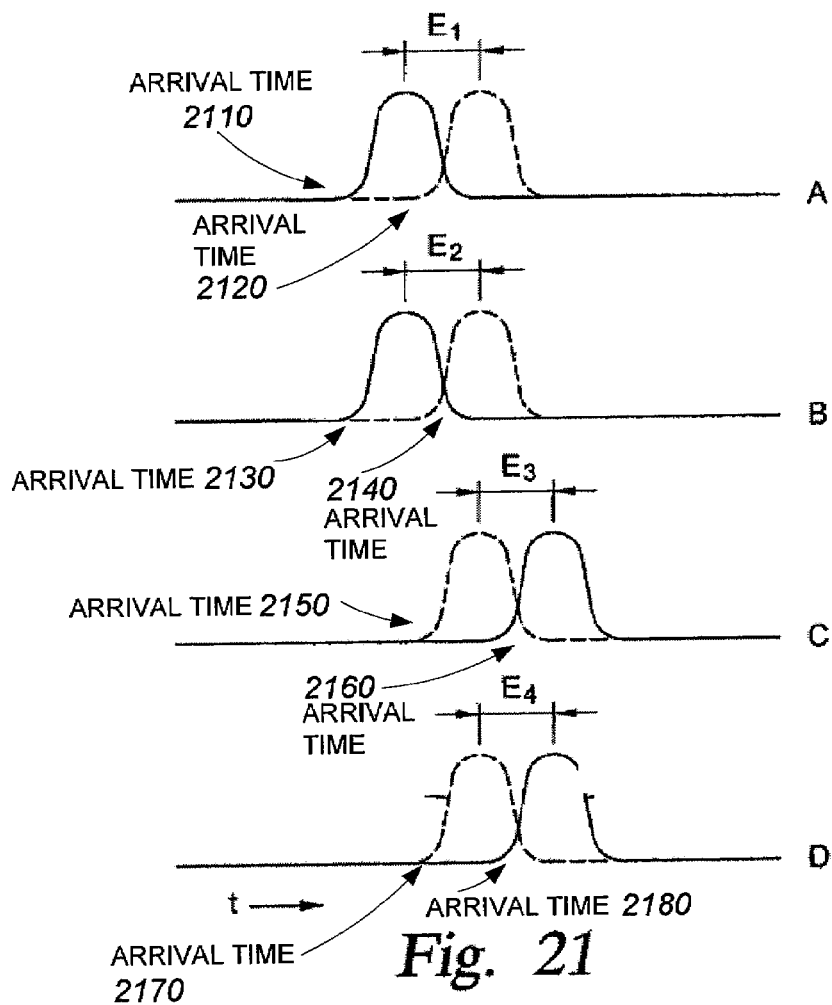
Figure 22:
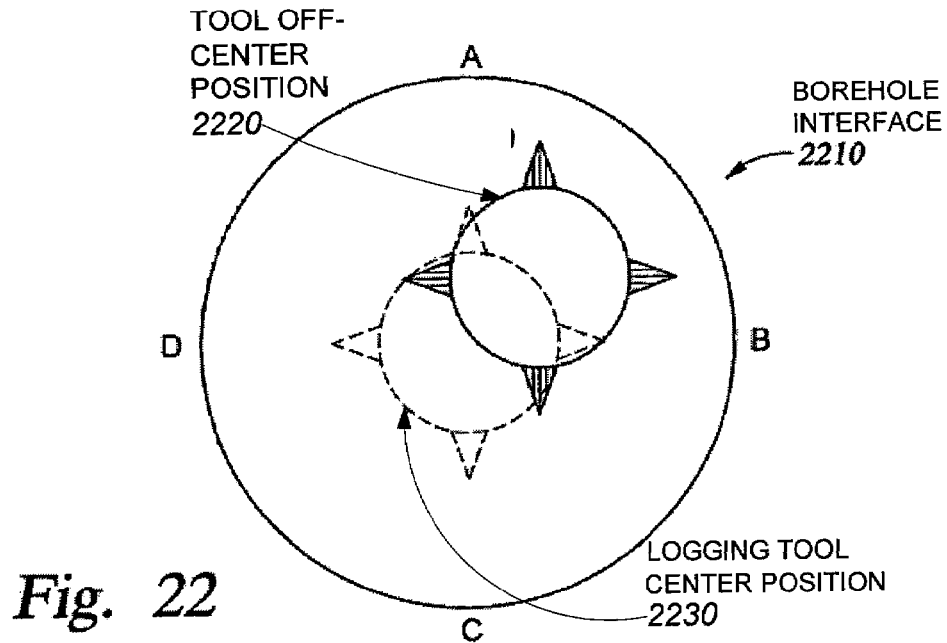
Figure 23:
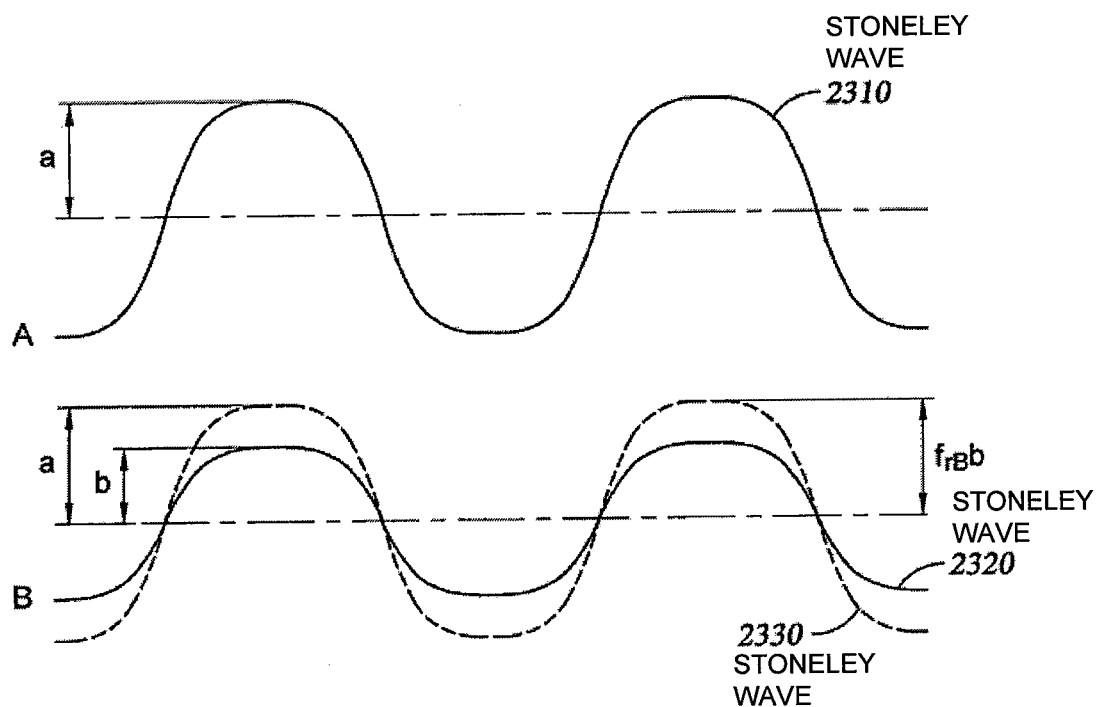
Figure 24:
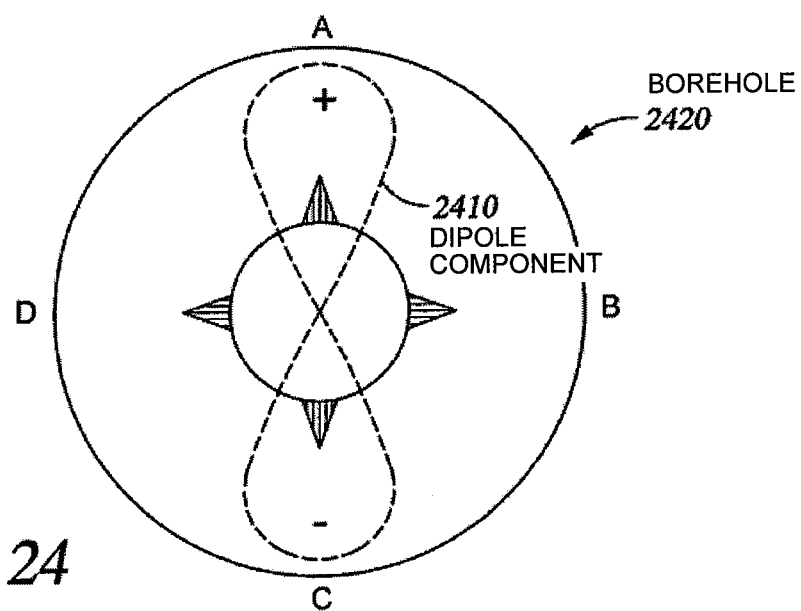
Figure 25:
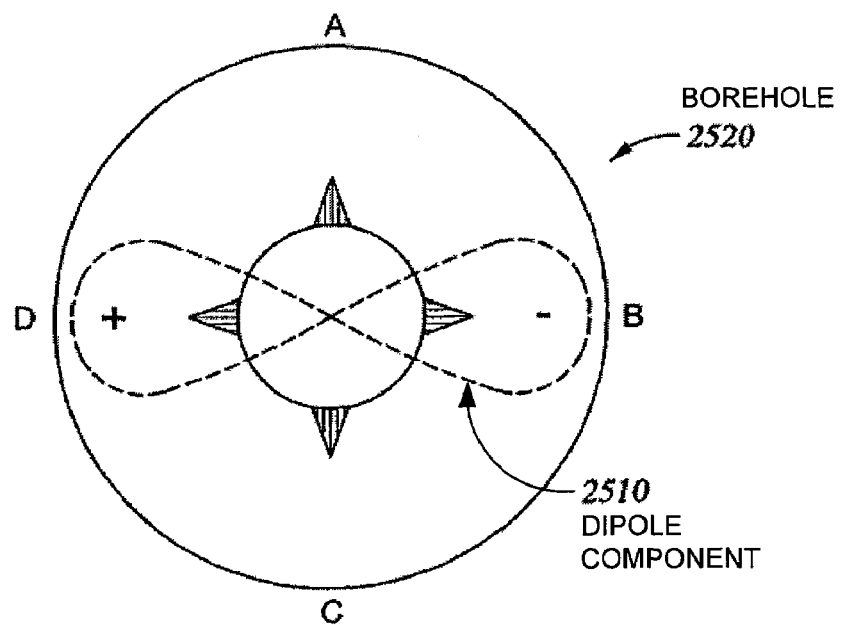
Figure 26:
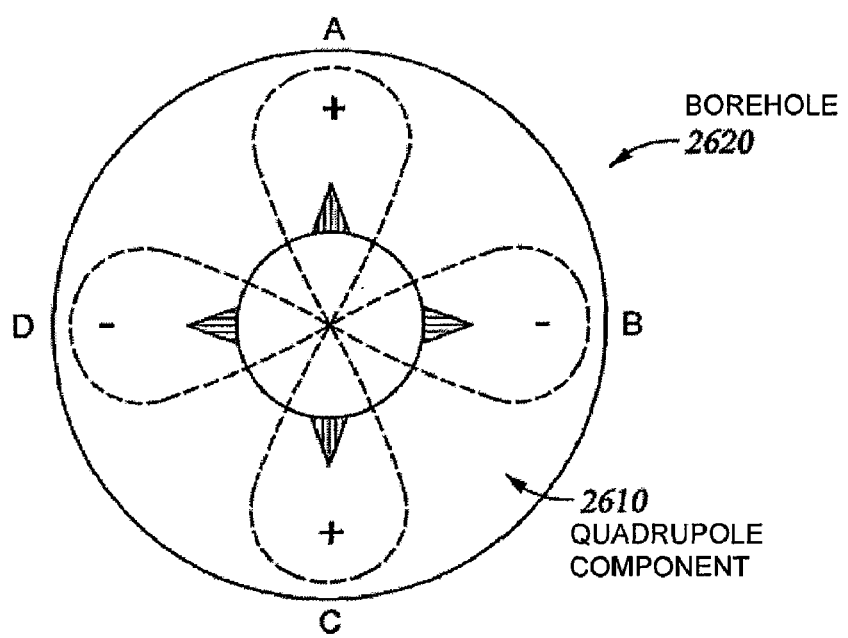
Figure 27:
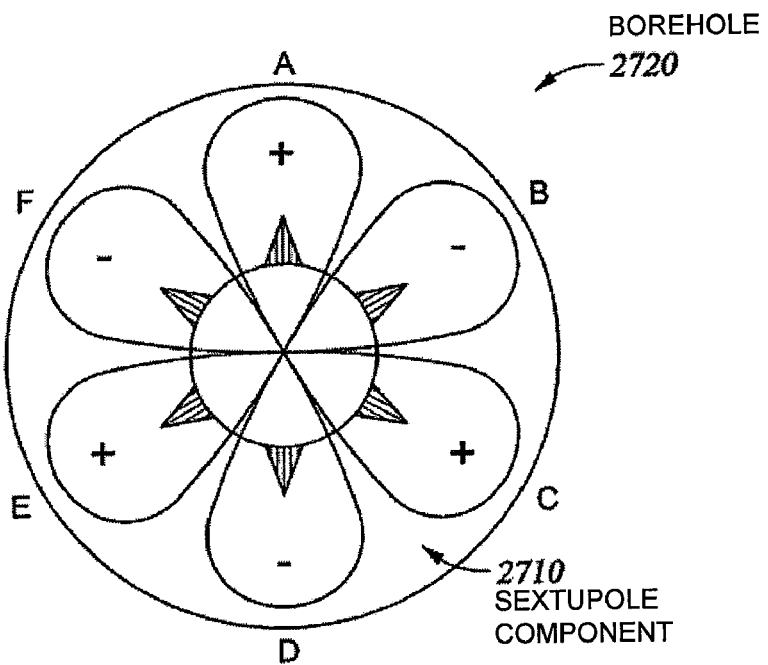
Figure 28:
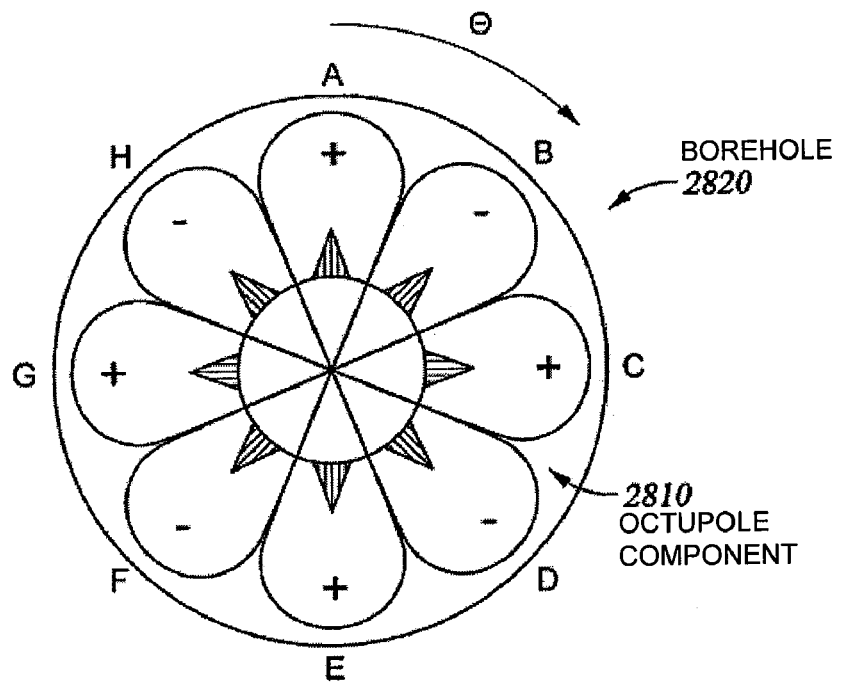
Figure 29:
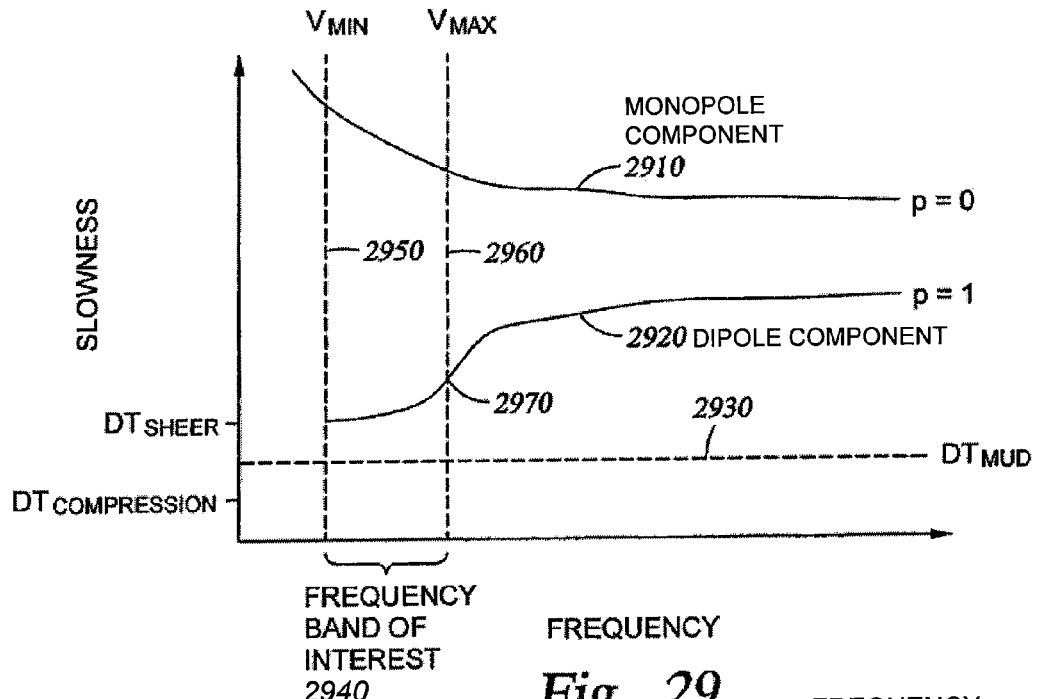
Figure 30:
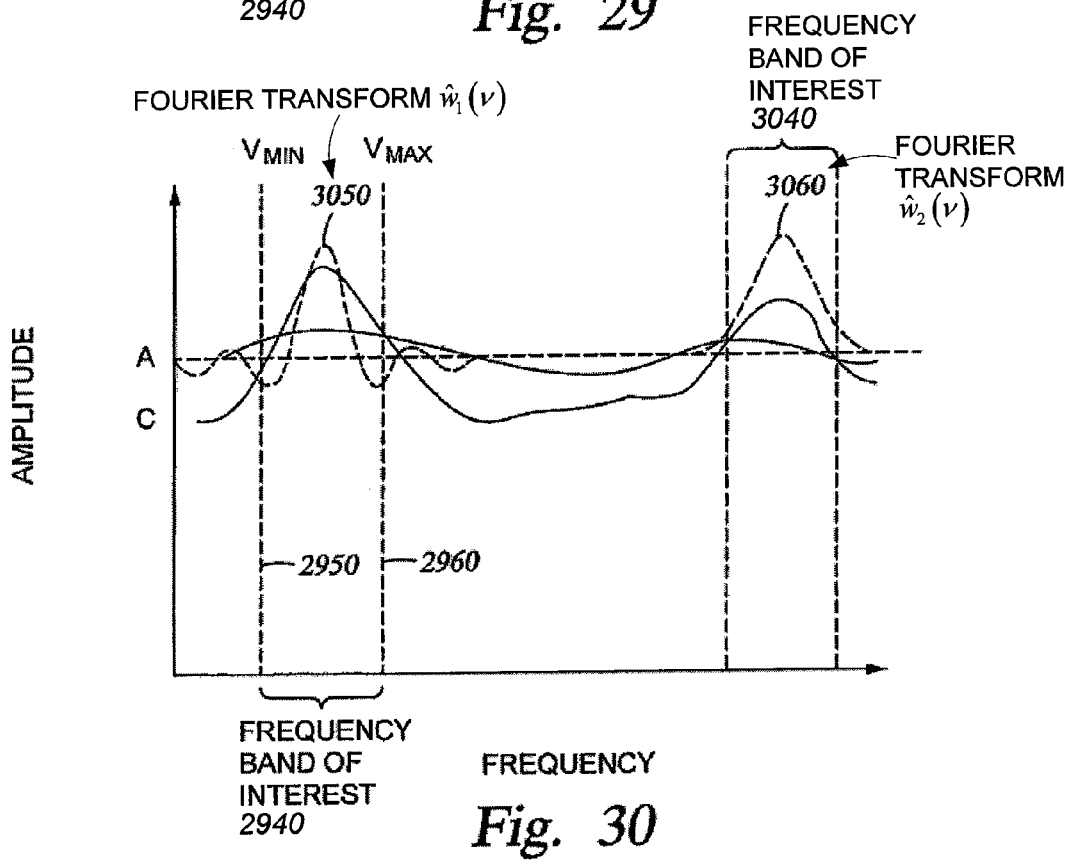
Figure 31:
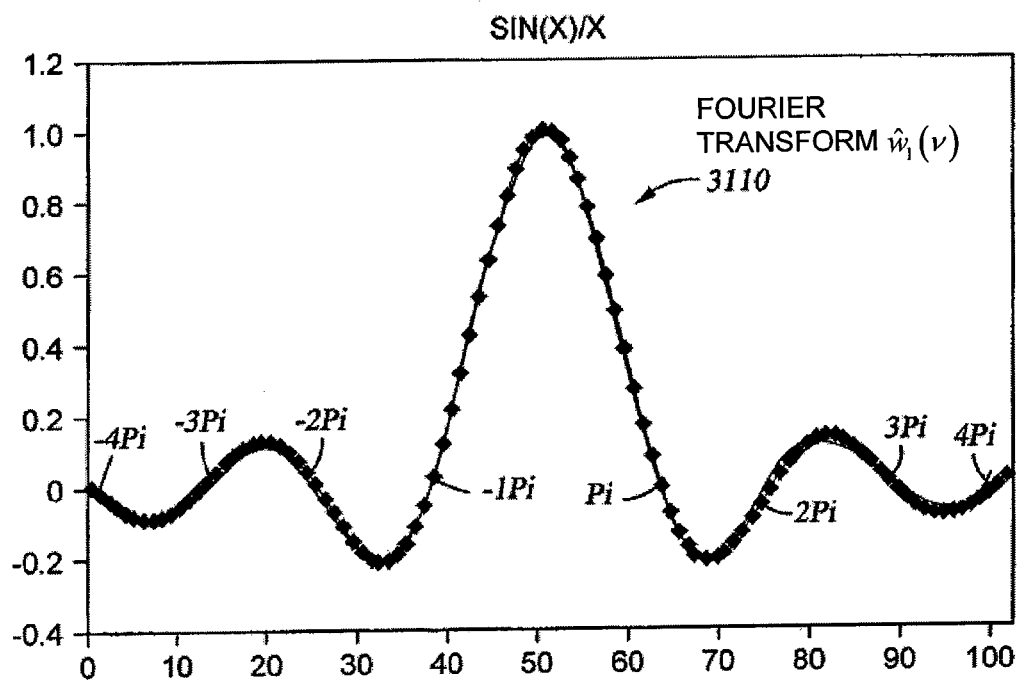
Figure 32:
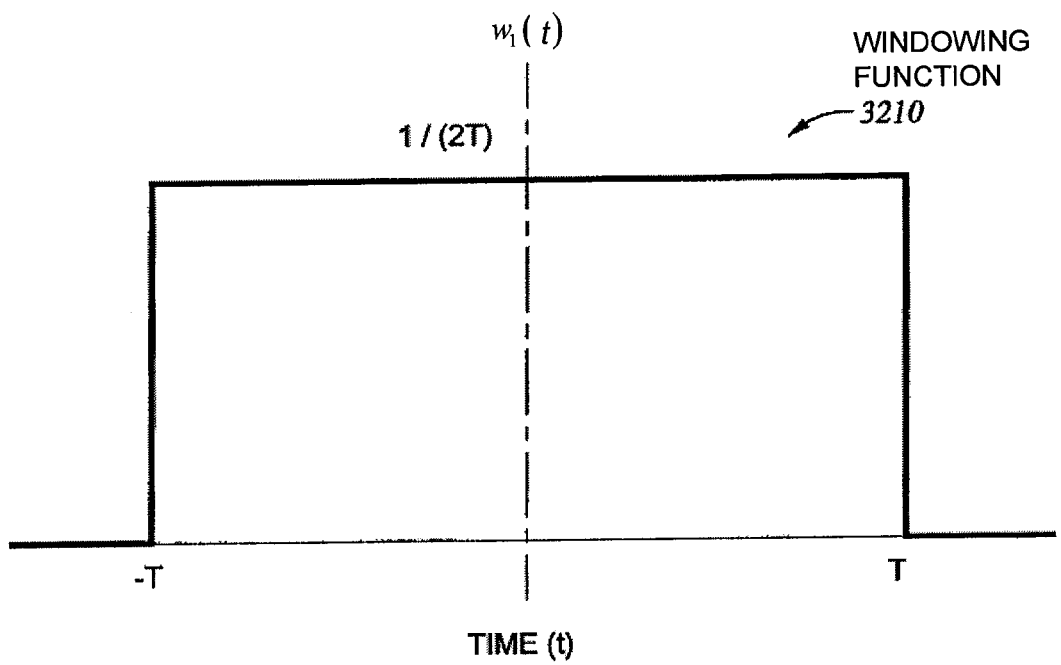
Figure 33:
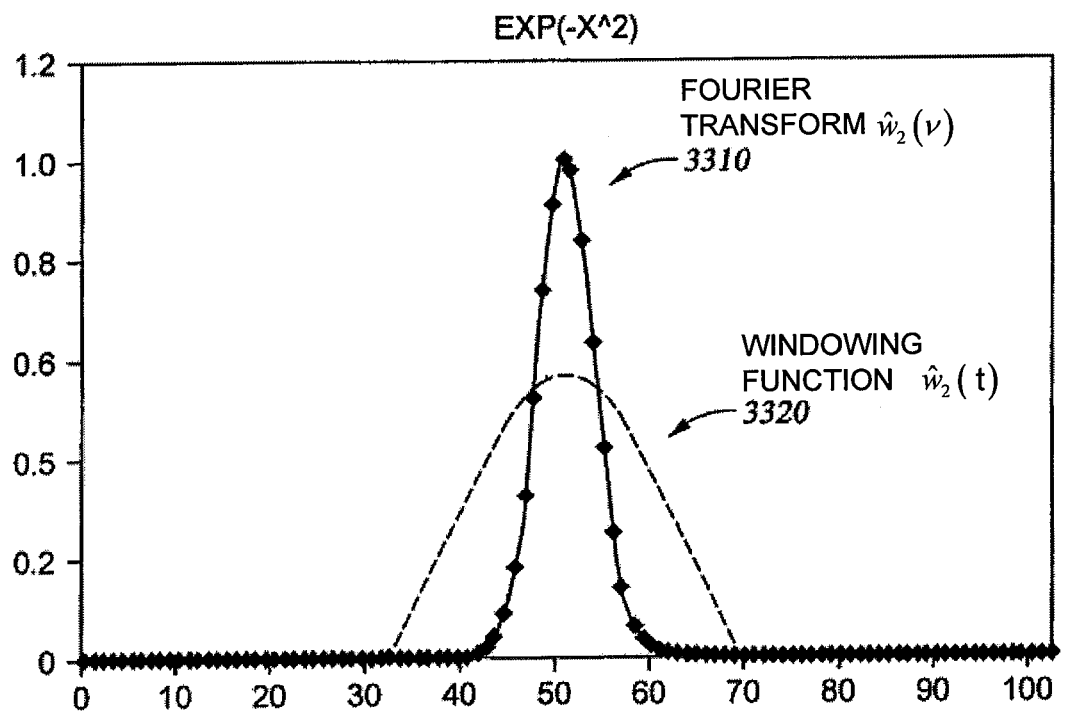

Consequently, a more complete understanding of the present disclosure and advantages thereof may be acquired by referring to the following description taken in conjunction with the accompanying drawings, in which the leftmost significant digit(s) in the reference numerals denote(s) the first figure in which the respective reference numerals appear, wherein:

FIG. 1 schematically illustrates a logging-while-drilling (LWD) system incorporating an acoustic logging-while-drilling (LWD) according to various exemplary embodiments;

FIG. 2 schematically illustrates the generation of acoustic waves when an incident wave intersects the interface of two media with different acoustic properties;

FIG. 3 schematically illustrates a prior art acoustic logging tool;

FIG. 4 schematically illustrates an acoustic wave generated by a monopole source;

FIG. 5 schematically illustrates a radiation pattern emitted from a monopole source;

FIG. 6 schematically illustrates a fundamental principle of acoustic velocity determination based on first arrival moveout between two receivers;

FIG. 7 schematically illustrates an acoustic wave generated by a dipole source;

FIG. 8a schematically illustrates a radiation pattern emitted from a dipole source;

FIG. 8b schematically illustrates a radiation pattern emitted from a cross dipole source substantially orthogonal to the dipole source of FIG. 8a;

FIG. 9 schematically illustrates a radiation pattern emitted from a quadrupole source;

FIG. 10 schematically illustrates a radiation pattern emitted from a sextupole source;

FIG. 11 schematically illustrates a radiation pattern emitted from an octupole source;

FIG. 12 schematically illustrates an acoustic logging tool with dipole transmitters and receivers;

FIG. 13 schematically illustrates an acoustic logging tool with quadrupole transmitters and receivers;

FIG. 14 schematically illustrates another acoustic logging tool useful in various exemplary embodiments of the present invention;

FIG. 15 schematically illustrates a cross-sectional view of the acoustic logging tool shown in FIG. 14;

FIG. 16 schematically illustrates an adaptive equalization and matching method according to various illustrative embodiments;

FIG. 17 schematically illustrates another adaptive equalization and matching method according to various illustrative embodiments;

FIG. 18 schematically illustrates yet another adaptive equalization and matching method according to various illustrative embodiments;

FIG. 19 schematically illustrates arrival times of a classical wave at receivers A, B, C, and D;

FIG. 20 schematically illustrates an off-center position of an acoustic logging tool in a borehole that corresponds to the arrival times of the classical wave shown in FIG. 19;

FIG. 21 schematically illustrates arrival times of another classical wave at receivers A, B, C, and D;

FIG. 22 schematically illustrates another off-center position of an acoustic logging tool in a borehole that corresponds to the arrival times of the classical wave shown in FIG. 21;

FIG. 23 schematically illustrates a Stoneley wave detected and received at receiver A having an amplitude a and the same Stoneley wave detected and received at receiver B having an amplitude b that is smaller than the amplitude a received at receiver A;

FIG. 24 schematically illustrates the dipole component of a wave received at the receivers A, B, C, and D, showing the positive displacement of the borehole fluid in one direction at receiver A and the substantially equal but negative displacement in the opposite direction at receiver C, with substantially no positive or negative displacement detected at either of the receivers B and D;

FIG. 25 schematically illustrates the dipole component of a wave received at the receivers A, B, C, and D, showing the positive displacement of the borehole fluid in one direction at receiver D and the substantially equal but negative displacement in the opposite direction at receiver B, with substantially no positive or negative displacement detected at either of the receivers A and C;

FIG. 26 schematically illustrates the quadrupole component of a wave received at the receivers A, B, C, and D, showing the positive displacement of the borehole fluid in one direction at receivers A and C, and the substantially equal but negative displacement in the opposite direction at receivers B and D;

FIG. 27 schematically illustrates the sextupole component of a wave received at the receivers A, B, C, D, E, and F, showing the positive displacement of the borehole fluid in one direction at receivers A, C, and E, and the substantially equal but negative displacement in the opposite direction at receivers B, D, and F;

FIG. 28 schematically illustrates the octupole component of a wave received at the receivers A, B, C, D, E, F, G, and H, showing the positive displacement of the borehole fluid in one direction at receivers A, C, E, and G, and the substantially equal but negative displacement in the opposite direction at receivers B, D, F, and H;

FIG. 29 schematically illustrates the slowness (the reciprocal of the velocity) of a monopole (p=0) component (including the Stoneley mode) of a wave being detected and the slowness of a dipole (p=1) component of the wave being detected, both plotted as a function of frequency;

FIG. 30 schematically illustrates examples of frequency responses for the amplitudes of a wave received at receivers A and C within a frequency band of interest;

FIG. 31 schematically illustrates the Fourier Transform $\hat{w}_1(v)$ of an appropriate windowing function $$w_1(t) = \frac{1}{2T} \text{ for } -T \leq t \leq T \text{ and } w_1(t) = 0$$

elsewhere, where $$\int_{-\infty}^{\infty} w_1(t)dt = \int_{-T}^{+T} \frac{1}{2T}dt = \frac{2T}{2T} = 1$$

shows that the windowing function is suitably normalized;

FIG. 32 schematically illustrates the windowing function whose Fourier Transform is shown in FIG. 31;

FIG. 33 schematically illustrates the Fourier Transform $\hat{w}_2(v)$ of an appropriate windowing function $$w_2(t) = \frac{1}{\sqrt{\pi}} \exp(-t^2)$$

also shown in FIG. 33, where $$\int_{-\infty}^{\infty} w_2(t)dt = \frac{1}{\sqrt{\pi}} \int_{-\infty}^{\infty} \exp(-t^2)dt = 1$$

shows that the windowing function is suitably normalized; and

Figure 34:
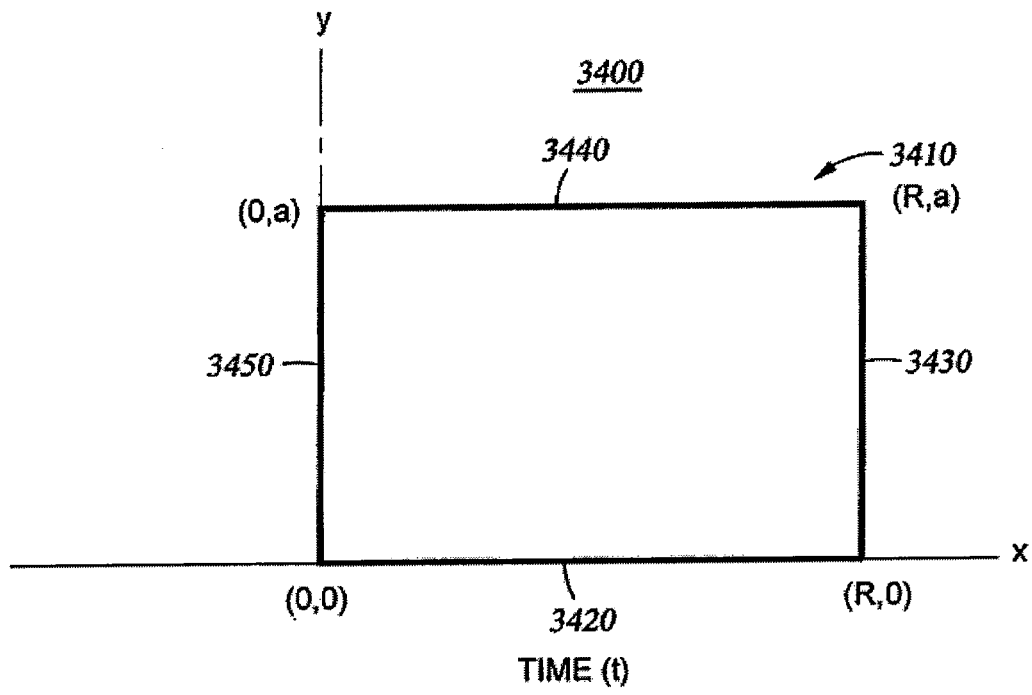

FIG. 34 schematically illustrates an appropriate contour in the complex plane useful for evaluating the integral $$\int_0^\infty \exp(-x^2)\cos(2ax)dx.$$

DESCRIPTION

The present invention relates generally to a method and apparatus utilized in hydrocarbon exploration. More specifically, the present invention relates to the utilization of acoustic sources and receivers to determine acoustic properties of geologic formations as a logging tool traverses them, be it a wireline logging tool and/or a logging while drilling (LWD) tool. More particularly, the present invention is directed to methods of, and apparatus for, adaptive equalization of receivers to reduce and/or substantially eliminate sensitivity mismatch.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

As shown in FIG. 1, a drilling rig 110 (simplified to exclude items not important to the present application) may comprise a derrick 112, a derrick floor 114, a draw works 116, a hook 118, a swivel 120, a kelly joint 122, a rotary table 124, a drillstring 126, a drill collar 128, a logging-while-drilling (LWD) tool 130, a logging-while-drilling (LWD) acoustic logging tool 132, and a drill bit 134. Mud may be injected into the swivel by a mud supply line 136. The mud may travel through a mud supply line 136, the kelly joint 122, the drillstring 126, the drill collar 128, and the logging-while-drilling (LWD) tools 130 and 132, and may exit through ports in the drill bit 134. The mud may then flow up a borehole 138. A mud return line 140 may return mud from the borehole 138 and may circulate the mud to a mud pit (not shown) and back to the mud supply line 136.

The data collected by the logging-while-drilling (LWD) tools 130 and 132 may be returned to the surface for analysis by telemetry transmitted through the drilling mud. A telemetry transmitter 142 located in the drill collar 128 or in one of the logging-while-drilling (LWD) tools 130 and 132 may collect data from the logging-while-drilling (LWD) tools 130 and 132 and may modulate the data onto a carrier that can be transmitted through the mud. A telemetry sensor 144 on the surface may detect the telemetry and may return the telemetry to a demodulator 146. The demodulator 146 may demodulate the data and may provide the data to computing equipment 148 where the data may be analyzed to extract useful geological information.

When an acoustic plane wave crosses a boundary between two media with different acoustic characteristics, part of the acoustic plane wave will be reflected and part of the acoustic plane wave will be transmitted through the boundary.

The reflection and refraction of acoustic plane waves can be visualized by use of Huygen's principle. FIG. 2 shows the interface of two media that are characterized by two different densities, and compressional and shear velocities, which are different in the two regions. In FIG. 2, an incident wave 150 arrives at an interface 152 between medium 1 and medium 2 at an angle $\omega$ off perpendicular to the interface between medium 1 and medium 2. Two acoustic waves are generated in medium 2: a refracted shear wave 154 and a refracted compressional wave 156.

Based on the law of refraction (Snell's law), it is known that if the angle of incidence becomes large enough, then the refracted wave will travel parallel to the interface surface. This critical incidence angle $\omega_{crit}$ is given (for the compressional wave with velocities $v_{p1}$ and $v_{p2}$ in the two media) by $$\sin(\omega_{crit}) = \frac{v_{p1}}{v_{p2}}.$$

Waves that are critically refracted and travel along the boundary are referred to as "head waves." As the head waves travel along the interface, the head waves radiate energy back into the initial medium. It is this phenomenon that allows detection, by an acoustic device positioned in the borehole, of acoustic energy that has propagated primarily in the formation.

A very important parameter in the field of borehole acoustics is the slowness, defined as the inverse of wave velocity $$s = \frac{1}{v}.$$

If the slowness is independent of frequency, then the wave is said to be "non-dispersive." That is, all frequencies travel at the same slowness so the shape of the arriving wave will not change with transmitter-to-receiver offset. If the slowness does depend upon frequency, then the wave shape changes, typically broadening in time and narrowing in frequency, and the wave disperses, with increasing offset from the source. Theoretically, in sonic logging applications, the modes are dispersive in nature; however, this dispersion is often difficult to see in the waveforms. Part of the problem is that dispersion is difficult to observe over the short array aperture of a sonic tool (typically only about one wavelength long).

If the slowness of a mode is real-valued, then the mode is said to be "perfectly trapped," or "guided." In this case, the wave does not lose energy as it propagates. If the slowness is complex-valued, then there is an exponential decay with increasing transmitter-to-receiver offset and the mode is said to be "leaky."

The actual modes present in the fluid channel (borehole) can be divided into three sets: (1) the slightly dispersive Stoneley mode; (2) the strongly dispersive shear normal modes (or pseudo-Rayleigh modes in cylindrical boreholes); and (3) a similar series of dispersive compressional normal modes. It is well-known to those skilled in the art, having the benefit of the present disclosure, that knowledge of three parameters, i.e., density, compressional velocity, and shear velocity, can yield the physical parameters that can fully characterize the mechanical properties of the rock. The density measurement can be performed with several classical nuclear methods. The measurement of the compressional and shear velocity can only happen with acoustic means, i.e., through the calculation of acoustic velocities. In logging applications, it is customary to discuss the subject in terms of "interval travel times," or "acoustic transit times," which is the reciprocal of the acoustic velocities. By definition, the unit for the interval travel time is (velocity)$^{-1}$ or slowness. In SI it would be s/m, or due to its rather small value for rocks and most material of interest $\mu$s/m. In most cases the quoted numbers are given in $\mu$s/ft.

One of the classic conventional forms for an acoustic tool 358 (well known to those skilled in the art) is the single transmitter-dual receiver tool, a schematic of which is shown in FIG. 3. In FIG. 3, the basic mode of propagation of the compressional (P or primary) and the shear (S or secondary) wave are also shown.

The classic conventional acoustic tool 358 consists of an acoustic transmitter (T) 360. The acoustic tool 358 also contains two receivers (R1 and R2) 362 and 364, respectively, spaced apart at a distance L. The transmitter is typically designed as a ring or a cylinder aligned with the borehole axis to produce axisymmetric excitation of waves. Such a transmitter is called a monopole transmitter 466, as illustrated in FIG. 4. For this monopole transmitter 466, the wave excitation has the general shape shown in FIG. 4, and a corresponding radiation pattern 5300 can in two dimensions be approximated by the form shown in FIG. 5. For the simple case of a fluid-filled borehole in a rock formation, there are essentially four types of acoustic waves that propagate: two head-waves and two guided waves. The P-wave 368 begins as a compressional wave in the borehole fluid, is critically refracted into the formation as a P wave, and then is refracted back into the fluid as a compressional wave. The S wave 370 begins as a compressional wave in the borehole fluid, is critically refracted into the formation as an S wave and is refracted back into the fluid as a compressional wave. Another wave is the reflected conical wave, also called the pseudo-Rayleigh wave. The reflected conical wave is a guided wave that decays radially away from the borehole wall in the solid and is oscillatory in the fluid. Another wave, called the Stoneley wave, is a slightly dispersed guided wave that propagates along the borehole wall. The amplitude of a Stoneley wave decays exponentially away from both sides of the fluid/rock interface. This wave is especially prominent when the receiver is placed close to the borehole wall, as in the case of a measurement-while-drilling (MWD) sonic tool.

The classical $\Delta t$ measurement is illustrated in FIG. 6. Waveform 672 is a representation of the acoustic energy received at receiver R1 362 and waveform 674 is a representation of the acoustic energy received at receiver R2 364, with the time scale being the same for both waveforms. It is clear that the difference of arrival time of the compressional wave to the receivers R1 362 and R2 364 only depends on the distance between receivers (L) and on the compressional velocity of the formation $v_p$. Simple physics dictates that $$\Delta(t) = \frac{L}{v_p}$$

or that $$\frac{\Delta(t)}{L} = \frac{1}{v_p}.$$

In the classic conventional acoustic tool 358, Δt is calculated by estimating the time of first arrival at the receivers R1 362 and R2 364 by utilizing simple threshold techniques on the analog signals representing the acoustic waves. This method is usually referred to as a "two-receiver moveout" method, as this method estimates the velocity from the time difference (moveout) of a single wave arrival to two different receivers.

From the discussion above, it becomes clear that this simple formula for calculation of formation slowness depends on two key points: accurate determination of Δt, and symmetry of the tool/borehole/formation system. Taking advantage of symmetry is one way by which the other time components that will affect the arrival of the wave to the receiver (travel time in the mud, travel time down the borehole to the first receiver, and the like) can be eliminated. Response of a dual-receiver acoustic device is generally adversely affected by non-uniform borehole size, sonde tilt, and gas-cut borehole fluid.

In order to eliminate most of the adverse effects of non-symmetric systems, several combinations of multi-transmitter, multi-receiver tools have been utilized for acoustic logging. Most of these devices are called "borehole compensated" since these devices eliminate the borehole size effect. Array tools also take advantage of advanced signal processing techniques to calculate accurately Δt or to estimate directly slowness from the analysis of the full waveform.

As is well-known to those skilled in the art, having the benefit of the present disclosure, acoustically slow formations are those in which the shear wave velocity is lower than that of the acoustic wave velocity of the borehole fluid (drilling mud or water). In such acoustically slow formations, compressional or pressure wave energy generated in the borehole fluid column cannot be critically refracted as a mode-converted shear wave along the borehole wall and radiate back into the borehole to be picked up by the receivers. Thus, direct determination of shear wave velocity in acoustically slow formations is not possible with the classic conventional acoustic tools that contain a monopole (axisymmetric) transmitter. There are two ways to estimate shear wave velocities in acoustically slow formations: first, a direct measurement by utilization of multipole sources; second, indirect estimation methods based on analysis of other wave components such as the tube (Stoneley) wave or the leaky compressional mode. The indirect methods are not very accurate and have many other limitations.

The most direct method of measuring the shear wave velocity of the formation is direct shear wave logging. This is achieved by using non-axisymmetric sources. Currently non-axisymmetric sources can be divided into two types: dipole and quadrupole sources. Dipole sources are usually provided in wireline by using a bender element or a movable cylinder.

A dipole source 776 generates a positive displacement of the borehole fluid in one direction 7250 and an equal but negative displacement in the opposite direction 7252, as illustrated in FIG. 7, for example. A radiation pattern 8302a of the pressure generated in the borehole by a dipole source 8304a is illustrated in FIG. 8a, for example, and may correspond to an X dipole transmitter radiation pattern. FIG. 8b schematically illustrates a radiation pattern 8302b emitted from a cross dipole source 8304b substantially orthogonal to the dipole source 8304a of FIG. 8a. The radiation pattern 8302b may correspond to a Y dipole transmitter radiation pattern, for example. A radiation pattern 9306 of a quadrupole source 9308 is illustrated in FIG. 9, for example. The radiation patterns for higher order multipole sources are similar. For example, a radiation pattern 10310 for a sextupole source 10312 is illustrated in FIG. 10. Similarly, a radiation pattern 11314 for an octupole source 11316 is illustrated in FIG. 11, for example.

In simple terms, the dipole transmitter emits asymmetric energy "pushing" on one side of the borehole and "pulling" on the other to generate a flexural wave in the formation/borehole interface. At low frequencies, this flexural wave travels down the borehole wall at the formation shear velocity. Dipole receivers can be located at the center of the tool/borehole and are sensitive to differential pressures, thus, detecting the flexural wave. Since the dipole receivers are not sensitive to axially symmetric pressure fields, both the compressional and the Stoneley waves are suppressed, allowing the flexural wave to be identified accurately.

Referring now to FIG. 12, a logging-while-drilling (LWD) acoustic logging tool 1278 useful in various exemplary embodiments of the present invention is schematically illustrated. The logging-while-drilling (LWD) acoustic logging tool 1278 may have multipole-capable transmitters and multipole-capable receivers capable of generating and sustaining acoustic waves in a geologic formation. The multipole-capable transmitter may comprise two or more transmitters 1280 and 1282 mounted in a drill collar 1284 so that the transmitters 1280 and 1282 direct their energy in substantially opposite directions. The frequency, magnitude and time-of-fire of the energy transmitted by each of the transmitters can be controlled as discussed below. Consequently, energy transmitted by transmitter 1280 can be time-displaced with respect to the energy transmitted by transmitter 1282 but with the same frequency and magnitude. The result is a simulated dipole transmitter. The two transmitters 1280 and 1282 can also be fired synchronously to simulate a monopole transmitter. Further, the two transmitters 1280 and 1282 can be fired in any combination of frequency, magnitude and timing desired to generate a variety of vibration modes in the formation.

The multipole-capable receiver is constructed, for example, as two rows of seven (or more) spaced receivers 1286 and 1288, respectively, mounted in such a way that the receivers 1286 and 1288 are in diametrically opposed sides of the drill collar 1284. Each receiver of the two rows of seven (or more) spaced receivers 1286 and 1288 has its own data acquisition channel with adjustable gain and signal conditioning characteristics. Each receiver channel is sampled substantially simultaneously and each sample is converted into digital form. A digital signal processor inside the logging-while-drilling (LWD) acoustic logging tool 1278 performs a variety of calculations using the sampled data including Δ(t) calculations. The collected data and the calculated data are stored in the tool for later analysis and the calculated data is transmitted to the surface through mud telemetry as described above.

The approach described above can be used to create tools with quadrupole, sextupole, octupole, and/or any other multipole characteristic by increasing the number of transmitters and the number of receivers. For example, FIG. 13 illustrates a logging-while-drilling (LWD) acoustic logging tool 1378 with a quadrupole-capable transmitter and a quadrupole-capable receiver. The logging-while-drilling (LWD) acoustic logging tool 1378 includes four transmitters 1386 (only three are shown) and four rows of seven receivers 1388 (only three rows are shown). The four transmitters 1386 and four rows of seven receivers 1388 can be manipulated as described above to create a quadrupole-capable transmitter and receiver set.

FIG. 14 shows another acoustic logging tool 1424 useful in various exemplary embodiments of the present invention. The acoustic logging tool 1424 may be divided into four sections: a main electronics section 1420, a receiver array 1440, a transmitter and isolator section 1460, and a transmitter control electronics section 1480. Each of these sections is discussed in turn below.

Main Electronics

The main electronics section 1420 controls the acquisition of the waveform data and communication with the surface. The signals from each of the 32 receiver transducers 1446 are preferably digitized using high resolution (e.g., 18 bit) analog-to-digital converters (ADC) and transmitted to the surface. The waveform data is preferably acquired without adaptive gain control (AGC), although an equivalent adaptive gain control (AGC) option exists for the monopole firing. The overall acquisition system has demonstrated an equivalent gain bandwidth of over 90 dB achieved by controlling the receiver sensitivity and source output, making the use of an adaptive gain control (AGC) unnecessary. Nevertheless, an adaptive gain control (AGC) may be included in some illustrative embodiments.

A typical transmitter firing sequence at each depth involves firing the monopole source, firing the X-X dipole, then firing the Y-Y dipole. With about a 100 millisecond (ms) interval between each firing (this interval is programmable), the main electronic section 1420 may acquire 96 digitized waveforms about every 300 ms and send the 96 digitized waveforms to the surface. The logging speed may be limited by the net telemetry rate, the desired depth sampling rate, and/or the processing power of the acquisition system at the surface. Under normal operating conditions (full acquisition of one monopole and two dipole activations; processing for the monopole and one, or both, of the dipole arrays) a logging speed of about 1800 ft/hr has been achieved with a full quad-combo logging string (resistivity, acoustic, density, neutron, directional-navigation, gamma, and multi-axis caliper). Advantages to acquiring and transmitting the full set of 96 receiver waveforms without any processing downhole include the ability to use advanced processing algorithms on the full set of waveforms to derive azimuthal information on the compressional velocity, as well as perform advanced processing for refracted shear wave anisotropy.

Receiver Array

In various exemplary embodiments, the receiver array 1440 comprises 32 receiver crystals arranged in eight co-planar rings. Each ring has four receivers 1446 mounted perpendicular to the acoustic logging tool 1424 axis and evenly distributed at 90 degrees from each other, as shown in FIG. 15. Note that the arrangement of the four co-planar receivers 1446 as shown in FIG. 15, may be as in the arrangement of the WaveSonic® and/or the quadrupole Bi-modal AcousTic (BAT™) receivers. The circumferential positioning of the receivers 1446 is preferably aligned with the dipole sources so that there are two in-line arrays and two cross-line arrays for both the X-X and Y-Y dipole sources. The offset from the uppermost receiver ring is about 10.2 feet (3.1 m.) from the monopole source and about 9.2 feet (2.8 m.) from the on-depth X-X Y-Y dipole sources. The spacing between the receiver rings is 0.5 feet (0.15 m.). This gives a receiver array length of 3.5 feet (1.07 m.). In the dipole acquisition mode, the in-line receiver array and the cross-line receiver array are each 2 by 8 arrangements of receivers 1446.

In various exemplary embodiments, the receivers 1446 have a frequency response from about 0.5 kHz to about 20 kHz. As shown in FIG. 15, the 32 individual receivers 1446 are each mounted in receiver pockets, slightly indented from the external surface of the acoustic logging tool 1424 housing. Each receiver 1446 is individually pressure-compensated and temperature-compensated to the full extent of the operating specifications for the tool (e.g., 20,000 psi, 175° C.). This allows for easy wellsite maintenance if one of the receivers 1446 is damaged for any reason, without the need for elaborate oil filling or evacuation stations.

The receivers 1446 are preferably matched in sets of four and in sets of 32. The matching may be done as follows with the fully assembled receiver filled with the proper amount of the oil required the pressure and temperature compensation system. Each receiver 1446 is individually tested to about 20,000 psi and about 150° C. (ANSI-1988). The response of each receiver 1446 to a known calibrated source is recorded at many different frequencies. Once all the data is collected, receivers 1446 having closely matches responses are grouped in sets of four (a "quad") and in sets of 32. The accepted flatness of the receiver response across a wide frequency range is ±2 dB (with the measured average closer to ±0.75 dB). The accepted sensitivity difference between the four receivers 1446 of a quad is ±0.75 dB (with the measured average closer to ±0.2 dB). Through several of the field tests and the commercial jobs of this tool, the actual receiver 1446 matching under downhole conditions has been analyzed and has been found to be well within the ranges quoted above.

As described above, however, a well-known problem in acoustic well logging, especially for the acquisition of higher order modes, is that receiver 1446 matching is important in producing correct results. Indeed, proper and complete receiver matching is very hard to achieve in downhole conditions, despite stringent surface testing. In various illustrative embodiments of the present invention, an adaptive equalization and matching method is provided for an adaptive equalization of the receivers 1446 to eliminate substantially sensitivity mismatch. As one result of such an adaptive equalization and matching method, important calculations may be performed with azimuthal receiver (amplitude) information, which is available with devices such as the WaveSonic®, and/or with the acoustic logging tool 1424, for example. Such an adaptive equalization and matching method may be applied in a post-processing mode and/or may be implemented downhole.

In various exemplary embodiments, the acoustic sources 1442, 1444 and receiver array 1446 are preferably based on piezoelectric elements designed to operate in downhole conditions. However, many other sources 1442, 1444 and detectors/receivers 1446 are suitable for downhole operation, and may be used.

Transmitter & Isolator

The transmitter and isolator section 1460 may include a monopole transmitter 1442, a pair of crossed-dipole transmitters 1444, and an acoustic isolation component 1465. The monopole transmitter 1442 may include a piezoelectric crystal of cylindrical geometry. The crystal may be mounted in an arrangement that allows the transmitted acoustic energy to be essentially uniform around the circumference of the tool. The monopole transmitter 1442 may be energized in the typical "pulsed" mode where a substantially pure monopole wave is emitted with a central frequency around about 5-6 kHz and energy throughout the frequency band between about 1 kHz to about 12 kHz. This central frequency is between approximately a third and a half of the monopole transmitter frequency of traditional monopole tools. The lower frequency results in a much greater depth of investigation for the P wave and refracted shear S wave. The monopole source 1442 may be utilized for derivation of the refracted arrivals from the full wave acquisition, i.e., the compressional wave velocity (as well as other associated properties such as energy, frequency content, and the like), the refracted shear wave velocity and the associated wave properties of the refracted shear wave, and the Stoneley wave velocity with parameters associated with the Stoneley wave. In various illustrative embodiments, the monopole transmitter 1442 may have the capability of being programmable so that the frequency of the monopole may be varied based on formation characteristics.

Each of the dipole transmitters 1444 may include two transducers mounted on opposite sides of the acoustic logging tool 1424. The crossed dipoles are mounted perpendicularly, so that, together, the crossed dipoles form an on-depth quad arrangement of transducers (similar to the receiver transducers shown in FIG. 15). Each of the four dipole transducers are preferably of the "bender bar" type, i.e., a flexible surface having piezoelectric crystals on opposing sides. As the crystal on one side is driven to elongate, the crystal on the opposite side is driven to shrink. This causes the assembly to flex. Acoustic signals are transmitted by flexing the surface at the desired frequencies. The signal frequency is programmable, but the transducers are preferably capable of signal frequencies between at least about 0.5 kHz to about 3 kHz. In various illustrative embodiments, the cross dipole transmitters 1444 may have the capability of being programmable so that the frequency of the monopole may also be varied based on formation characteristics.

The orthogonal positioning of the bender bar transducers allows for a controlled X-X and Y-Y flexural wave generation. The sources 1444 are mounted in a way such that very little energy is coupled into the acoustic logging tool 1424 housing assembly, thus minimizing the excitation of unwanted acoustic waves in the acoustic logging tool 1424 itself. In addition, the source 1444 mounting ensures that there is no cross-excitation from one pair of the bender bars to the other, thus ensuring a proper acoustic dipole signature.

Rigorous testing of various exemplary embodiments has been performed, both in laboratory settings utilizing large water tanks as well as in the Lake Travis test facility at the University of Texas, Austin. The tests have confirmed that the fully assembled source 1444 is a true dipole. Measurements in the test facilities have shown that the dipole transmitter 1444 design emits a true wave with X-X and Y-Y directional properties of at least about 25 dB to about 30 dB reduction from the maximum at the dipole lobes to the minimum at the cross axis points.

The acoustic isolator 1465 serves to attenuate and delay acoustic waves that propagate through the body of the acoustic logging tool 1424 from the sources 1442, 1444 to the receiver array 1446. Any standard acoustic isolator may be used, although a preferred isolator embodiment is described in co-pending U.S. patent application Ser. No. 10/007,955 (atty. dkt. #1391-27000), which is hereby incorporated by reference. This acoustic isolator 1465 provides two notable advantages: it can withstand 100,000 pounds force of push or pull, and it provides for more than 90 dB of acoustic isolation over an extended frequency range, extending as low as about 500 Hz to about 600 Hz.

In addition to the main isolator, additional acoustic wave isolators/absorbers (not shown) may be placed on the receiver section both at the ends and between successive receiver 1446 sets. Finally, the mounting of the dipole sources 1444 and the receivers 1446 themselves provides further isolation. The combination of all of the above has allowed this acoustic logging tool 1424 to acquire properly formation acoustic signals in the sub-kilohertz region, a region that is very close to the limit for the excitation of flexural waves. (The excitation function for the flexural waves exhibits a dramatic drop as the source frequency is reduced to the area of about 600 Hz to about 1 kHz; source operating frequencies below that level will excite predominantly tube waves with very little, if any, flexural wave components.)

Transmitter Electronics

When the main electronics section 1420 enables the operation of the acoustic logging tool 1424, the transmitter electronics 1480 controls the triggering and timing of the acoustic sources 1442, 1444. A controller in the transmitter electronics 1480 fires the acoustic sources 1442, 1444 periodically, thereby producing acoustic pressure waves that propagate through the borehole fluid and into the surrounding formation. At the borehole boundary, some of the acoustic energy is converted into P-waves that travel through the formation, and into shear S-waves that propagate along the interface between the borehole fluid and the formation, similar to the situation shown, for example, in FIG. 3. As these waves propagate past the receiver array 1446, these waves cause pressure variations that can be detected by the receiver array 1446 elements. The receiver array 1446 signals are preferably processed on the surface to determine the formation characteristics.

In various illustrative embodiments, as shown in FIG. 16, an adaptive equalization and matching method 1600 may be provided for adaptively equalizating receivers to reduce and/or substantially eliminate sensitivity mismatch. The adaptive equalization and matching method 1600 may comprise detecting arrival times of a first wave at each of a plurality of receivers, as indicated at 1610, determining a first place in a well when the arrival times of the first wave are substantially the same at each of the plurality of receivers, as indicated at 1620, and estimating effective receiver sensitivities and equalization factors for each of the plurality of receivers using a Stoneley wave amplitude received by the plurality of receivers at the first place in the well, as indicated at 1630. The adaptive equalization and matching method 1600 may also comprise correcting amplitudes of a second wave received by the plurality of receivers using the estimated effective receiver sensitivities and equalization factors for each of the plurality of receivers, as indicated at 1640.

In various illustrative embodiments, as shown in FIG. 17, an adaptive equalization and matching method 1700 may be provided for adaptively equalizating receivers to reduce and/or substantially eliminate sensitivity mismatch. The adaptive equalization and matching method 1700 may comprise detecting arrival times of a first wave comprising at least one of a compressional, a refracted shear, and a Stoneley wave at each of a plurality of receivers, as indicated at 1710, determining a first place in a well when the arrival times of the waves are substantially the same at each of the plurality of receivers, as indicated at 1720, and estimating effective receiver sensitivities and equalization factors for each of the plurality of receivers using a Stoneley wave amplitude received by the plurality of receivers at the first place in the well, as indicated at 1730. The adaptive equalization and matching method 1700 may also comprise correcting amplitudes of a second wave received by the plurality of receivers using the estimated effective receiver sensitivities and equalization factors for each of the plurality of receivers, as indicated at 1740.

In various illustrative embodiments, as shown in FIG. 18, an adaptive equalization and matching method 1800 may be provided for adaptively equalizating receivers to reduce and/or substantially eliminate sensitivity mismatch. The adaptive equalization and matching method 1800 may comprise detecting arrival times of a first wave comprising at least one of a compressional, a refracted shear, and a Stoneley wave at each of a plurality of receivers, as indicated at 1810, determining a first place in a well when the arrival times of the waves are substantially the same at each of the plurality of receivers, as indicated at 1820, and estimating effective receiver sensitivities and equalization factors for each of the plurality of receivers using windowed deconvolution of a Stoneley wave received by the plurality of receivers at the first place in the well, as indicated at 1830. The adaptive equalization and matching method 1800 may also comprise correcting amplitudes of a second wave received by the plurality of receivers using the estimated effective receiver sensitivities and equalization factors for each of the plurality of receivers, as indicated at 1840.

In various illustrative embodiments, the adaptive equalization and matching methods 1600, 1700, and 1800 may comprise detecting arrival times of a first wave at each of a plurality of receivers, as indicated at 1610, 1710, and 1810. For example, the arrival times, and specifically not the amplitudes, of a "classical" wave such as the compressional wave, the refracted shear wave, and/or the Stoneley wave may be detected at each one of a set of four azimuthal detectors, such as the four receivers 1446, as shown in FIG. 14 and described above. The four receivers 1446 are labeled A, B, C, and D in FIG. 20, for example. As shown in FIG. 19, for example, the arrival time 1910 of the classical wave at receiver A may be earlier, by an amount labeled $E_1$, than the arrival times 1930, 1960 of the classical wave at receivers B and D, whereas the arrival time 1950 of the classical wave at receiver C may be later, by an amount labeled $E_2$, than the arrival times 1930, 1960 of the classical wave at receivers B and D. The amounts $E_1$ and $E_2$ may be different from each other in various circumstances and may be substantially the same in various other circumstances. That the amounts $E_1$ and/or $E_2$ are different from zero may be taken as an indication that the acoustic logging tool 1424 may be off-center at position 2020 rather than centered at position 2030 (shown in phantom). In the off-center position 2020, the receiver A is closer to the generally cylindrical borehole interface 2010 than either of the receivers B and D, whereas the receiver C is further away from the generally cylindrical borehole interface 2010 than either of the receivers B and D. Consequently, when the acoustic logging tool 1424 is in the off-center position 2020, the arrival time 1910 of the classical wave at receiver A is earlier (by the amount $E_1$) than the arrival times 1930, 1960 of the classical wave at receivers B and D, and the arrival time 1950 of the classical wave at receiver C is later (by the amount $E_2$) than the arrival times 1930, 1960 of the classical wave at receivers B and D.

By contrast, at another location or depth of the well bore, as shown in phantom in FIG. 19, for example, the arrival time 1920 (shown in phantom) of the classical wave at receiver A may be substantially the same as the arrival times 1930, 1960 of the classical wave at receivers B and D, and the arrival time 1940 (shown in phantom) of the classical wave at receiver C may also be substantially the arrival times 1930, 1960 of the classical wave at receivers B and D. This may be taken as an indication that the acoustic logging tool 1424 may be substantially centered at position 2030 (shown in phantom). In the centered position 2030, the receiver A is substantially the same distance from the generally cylindrical borehole interface 2010 as both of the receivers B and D, and the receiver C is similarly substantially the same distance from the generally cylindrical borehole interface 2010 as both of the receivers B and D. Consequently, when the acoustic logging tool 1424 is in the centered position 2030, the arrival time 1920 (shown in phantom) of the classical wave at receiver A is substantially the same as the arrival times 1930, 1960 of the classical wave at receivers B and D, and the arrival time 1940 (shown in phantom) of the classical wave at receiver C is similarly substantially the same as the arrival times 1930, 1960 of the classical wave at receivers B and D.

Similarly, as shown in FIG. 21, for example, the arrival times 2110 and 2130 of the classical wave at receivers A and B may be earlier, by amounts labeled $E_1$ and $E_2$, respectively, than the arrival times 2120 and 2140 of the classical wave at receivers A and B (both shown in phantom) would have been if the acoustic logging tool 1424 had been centered, whereas the arrival times 2160 and 2180 of the classical wave at receivers C and D may be later, by amounts labeled $E_3$ and $E_4$, respectively, than the arrival times 2150 and 2170 of the classical wave at receivers C and D (both shown in phantom) would have been if the acoustic logging tool 1424 had been centered. The amounts $E_1$, $E_2$, $E_3$, and $E_4$ may all be different from each other in various circumstances and one or more of them may be substantially the same in various other circumstances. That the amounts $E_1$, $E_2$, $E_3$, and $E_4$ are different from zero may be taken as an indication that the acoustic logging tool 1424 may be off-center at position 2220 rather than centered at position 2230 (shown in phantom). In the off-center position 2220, the receivers A and B are closer to the generally cylindrical borehole interface 2210 than either of the receivers C and D, and, consequently, the receivers C and D are further away from the generally cylindrical borehole interface 2210 than either of the receivers A and B. Therefore, when the acoustic logging tool 1424 is in the off-center position 2220, the arrival time 2110 of the classical wave at receiver A is earlier (by the amounts $E_1+E_3$ and $E_1+E_4$) than the arrival times 2160 and 2180 of the classical wave at receivers C and D, and the arrival time 2130 of the classical wave at receiver B is earlier (by the amounts $E_2+E_3$ and $E_2+E_4$) than the arrival times 2160 and 2180 of the classical wave at receivers C and D.

In various illustrative embodiments, the adaptive equalization and matching methods 1600, 1700, and 1800 may also comprise determining a first place in a well when the arrival times of the first wave are substantially the same at each of the plurality of receivers, as indicated at 1620, 1720, and 1820. For example, the first place in the well where the acoustic logging tool 1424 is in the substantially centered position 2030, as shown in FIG. 20, may be determined by noting the first place in the well when the arrival times 1920, 1940 (shown in phantom in FIG. 19) of the classical wave at receivers A and C are substantially the same as the arrival times 1930, 1960 of the classical wave at receivers B and D, as described above. Similarly, the first place in the well where the acoustic logging tool 1424 is in the substantially centered position 2230, as shown in FIG. 22, may be determined by noting the first place in the well when the arrival times 2120, 2140 (shown in phantom in FIG. 21) of the classical wave at receivers A and B are substantially the same as the arrival times 2150, 2170 (shown in phantom in FIG. 21) of the classical wave at receivers C and D, as described above. In various illustrative embodiments, the adaptive equalization and matching methods 1600, 1700, and 1800 may further comprise determining subsequent places in the well when the arrival times of the first wave are substantially the same at each of the plurality of receivers. For example, the adaptive equalization and matching methods 1600, 1700, and 1800 may determine the next consecutive place in the well when the arrival times of the first wave are substantially the same at each of the plurality of receivers, and then the next consecutive place, and so forth.

In various illustrative embodiments, the adaptive equalization and matching methods 1600, 1700, and 1800 may also comprise estimating effective receiver sensitivities and equalization factors for each of the plurality of receivers using a Stoneley wave amplitude received by the plurality of receivers at the first place in the well when the arrival times of the first wave are substantially the same at each of the plurality of receivers, as indicated at 1630, 1730, and 1830. For example, at the first place in the well when the arrival times of the first wave are substantially the same at each of the plurality of receivers, the Stoneley wave amplitude, which is affected mainly by receiver sensitivity differences for a substantially centered tool, may be utilized to estimate effective receiver sensitivities and equalization factors $f_{rA}$, $f_{rB}$, $f_{rC}$, and $f_{rD}$ for each of the plurality of the receivers A, B, C, and D, respectively.

As shown in FIG. 23, for example, the Stoneley wave 2310 detected and received at receiver A may have an amplitude a whereas the same Stoneley wave 2320 detected and received at receiver B may have an amplitude b that is smaller than the amplitude a received at receiver A, at the first place in the well when the arrival times of the first wave are substantially the same at each of the plurality of receivers A and B. In various illustrative embodiments, the effective receiver sensitivity and equalization factors for receiver A and receiver B may be chosen so that $f_{rA}a = f_{rB}b$. For example, the effective receiver sensitivity and equalization factor for receiver A may be chosen so that $f_{rA}=1$, in which case the effective receiver sensitivity and equalization factor for receiver B may be estimated to be $$f_{rB} = \frac{a}{b}$$

so that $$f_{rB}b = \frac{a}{b}b = a = f_{rA}a,$$

when $f_{rA}=1$. Multiplying the signal detected and received at receiver B by $$f_{rB} = \frac{a}{b}$$

will balance and equalize the receivers A and B with respect to each other. For example, as shown in FIG. 23, when the amplitude b of the Stoneley wave 2320 detected and received at receiver B is multiplied by $$f_{rB} = \frac{a}{b},$$

then the Stoneley wave 2320 becomes the Stoneley wave 2330 (shown in phantom), which matches the Stoneley wave 2310, since $$f_{rB}b = \frac{a}{b}b = a = f_{rA}a, \text{ when } f_{rA} = 1.$$

In this way, the receiver sensitivities for receiver A and receiver B may be matched and equalized.

Similarly, in various illustrative embodiments, the effective receiver sensitivity and equalization factors for the receivers A, B, C, and D may be chosen so that $f_{rA}a = f_{rB}b = f_{rC}c = f_{rD}d$, where a is the amplitude of the Stoneley wave detected, and received at receiver A, b is the amplitude of the same Stoneley wave detected and received at receiver A, c is the amplitude of the same Stoneley wave detected and received at receiver C, and d is the amplitude of the same Stoneley wave detected and received at receiver D, at the first place in the well when the arrival times of the first wave are substantially the same at each of the plurality of receivers A, B, C, and D. For example, the effective receiver sensitivity and equalization factor for receiver A may be chosen so that $f_{rA}=1$, in which case the effective receiver sensitivities and equalization factors for receivers B, C, and D may be estimated to be $$f_{rB} = \frac{a}{b}, f_{rC} = \frac{a}{c}, \text{ and } f_{rD} = \frac{a}{d},$$

respectively, so that $$f_{rB}b = \frac{a}{b}b = a = f_{rA}a,$$

$$f_{rC}c = \frac{a}{c}c = a = f_{rA}a,$$

$$\text{and } f_{rD}d = \frac{a}{d}d = a = f_{rA}a,$$

when $f_{rA} = 1$.

Likewise, in various illustrative embodiments, the effective receiver sensitivity and equalization factors for a plurality of N receivers $A_n$, where n=1,2, . . . ,N, may be chosen so that $f_{rA_n}a_n = f_{rA_m}a_m$ for all n,m=1,2, . . . ,N, where $a_n$ is the amplitude of the Stoneley wave detected and received at receiver $A_n$ for n=1,2, . . . ,N, at the first place in the well when the arrival times of the first wave are substantially the same at each of the plurality of receivers $A_n$ for n=1,2, . . . ,N. For example, the effective receiver sensitivity and equalization factor for receiver $A_1$ may be chosen so that $f_{rA_1}=1$, in which case the effective receiver sensitivity and equalization factors for receivers $A_n$ for n=2,3, . . . ,N may be estimated to be $$f_{rA_n} = \frac{a_1}{a_n}$$

for all n=1,2, . . . ,N, so that $$f_{rA_n} a_n = \frac{a_1}{a_n} a_n = a_1 = f_{rA_1} a_1$$

for all n=1,2, . . . ,N, when $f_{rA_1}$=1. Alternatively, the effective receiver sensitivity and equalization factor for receiver $A_N$ may be chosen so that $f_{rA_N}$=1, in which case the effective receiver sensitivity and equalization factors for receivers $A_n$ for n=1,2, . . . ,N−1 may be estimated to be $$f_{rA_n} = \frac{a_N}{a_n}$$

for all n=1,2, . . . ,N, so that $$f_{rA_n} a_n = \frac{a_N}{a_n} a_n = a_N = f_{rA_N} a_N$$

for all n=1,2, . . . ,N, when $f_{rA_N}$=1. Similarly, the effective receiver sensitivity and equalization factor for any receiver $A_k$ where k=1,2, . . . ,N may be chosen so that $f_{rA_k}$=1, in which case the effective receiver sensitivity and equalization factors for receivers $A_n$ for n=1,2, . . . ,k−1,k+1, . . . ,N may be estimated to be $$f_{rA_n} = \frac{a_k}{a_n}$$

for all n=1,2, . . . ,N, so that $$f_{rA_n} a_n = \frac{a_k}{a_n} a_n = a_k = f_{rA_k} a_k$$

for all n=1,2, . . . ,N, when $f_{rA_k}$=1.

In various illustrative embodiments, the adaptive equalization and matching methods 1600, 1700, and 1800 may also comprise correcting amplitudes of a second wave received by the plurality of receivers using the estimated effective receiver sensitivities and equalization factors for each of the plurality of receivers, as indicated at 1640, 1740, and 1840. For example, the effective receiver sensitivity and equalization factors $f_{rA_n}$ for a plurality of N receivers $A_n$ where n=1,2, . . . ,N may be chosen so that $f_{rA_n} a_n = f_{rA_m} a_m$ for all n,m=$$ 1,2, . . . ,N, where $a_n$ is the amplitude of the Stoneley wave detected and received at receiver $A_n$ for n=1,2, . . . ,N, at the first place in the well when the arrival times of the first wave are substantially the same at each of the plurality of receivers $A_n$ for n=1,2, . . . ,N, as described above. Subsequently, these effective receiver sensitivity and equalization factors $f_{rA_n}$ for n=1,2, . . . ,N may be used to correct the amplitudes of all waves received at the plurality of N receivers $A_n$ for n=1,2, . . . ,N, at least until the next substantially centered or essentially centered place or spot in the well is located.

For example, as shown in FIG. 24, the dipole component 2410 (shown in phantom) of a wave received at the receivers A, B, C, and D may be detected by detecting the positive displacement of the borehole fluid in one direction at receiver A and the substantially equal but negative displacement in the opposite direction at receiver C, with substantially no positive or negative displacement detected at either of the receivers B and D. The radiation pattern of the dipole component 2410 of the pressure detected in the borehole 2420 is illustrated in FIG. 24, and may correspond to the X dipole transmitter radiation pattern 8302*a* of the pressure generated in the borehole by the dipole source 8304*a* illustrated in FIG. 8*a*, for example. That there may be substantially no positive or negative displacement detected at either of the receivers B and D may be due to isotropic formation conditions, for example, and in a formation with anisotropy, there may be some positive and/or negative displacement detected at either of the receivers B and D. The X dipole transmitter may be pulsed and may create a radiation pattern. In an isotropic formation, there may be minimal received signal in the cross-axis receivers B and D. In a formation with anisotropy, the magnitude of the received signal in the cross-axis receivers B and D may be related to the magnitude of the anisotropy, the orientation of the anisotropy, and/or the orientation of the acoustic logging tool, such as the acoustic logging tool 1424, for example.

The total uncorrected amplitude of the wave received at receiver A may be given by $a_{total}=(a_{monopole}+a_{dipole}+a_{quadrupole}+ \ldots )$ and the total uncorrected amplitude of the wave received at receiver C may be given by $c_{total}=(c_{monopole}+c_{dipole}+c_{quadrupole}+ \ldots )$. The energy of the monopole components $a_{monopole}$ and $c_{monopole}$ of the wave (generally proportional to the intensity, the square of the amplitude) is typically at least about 10 to about 100 times greater than the energy of the dipole components $a_{dipole}$ and $c_{dipole}$ of the wave. In order to increase the sensitivity to the less energetic dipole components $a_{dipole}$ and $c_{dipole}$ of the wave, the amplitude $c_{total}$ of the wave received at receiver C may be subtracted from the amplitude $a_{total}$ of the wave received at receiver A, giving $a_{total}-c_{total}=[(a_{monopole}-c_{monopole})+(a_{dipole}-c_{dipole})+]$. If the uncorrected amplitudes are used, then it is quite likely that the first term $(a_{monopole}-c_{monopole})$ will be non-zero and may well still be about the same size or even bigger than the term of interest, the dipole term $(a_{dipole}-c_{dipole})$.

However, if the corrected amplitudes are used, where $a_{total}^{corrected}=f_{rA}a_{total}=f_{rA}(a_{monopole}+a_{dipole}+a_{quadrupole}+ \ldots )$ and $c_{total}^{corrected}=f_{rC}c_{total}=f_{rC}(c_{monopole}+c_{dipole}+c_{quadrupole}+ \ldots )$, with $f_{rA}$ and $f_{rC}$ chosen as described above so that $f_{rA}a_{monopole}=f_{rC}c_{monopole}=M_p$, then the difference between the corrected amplitudes becomes $$\begin{aligned} a_{total}^{corrected} - c_{total}^{corrected} &= [(f_{rA}a_{monopole} - f_{rC}c_{monopole}) + \\ &\quad (f_{rA}a_{dipole} - f_{rC}c_{dipole}) + \ldots ] \\ &= [(M_p - M_p) + (f_{rA}a_{dipole} - f_{rC}c_{dipole}) + \ldots ] \\ &= [2f_{rA}a_{dipole} + \ldots ] \\ &= [2D_p + \ldots ], \end{aligned}$$

since $f_{rA}a_{dipole}=-f_{rC}c_{dipole}=D_p$. Consequently, using the corrected amplitudes enables greater accuracy and sensitivity in detecting the dipole component of the wave received at receivers A and C.

Similarly, as shown in FIG. 25, the dipole component 2510 (shown in phantom) of a wave received at the receivers A, B, C, and D may be detected by detecting the positive displacement of the borehole fluid in one direction at receiver D and the substantially equal but negative displacement in the opposite direction at receiver B, with substantially no positive or negative displacement detected at either of the receivers A and C. The radiation pattern of the dipole component 2510 of the pressure detected in the borehole 2520 is illustrated in FIG. 25, and may correspond to the Y dipole transmitter radiation pattern 8302b of the pressure generated in the borehole by the dipole source 8304b illustrated in FIG. 8b, for example. That there may be substantially no positive or negative displacement detected at either of the receivers A and C may be due to isotropic formation conditions, for example, and in a formation with anisotropy, there may be some positive and/or negative displacement detected at either of the receivers A and C. The Y dipole transmitter may be pulsed and may create a radiation pattern. In an isotropic formation, there may be minimal received signal in the cross-axis receivers A and C. In a formation with anisotropy, the magnitude of the received signal in the cross-axis receivers A and C may be related to the magnitude of the anisotropy, the orientation of the anisotropy, and/or the orientation of the acoustic logging tool, such as the acoustic logging tool 1424, for example.

The total uncorrected amplitude of the wave received at receiver D may be given by $d_{total}=(d_{monopole}+d_{dipole}+d_{quadrupole}+\ldots)$ and the total uncorrected amplitude of the wave received at receiver B may be given by $b_{total}=(b_{monopole}+b_{dipole}+b_{quadrupole}+\ldots)$. The energy of the monopole components $d_{monopole}$ and $b_{monopole}$ of the wave (generally proportional to the intensity, the square of the amplitude) is typically at least about 10 to about 100 times greater than the energy of the dipole components $d_{dipole}$ and $b_{dipole}$ of the wave. In order to increase the sensitivity to the less energetic dipole components $d_{dipole}$ and $b_{dipole}$ of the wave, the amplitude $b_{total}$ of the wave received at receiver B may be subtracted from the amplitude $d_{total}$ of the wave received at receiver D, giving $d_{total}-b_{total}=[(d_{monopole}-b_{monopole})+(d_{dipole}-b_{dipole})+\ldots]$. If the uncorrected amplitudes are used, then it is quite likely that the first term $(d_{monopole}-b_{monopole})$ will be non-zero and may well still be about the same size or even bigger than the term of interest, the dipole term $(d_{dipole}-b_{dipole})$.

However, if the corrected amplitudes are used, where $d_{total}^{corrected}=f_{rD}d_{total}=f_{rD}(d_{monopole}+d_{dipole}+d_{quadrupole}+\ldots)$ and $b_{total}^{corrected}=f_{rB}b_{total}=f_{rB}(b_{monopole}+b_{dipole}+b_{quadrupole}+\ldots)$ with $f_{rD}$ and $f_{rB}$ chosen as described above so that $f_{rD}d_{monopole}=f_{rB}b_{monopole}=M_p$, then the difference between the corrected amplitudes becomes $$\begin{aligned}d_{total}^{corrected}-b_{total}^{corrected} &= [(f_{rD}d_{monopole}-f_{rB}b_{monopole})+ \\ &\quad (f_{rD}d_{dipole}-f_{rB}b_{dipole})+\ldots] \\ &= [(M_p-M_p)+(f_{rD}d_{dipole}-f_{rB}b_{dipole})+\ldots] \\ &= [2f_{rD}d_{dipole}+\ldots] \\ &= [2D_p+\ldots],\end{aligned}$$

since $f_{rD}d_{dipole}=-f_{rB}b_{dipole}=D_p$. Consequently, using the corrected amplitudes enables greater accuracy and sensitivity in detecting the dipole component of the wave received at receivers D and B.

Likewise, as shown in FIG. 26, the quadrupole component 2610 (shown in phantom) of a wave received at the receivers A, B, C, and D may be detected by detecting the positive displacement of the borehole fluid in one direction at receivers A and C and the substantially equal but negative displacement in the opposite direction at receivers B and D. The radiation pattern of the quadrupole component 2610 of the pressure detected in the borehole 2620 is illustrated in FIG. 26, corresponding to the radiation pattern 9306 of the pressure generated in the borehole by the quadrupole source 9308 illustrated in FIG. 9, for example.

The energy of the dipole components $a_{dipole}$, $b_{dipole}$, $c_{dipole}$, and $d_{dipole}$ of the wave (generally proportional to the intensity, the square of the amplitude) is typically at least about 10 to about 100 times greater than the energy of the quadrupole components $a_{quadrupole}$, $b_{quadrupole}$, $c_{quadrupole}$, and $d_{quadrupole}$ of the wave. In order to increase the sensitivity to the less energetic quadrupole components $a_{quadrupole}$, $b_{quadrupole}$, $c_{quadrupole}$, and $d_{quadrupole}$ of the wave, the amplitudes $b_{total}$ and $d_{total}$ of the wave received at receivers B and D may be subtracted from the sum of the amplitudes $a_{total}$ and $c_{total}$ of the wave received at receivers A and C, giving $$\begin{aligned}a_{total}+c_{total}-b_{total}-d_{total}&=[(a_{monopole}+c_{monopole}-\\ &\quad b_{monopole}-d_{monopole})+(a_{dipole}+c_{dipole}-b_{dipole}-\\ &\quad d_{dipole})+(a_{quadrupole}+c_{quadrupole}-b_{quadrupole}-\\ &\quad d_{quadrupole})+\ldots].\end{aligned}$$

If the uncorrected amplitudes are used, then it is quite likely that the first term $(a_{monopole}+c_{monopole}-b_{monopole}-d_{monopole})$ and the second term $(a_{dipole}+c_{dipole}-b_{dipole}-d_{dipole})$ will both be non-zero and may well still be about the same size or even bigger than the term of interest, the quadrupole term $(a_{quadrupole}+c_{quadrupole}-b_{quadrupole}-d_{quadrupole})$.

However, if the corrected amplitudes are used, with $f_{rA}$, $f_{rB}$, $f_{rC}$, and $f_{rD}$ chosen as described above so that $f_{rA}a_{monopole}=f_{rB}b_{monopole}=f_{rC}c_{monopole}=f_{rD}d_{monopole}=M_p$ and $f_{rA}a_{dipole}=f_{rC}c_{dipole}=D_p$, with $f_{rD}d_{dipole}=f_{rB}b_{dipole}=0$, then the difference between the corrected amplitudes becomes $$\begin{aligned}a_{total}^{corrected}+c_{total}^{corrected}-& \\ b_{total}^{corrected}-d_{total}^{corrected} &= [(f_{rA}a_{monopole}+f_{rC}c_{monopole}- \\ &\quad f_{rB}b_{monopole}-f_{rD}d_{monopole})+(f_{rA}a_{dipole}+ \\ &\quad f_{rC}c_{dipole}-f_{rB}b_{dipole}-f_{rD}d_{dipole})+ \\ &\quad (f_{rA}a_{quadrupole}+f_{rC}c_{quadrupole}- \\ &\quad f_{rB}b_{quadrupole}-f_{rD}d_{quadrupole})+\ldots] \\ &= [(M_p+M_p-M_p-M_p)+ \\ &\quad (D_p-D_p+0-0)+ \\ &\quad (f_{rA}a_{quadrupole}+f_{rC}c_{quadrupole}- \\ &\quad f_{rB}b_{quadrupole}-f_{rD}d_{quadrupole})+\ldots] \\ &= [4f_{rA}a_{quadrupole}+\ldots] \\ &= [4Q_p+\ldots],\end{aligned}$$

since $f_{rA}a_{quadrupole}=f_{rC}c_{quadrupole}=-f_{rB}b_{quadrupole}=f_{rD}d_{quadrupole}=Q_p$. Consequently, using the corrected amplitudes enables greater accuracy and sensitivity in detecting the quadrupole component of the wave received at receivers A, B, C and D.

Similarly, as shown in FIG. 27, the sextupole component 2710 (shown in phantom) of a wave received at the receivers A, B, C, D, E, and F may be detected by detecting the positive displacement of the borehole fluid in one direction at receivers A, C, and E and the substantially equal but negative displacement in the opposite direction at receivers B, D, and F. The radiation pattern of the sextupole component 2710 of the pressure detected in the borehole 2720 is illustrated in FIG. 27, corresponding to the radiation pattern 10310 of the pressure generated in the borehole by the quadrupole source 10312 illustrated in FIG. 10, for example.

The energy of the quadrupole components $a_{quadrupole}$, $b_{quadrupole}$, $c_{quadrupole}$, $d_{quadrupole}$, $e_{quadrupole}$, and $f_{quadrupole}$ of the wave (generally proportional to the intensity, the square of the amplitude) is typically at least about 10 to about 100 times greater than the energy of the sextupole components $a_{sextupole}$, $b_{sextupole}$, $c_{sextupole}$, $d_{sextupole}$, $e_{sextupole}$, and $f_{sextupole}$ of the wave. In order to increase the sensitivity to the less energetic sextupole components $a_{sextupole}$, $b_{sextupole}$, $c_{sextupole}$, $d_{sextupole}$, $e_{sextupole}$, and $f_{sextupole}$ of the wave, the amplitudes $d_{total}$, $f_{total}$, and $b_{total}$ of the wave received at receivers D, F, and B may be subtracted from the sum of the amplitudes $a_{total}$, $c_{total}$, and $e_{total}$ of the wave received at receivers A, C, and E, giving $$a_{total} + c_{total} + e_{total} - d_{total} -$$
$$f_{total} - b_{total} = [(a_{monopole} + c_{monopole} + e_{monopole} -$$
$$d_{monopole} - f_{monopole} - b_{monopole}) +$$
$$(a_{dipole} + c_{dipole} + e_{dipole} - d_{dipole} - f_{dipole} - b_{dipole}) + (a_{quadrupole} +$$
$$c_{quadrupole} + e_{quadrupole} - d_{quadrupole} - f_{quadrupole} - b_{quadrupole}) +$$
$$(a_{sextupole} + c_{sextupole} + e_{sextupole} - d_{sextupole} - f_{sextupole} - b_{sextupole}) + \ldots].$$

If the uncorrected amplitudes are used, then it is quite likely that the first term ($a_{monopole} + c_{monopole} + e_{monopole} - d_{monopole} - f_{monopole} - b_{monopole}$), the second term ($a_{dipole} + c_{dipole} + e_{dipole} - d_{dipole} - f_{dipole} - b_{dipole}$), and the third term ($a_{quadrupole} + c_{quadrupole} + e_{quadrupole} - d_{quadrupole} - f_{quadrupole} - b_{quadrupole}$) will all be non-zero and may well still be about the same size or even bigger than the term of interest, the sextupole term ($a_{sextupole} + c_{sextupole} + e_{sextupole} - d_{sextupole} - f_{sextupole} - b_{sextupole}$).

However, if the corrected amplitudes are used, with $f_{rA}$, $g_{rB}$, $f_{rC}$, $f_{rD}$, $f_{rE}$, and $f_{rF}$ chosen as described above so that $f_{rA}a_{monopole} = f_{rB}b_{monopole} = f_{rC}c_{monopole} = f_{rD}d_{monopole} = f_{rE}e_{monopole} = f_{rF}f_{monopole} = M_p$, $f_{rA}a_{dipole} = 2f_{rB}b_{dipole} = 2f_{rC}c_{dipole} = f_{rD}d_{dipole} = 2f_{rE}e_{dipole} = 2f_{rF}f_{dipole} = D_p$, and $f_{rA}a_{quadrupole} = 2f_{rB}b_{quadrupole} = 2f_{rC}c_{quadrupole} = f_{rD}d_{quadrupole} = 2f_{rE}e_{quadrupole} = 2f_{rF}f_{quadrupole} = Q_p$, then the difference between the corrected amplitudes becomes $$a_{total}^{corrected} + c_{total}^{corrected} + e_{total}^{corrected} - b_{total}^{corrected} -$$
$$d_{total}^{corrected} - f_{total}^{corrected} = [(f_{rA}a_{monopole} + f_{rC}c_{monopole} +$$
$$f_{rE}e_{monopole} - f_{rB}b_{monopole} - f_{rD}d_{monopole} - f_{rF}f_{monopole}) +$$
$$(f_{rA}a_{dipole} + f_{rC}c_{dipole} + f_{rE}e_{dipole} - f_{rB}b_{dipole} - f_{rD}d_{dipole} -$$
$$f_{rF}f_{dipole}) + (f_{rA}a_{quadrupole} + f_{rC}c_{quadrupole} + f_{rE}e_{quadrupole} -$$
$$f_{rB}b_{quadrupole} - f_{rD}d_{quadrupole} - f_{rF}f_{quadrupole}) +$$
$$(f_{rA}a_{sextupole} + f_{rC}c_{sextupole} + f_{rE}e_{sextupole} - f_{rB}b_{sextupole} - f_{rD}d_{sextupole} -$$
$$f_{rF}f_{sextupole}) + \ldots] = [(M_p + M_p + M_p - M_p - M_p - M_p) +$$
$$\left(D_p - \frac{1}{2}D_p - \frac{1}{2}D_p + \frac{1}{2}D_p - D_p + \frac{1}{2}D_p\right) +$$
$$\left(Q_p - \frac{1}{2}Q_p - \frac{1}{2}Q_p + Q_p - \frac{1}{2}Q_p - \frac{1}{2}Q_p\right) +$$
$$(f_{rA}a_{sextupole} + f_{rC}c_{sextupole} + f_{rE}e_{sextupole} -$$
$$f_{rB}b_{sextupole} - f_{rD}d_{sextupole} - f_{rF}f_{sextupole}) +$$
$$\ldots] = [6f_{rA}a_{sextupole} + \ldots] = [6S_p + \ldots],$$

since $f_{rA}a_{sextupole} = f_{rC}c_{sextupole} = f_{rE}e_{sextupole} = -f_{rB}b_{sextupole} = f_{rD}d_{sextupole} = -f_{rF}f_{sextupole} = S_p$. Consequently, using the corrected amplitudes enables greater accuracy and sensitivity in detecting the sextupole component of the wave received at receivers A, B, C, D, E, and F.

Likewise, as shown in FIG. 28, the octupole component 2810 (shown in phantom) of a wave received at the receivers A, B, C, D, E, F, G and H may be detected by detecting the positive displacement of the borehole fluid in one direction at receivers A, C, E, and G and the substantially equal but negative displacement in the opposite direction at receivers B, D, F, and H. The radiation pattern of the quadrupole component 2810 of the pressure detected in the borehole 2820 is illustrated in FIG. 28, corresponding to the radiation pattern 11314 of the pressure generated in the borehole by the quadrupole source 11316 illustrated in FIG. 11, for example.

The energy of the sextupole components $a_{sextupole}$, $b_{sextupole}$, $c_{sextupole}$, $d_{sextupole}$, $e_{sextupole}$, $f_{sextupole}$, $g_{sextupole}$, and $h_{sextupole}$ of the wave (generally proportional to the intensity, the square of the amplitude) is typically at least about 10 to about 100 times greater than the energy of the octupole components $a_{octupole}$, $b_{octupole}$, $c_{octupole}$, $d_{octupole}$, $e_{octupole}$, $f_{octupole}$, $g_{octupole}$, and $h_{octupole}$ of the wave. In order to increase the sensitivity to the less energetic octupole components $a_{octupole}$, $b_{octupole}$, $c_{octupole}$, $d_{octupole}$, $e_{octupole}$, $f_{octupole}$, $g_{octupole}$, and $h_{octupole}$ of the wave, the amplitudes $b_{total}$, $d_{total}$, $f_{total}$, and $h_{total}$ of the wave received at receivers B, D, F, and H may be subtracted from the sum of the amplitudes $a_{total}$, $c_{total}$, $e_{total}$, and $g_{total}$ of the wave received at receivers A, C, E, and G, giving $$a_{total} + c_{total} + e_{total} + g_{total} - b_{total} - d_{total} -$$
$$f_{total} - h_{total} = [(a_{monopole} + c_{monopole} + e_{monopole} +$$
$$g_{monopole} - b_{monopole} - d_{monopole} - f_{monopole} - h_{monopole}) +$$
$$(a_{dipole} + c_{dipole} + e_{dipole} + g_{dipole} - b_{dipole} - d_{dipole} - f_{dipole} - h_{dipole}) +$$
$$(a_{quadrupole} + c_{quadrupole} + e_{quadrupole} + g_{quadrupole} -$$
$$b_{quadrupole} - d_{quadrupole} - f_{quadrupole} - h_{quadrupole}) +$$
$$(a_{sextupole} + c_{sextupole} + e_{sextupole} + g_{sextupole} - b_{sextupole} - d_{sextupole} -$$
$$f_{sextupole} - h_{sextupole}) + (a_{octupole} + c_{octupole} + e_{octupole} +$$
$$g_{octupole} - b_{octupole} - d_{octupole} - f_{octupole} - h_{octupole}) + \ldots].$$

If the uncorrected amplitudes are used, then it is quite likely that the first term ($a_{monopole} + c_{monopole} + e_{monopole} + g_{monopole} -$ $b_{monopole}-d_{monopole}-f_{monopole}-h_{monopole}$), the second term ($a_{dipole}+c_{dipole}+e_{dipole}+g_{dipole}-b_{dipole}-d_{dipole}-f_{dipole}-h_{dipole}$), the third term ($a_{quadrupole}+c_{quadrupole}+e_{quadrupole}+g_{quadrupole}-b_{quadrupole}-d_{quadrupole}-f_{quadrupole}-h_{quadrupole}$), and the fourth term ($a_{sextupole}+c_{sextupole}+e_{sextupole}+g_{sextupole}-b_{sextupole}-d_{sextupole}-f_{sextupole}-h_{sextupole}$) will all be non-zero and may well still be about the same size or even bigger than the term of interest, the octupole term ($a_{octupole}+c_{octupole}+e_{octupole}+g_{octupole}-b_{octupole}-d_{octupole}-f_{octupole}-h_{octupole}$).

However, if the corrected amplitudes are used, with $f_{rA}$, $f_{rB}$, $f_{rC}$, $f_{rD}$, $f_{rE}$, $f_{rF}$, $f_{rG}$, and $f_{rH}$ chosen as described above so that $f_{rA}a_{monopole}=f_{rB}b_{monopole}=f_{rC}c_{monopole}=f_{rD}d_{monopole}=M_p$ and $f_{rE}e_{monopole}=f_{rF}f_{monopole}=f_{rG}g_{monopole}=f_{rH}h_{monopole}=M_p$, $f_{rA}a_{dipole}=\sqrt{2}f_{rB}b_{dipole}=\sqrt{2}f_{rD}d_{dipole}=-f_{rE}e_{dipole}=\sqrt{2}f_{rF}f_{dipole}=\sqrt{2}f_{rH}h_{dipole}=D_p$, with $c_{dipole}=g_{dipole}=0$, $f_{rA}a_{quadrupole}=-f_{rC}c_{quadrupole}=f_{rE}e_{quadrupole}=f_{rG}g_{quadrupole}=Q_p$, with $b_{quadrupole}=d_{quadrupole}=f_{quadrupole}=h_{quadrupole}=0$, and $f_{rA}a_{sextupole}=-\sqrt{2}f_{rB}b_{sextupole}=\sqrt{2}f_{rD}d_{sextupole}=-f_{rE}e_{sextupole}=\sqrt{2}f_{rF}f_{sextupole}=-\sqrt{2}f_{rH}h_{sextupole}=S_p$, with $c_{sextupole}=g_{sextupole}=0$, then the difference between the corrected amplitudes becomes $$a_{total}^{corrected} + c_{total}^{corrected} + e_{total}^{corrected} + g_{total}^{corrected} - b_{total}^{corrected} - d_{total}^{corrected} - f_{total}^{corrected} - h_{total}^{corrected} = \left[ \begin{pmatrix} f_{rA}a_{monopole} + f_{rC}c_{monopole} + f_{rE}e_{monopole} + \\ f_{rG}g_{monopole} - f_{rB}b_{monopole} - f_{rD}d_{monopole} - \\ f_{rF}f_{monopole} - f_{rH}h_{monopole} \end{pmatrix} + \right.$$

$$\begin{pmatrix} f_{rA}a_{dipole} + f_{rC}c_{dipole} + f_{rE}e_{dipole} + f_{rG}g_{dipole} - \\ f_{rB}b_{dipole} - f_{rD}d_{dipole} - f_{rF}f_{dipole} - f_{rH}h_{dipole} \end{pmatrix} +$$

$$\begin{pmatrix} f_{rA}a_{quadrupole} + f_{rC}c_{quadrupole} + f_{rE}e_{quadrupole} + f_{rG}g_{quadrupole} - \\ f_{rB}b_{quadrupole} - f_{rD}d_{quadrupole} - f_{rF}f_{quadrupole} - f_{rH}h_{quadrupole} \end{pmatrix} +$$

$$\begin{pmatrix} f_{rA}a_{sextupole} + f_{rC}c_{sextupole} + f_{rE}e_{sextupole} + f_{rG}g_{sextupole} - \\ f_{rB}b_{sextupole} - f_{rD}d_{sextupole} - f_{rF}f_{sextupole} - f_{rH}h_{sextupole} \end{pmatrix} +$$

$$\begin{pmatrix} f_{rA}a_{octupole} + f_{rC}c_{octupole} + f_{rE}e_{octupole} + f_{rG}g_{octupole} - \\ f_{rB}b_{octupole} - f_{rD}d_{octupole} - f_{rF}f_{octupole} - f_{rH}h_{octupole} \end{pmatrix} +$$

$$\ldots \left. \right] = \left[ (M_p + M_p + M_p + M_p - M_p - M_p - M_p - M_p) + \right.$$

$$\left( D_p - D_p - \frac{\sqrt{2}}{2}D_p + \frac{\sqrt{2}}{2}D_p + \frac{\sqrt{2}}{2}D_p - \frac{\sqrt{2}}{2}D_p \right) +$$

$$(Q_p - Q_p + Q_p - Q_p) +$$

$$\left( S_p - S_p + \frac{\sqrt{2}}{2}S_p - \frac{\sqrt{2}}{2}S_p - \frac{\sqrt{2}}{2}S_p + \frac{\sqrt{2}}{2}S_p \right) +$$

$$\begin{pmatrix} f_{rA}a_{octupole} + f_{rC}c_{octupole} + f_{rE}e_{octupole} + f_{rG}g_{octupole} - \\ f_{rB}b_{octupole} - f_{rD}d_{octupole} - f_{rF}f_{octupole} - f_{rH}h_{octupole} \end{pmatrix} +$$

$$\ldots \left. \right] = [8f_{rA}a_{octupole} + \ldots] = [8O_p + \ldots],$$

since $f_{rA}a_{octupole}=f_{rC}c_{octupole}=f_{rE}e_{octupole}=f_{rG}g_{octupole}=O_p$ and $f_{rB}b_{octupole}=f_{rD}d_{octupole}=f_{rF}f_{octupole}=f_{rH}h_{octupole}=-O_p$. Consequently, using the corrected amplitudes enables greater accuracy and sensitivity in detecting the octupole component of the wave received at receivers A, B, C, D, E, F, G, and H.

Generally, the (2p)-tupole component of a wave received at the receivers $A_1, A_2, A_3, A_4, \ldots, A_{2D-3}, A_{2D-2}, A_{2D-1}, A_{2D}$ may be detected by detecting the positive displacement of the borehole fluid in one direction at an appropriate subset (which may be the whole set itself or the empty set) of the receivers $A_1, A_2, A_3, A_4, \ldots, A_{2D-3}, A_{2D-2}, A_{2D-1}, A_{2D}$, and the substantially equal but negative displacement in the opposite direction at another appropriate complementary subset of the receivers $A_1, A_2, A_3, A_4, \ldots, A_{2D-3}, A_{2D-2}, A_{2D-1}, A_{2D}$, where the 2D receivers $A_1, A_2, \ldots, A_{2D}$ with $D \geq p$ are disposed at respective positions $$\frac{(d-1)\pi}{D},$$

where $d=1,2,3,\ldots,2D$, in the clockwise direction of increasing $\theta$, as shown in FIG. 28. For example, the (2D)-tupole component of a wave received at the receivers $A_1, A_2, A_3, A_4, \ldots, A_{2D-3}, A_{D3-2}, A_{2D-1}, A_{2D}$ may be detected by detecting the positive displacement of the borehole fluid in one direction at receivers $A_1, A_3, \ldots, A_{2D-3}, A^{2D-1}$, and the substantially equal but negative displacement in the opposite direction at receivers $A_2, A_4, \ldots, A_{2D-2}, A_{2D}$.

For p=0, the (2p)-tupole component of a wave is the monopole component, and the monopole component of the wave may be detected by detecting the positive displacement of the borehole fluid in one direction at all of the receivers $A_1, A_2, A_3, A_4, \ldots, A_{2D-3}, A_{2D-2}, A_{2D-1}, A_{2D}$, so that an appropriate subset in this case is the whole set of receivers itself. For p=1, the (2p)-tupole component of the wave is the dipole component, and the dipole component of the wave may be detected by detecting the positive displacement of the borehole fluid in one direction at half of the receivers $$A_1, A_2, \ldots, A_{\lfloor \frac{D}{2}+1 \rfloor}$$

(where $$\left\lfloor \frac{D}{2}+1 \right\rfloor$$

is the greatest integer that is less than or equal to $$\frac{D}{2}+1,$$

so that $$\left\lfloor \frac{3}{2}+1 \right\rfloor = \left\lfloor 2+\frac{1}{2} \right\rfloor = 2 \text{ and } \left\lfloor \frac{5}{2}+1 \right\rfloor = \left\lfloor 3+\frac{1}{2} \right\rfloor = 3,$$

for example) and $$A_{\lfloor \frac{3D}{2}+2 \rfloor}, A_{\lfloor \frac{3D}{2}+3 \rfloor}, \ldots, A_{2D}$$

where this latter subset may be the empty set, if $$2D < \left\lfloor \frac{3D}{2} + 2 \right\rfloor,$$

for example, as when D=2 and there are only 4 receivers), and by detecting the negative displacement of the borehole fluid in the opposite direction at the other half of the receivers $$A_{\lfloor \frac{D}{2}+2 \rfloor}, A_{\lfloor \frac{D}{2}+3 \rfloor}, \ldots, A_{\lfloor \frac{3D}{2}+1 \rfloor},$$

using appropriate corresponding subsets of the receivers.

For p=2, the (2p)-tupole component of the wave is the quadrupole component, and the quadrupole component of the wave may be detected by detecting the positive displacement of the borehole fluid in one direction at half of the receivers $$A_1, A_2, \ldots, A_{\lfloor \frac{D}{4}+1 \rfloor}, A_{\lfloor \frac{3D}{4}+2 \rfloor}, A_{\lfloor \frac{3D}{4}+3 \rfloor}, \ldots, A_{\lfloor \frac{5D}{4}+1 \rfloor}, \text{ and}$$

$$A_{\lfloor \frac{7D}{4}+2 \rfloor}, A_{\lfloor \frac{7D}{4}+3 \rfloor}, \ldots, A_{2D}$$

where this latter subset may be the empty set, if $$2D < \left\lfloor \frac{7D}{4} + 2 \right\rfloor,$$

for example, as when D=2 and there are only 4 receivers, or D=3 and there are only 6 receivers, or D=4 and there are only 8 receivers), and by detecting the negative displacement of the borehole fluid in the opposite direction at the other half of the receivers $$A_{\lfloor \frac{D}{4}+2 \rfloor}, A_{\lfloor \frac{D}{4}+3 \rfloor}, \ldots, A_{\lfloor \frac{3D}{4}+1 \rfloor} \text{ and } A_{\lfloor \frac{5D}{4}+2 \rfloor}, A_{\lfloor \frac{5D}{4}+3 \rfloor}, \ldots, A_{\lfloor \frac{7D}{4}+1 \rfloor},$$

using appropriate corresponding subsets of the receivers. For p=3 the (2p)-tupole component of the wave is the sextupole component, and the sextupole component of the wave may be detected by detecting the positive displacement of the borehole fluid in one direction at half of the receivers $$A_1, A_2, \ldots, A_{\lfloor \frac{D}{6}+1 \rfloor}, A_{\lfloor \frac{3D}{6}+2 \rfloor}, A_{\lfloor \frac{3D}{6}+3 \rfloor}, \ldots, A_{\lfloor \frac{5D}{6}+1 \rfloor}, A_{\lfloor \frac{7D}{6}+2 \rfloor},$$

$$A_{\lfloor \frac{7D}{6}+3 \rfloor}, \ldots, A_{\lfloor \frac{9D}{6}+1 \rfloor}, \text{ and } A_{\lfloor \frac{11D}{6}+2 \rfloor}, A_{\lfloor \frac{11D}{6}+3 \rfloor}, \ldots, A_{2D},$$

(where this latter subset may be the empty set, if $$2D < \left\lfloor \frac{11D}{6} + 2 \right\rfloor,$$

for example), and by detecting the negative displacement of the borehole fluid in the opposite direction at the other half of the receivers $$A_{\lfloor \frac{D}{6}+2 \rfloor}, A_{\lfloor \frac{D}{6}+3 \rfloor}, \ldots, A_{\lfloor \frac{3D}{6}+1 \rfloor}, A_{\lfloor \frac{5D}{6}+2 \rfloor}, A_{\lfloor \frac{5D}{6}+3 \rfloor},$$

$$\ldots, A_{\lfloor \frac{7D}{6}+1 \rfloor}, \text{ and } A_{\lfloor \frac{9D}{6}+2 \rfloor}, A_{\lfloor \frac{9D}{6}+3 \rfloor}, \ldots, A_{\lfloor \frac{11D}{6}+1 \rfloor}$$

using appropriate corresponding subsets of the receivers.

For p=4 the (2p)-tupole component of the wave is the octupole component, and so forth. The octupole component of the wave may be detected by detecting the positive displacement of the borehole fluid in one direction at half of the receivers $$A_1, A_2, \ldots, A_{\lfloor \frac{D}{8}+1 \rfloor}, A_{\lfloor \frac{3D}{8}+2 \rfloor}, A_{\lfloor \frac{3D}{8}+3 \rfloor}, \ldots,$$

$$A_{\lfloor \frac{5D}{8}+1 \rfloor}, A_{\lfloor \frac{7D}{8}+2 \rfloor}, A_{\lfloor \frac{7D}{8}+3 \rfloor}, \ldots, A_{\lfloor \frac{9D}{8}+1 \rfloor}, A_{\lfloor \frac{11D}{8}+2 \rfloor},$$

$$A_{\lfloor \frac{11D}{8}+3 \rfloor}, \ldots, A_{\lfloor \frac{13D}{8}+1 \rfloor}, A_{\lfloor \frac{15D}{8}+2 \rfloor}, A_{\lfloor \frac{15D}{8}+3 \rfloor}, \ldots, A_{2D}$$

(where this latter subset may be the empty set, if $$2D < \left\lfloor \frac{15D}{8} + 2 \right\rfloor,$$

for example), and by detecting the negative displacement of the borehole fluid in the opposite direction at the other half of the receivers $$A_{\lfloor \frac{D}{8}+2 \rfloor}, A_{\lfloor \frac{D}{8}+3 \rfloor}, \ldots, A_{\lfloor \frac{3D}{8}+1 \rfloor}, A_{\lfloor \frac{5D}{8}+2 \rfloor}, A_{\lfloor \frac{5D}{8}+3 \rfloor}, \ldots, A_{\lfloor \frac{7D}{8}+1 \rfloor}, A_{\lfloor \frac{9D}{8}+2 \rfloor},$$

$$A_{\lfloor \frac{9D}{8}+3 \rfloor}, \ldots, A_{\lfloor \frac{11D}{8}+1 \rfloor}, \text{ and } A_{\lfloor \frac{13D}{8}+2 \rfloor}, A_{\lfloor \frac{13D}{8}+3 \rfloor}, \ldots, A_{\lfloor \frac{15D}{8}+1 \rfloor},$$

using appropriate corresponding subsets of the receivers. Generally, for 0<p<D, the (2p)-tupole component of the wave may be detected by detecting the positive displacement of the borehole fluid in one direction at half of the p+1 subsets of the receivers $$A_1, A_2, \ldots, A_{\lfloor \frac{D}{2p}+1 \rfloor}, A_{\lfloor \frac{3D}{2p}+2 \rfloor}, A_{\lfloor \frac{3D}{2p}+3 \rfloor}, \ldots, A_{\lfloor \frac{5D}{2p}+3 \rfloor}, \ldots, A_{\lfloor \frac{(4p-5)D}{2p}+2 \rfloor},$$

$$A_{\lfloor \frac{(4p-5)D}{2p}+3 \rfloor}, \ldots, A_{\lfloor \frac{(4p-3)D}{2p}+1 \rfloor}, A_{\lfloor \frac{(4p-1)D}{2p}+2 \rfloor}, A_{\lfloor \frac{(4p-1)D}{2p}+3 \rfloor}, \ldots, A_{2D}$$

(where this latter subset may be the empty set, if $$2D < \left\lfloor \frac{(4p-1)D}{2p} + 2 \right\rfloor,$$

for example), and by detecting the negative displacement of the borehole fluid in the opposite direction at the other half of the p subsets of the receivers $$A_{\lfloor \frac{D}{2p}+2 \rfloor}, A_{\lfloor \frac{D}{2p}+3 \rfloor}, \ldots, A_{\lfloor \frac{3D}{2p}+1 \rfloor}, A_{\lfloor \frac{5D}{2p}+2 \rfloor}, A_{\lfloor \frac{5D}{2p}+3 \rfloor}, \ldots,$$

$$A_{\lfloor \frac{7D}{2p}+1 \rfloor}, A_{\lfloor \frac{(4p-7)D}{2p}+2 \rfloor}, A_{\lfloor \frac{(4p-7)D}{2p}+3 \rfloor}, \ldots, A_{\lfloor \frac{(4p-5)D}{2p}+1 \rfloor},$$

$$A_{\lfloor \frac{(4p-3)D}{2p}+2 \rfloor}, A_{\lfloor \frac{(4p-3)D}{2p}+3 \rfloor}, \ldots, A_{\lfloor \frac{(4p-1)D}{2p}+1 \rfloor}, \ldots,$$

corresponding subsets of the receivers.

The energy of the (2D−2)-tupole components $a_{1,(2D-2)\text{-}tuple}$, $a_{2,(2D-2)\text{-}tuple}, \ldots, a_{2D,(2D-2)\text{-}tuple}$ of the wave (generally proportional to the intensity, the square of the amplitude) is typically at least about 10 to about 100 times greater than the energy of the (2D)-tupole components $a_{1,(2D)\text{-}tuple}$, $a_{2,(2D)\text{-}tuple}, \ldots, a_{2D,(2D)\text{-}tuple}$ of the wave. In order to increase the sensitivity to the less energetic (2D)-tupole components $a_{1,(2D)\text{-}tuple}, a_{2,(2D)\text{-}tuple}, \ldots, a_{2D,(2D)\text{-}tuple}$ of the wave, the amplitudes $a_{2,total}, a_{4,total}, \ldots, a_{2D-2,total}, a_{2D,total}$ of the wave received at receivers $A_2, A_4, \ldots, A_{2D-2}, A_{2D}$ may be subtracted from the sum of the amplitudes $a_{1,total}, a_{3,total}, \ldots, a_{2D-3,total}$, $a_{2D-1,total}$ of the wave received at receivers $A_1, A_3, \ldots, A_{2D-3}, A_{2D-1}$ giving $$a_{1,total} + a_{3,total} + \ldots + a_{2D-3,total} + a_{2D-1,total} -$$

$$a_{2,total} - a_{4,total} - \ldots - a_{2D-2,total} - a_{2D,total} =$$

$$\left[ \begin{pmatrix} a_{1,monopole} + a_{3,monopole} + \ldots + \\ a_{2D-3,monopole} + a_{2D-1,monopole} - \\ a_{2,monopole} - a_{4,monopole} - \ldots - \\ a_{2D-2,monopole} - a_{2D,monopole} \end{pmatrix} + \begin{pmatrix} a_{1,dipole} + a_{3,dipole} + \ldots + \\ a_{2D-3,dipole} + a_{2D-1,dipole} - \\ a_{2,dipole} - a_{4,dipole} - \ldots - \\ a_{2D-2,dipole} - a_{2D,dipole} \end{pmatrix} + \ldots + \right.$$

$$\begin{pmatrix} a_{1,(2D-2)\text{-}tupole} + a_{3,(2D-2)\text{-}tupole} + \ldots + \\ a_{2D-3,(2D-2)\text{-}tupole} + a_{2D-1,(2D-2)\text{-}tupole} - \\ a_{2,(2D-2)\text{-}tupole} - a_{4,(2D-2)\text{-}tupole} - \ldots - \\ a_{2D-2,(2D-2)\text{-}tupole} - a_{2D,(2D-2)\text{-}tupole} \end{pmatrix} +$$

$$\left. \begin{pmatrix} a_{1,(2D)\text{-}tupole} + a_{3,(2D)\text{-}tupole} + \ldots + \\ a_{2D-3,(2D)\text{-}tupole} + a_{2D-1,(2D)\text{-}tupole} - \\ a_{2,(2D)\text{-}tupole} - a_{4,(2D)\text{-}tupole} - \ldots - \\ a_{2D-2,(2D)\text{-}tupole} - a_{2D,(2D)\text{-}tupole} \end{pmatrix} + \ldots \right].$$

If the uncorrected amplitudes are used, then it is quite likely that the first term $$\begin{pmatrix} a_{1,monopole} + a_{3,monopole} + \ldots + a_{2D-3,monopole} + \\ a_{2D-1,monopole} - a_{2,monopole} - \\ a_{4,monopole} - \ldots - a_{2D-2,monopole} - a_{2D,monopole} \end{pmatrix},$$

the second term $(a_{1,dipole} + a_{3,dipole} + \ldots + a_{2D-3,dipole} + a_{2D-1,dipole} - a_{2,dipole} - a_{4,dipole} - \ldots - a_{2D-2,dipole} - a_{2D,dipole})$, and all the other terms up to and including the (2D−2)-th term $$\begin{pmatrix} a_{1,(2D-2)\text{-}tupole} + a_{3,(2D-2)\text{-}tupole} + \ldots + a_{2D-3,(2D-2)\text{-}tupole} + \\ a_{2D-1,(2D-2)\text{-}tupole} - a_{2,(2D-2)\text{-}tupole} - a_{4,(2D-2)\text{-}tupole} - \ldots - \\ a_{2D-2,(2D-2)\text{-}tupole} - a_{2D,(2D-2)\text{-}tupole} \end{pmatrix}$$

will be non-zero and may well still be about the same size or even bigger than the term of interest, the (2D)-tupole term $$\begin{pmatrix} a_{1,(2D)\text{-}tupole} + a_{3,(2D)\text{-}tupole} + \ldots + a_{2D-3,(2D)\text{-}tupole} + \\ a_{2D-1,(2D)\text{-}tupole} - a_{2,(2D)\text{-}tupole} - \\ a_{4,(2D)\text{-}tupole} - \ldots - a_{2D-2,(2D)\text{-}tupole} - a_{2D,(2D)\text{-}tupole} \end{pmatrix}.$$

However, if the corrected amplitudes are used, with $f_{rA_1}$, $f_{rA_2}, \ldots$, and $f_{rA_{2D}}$ chosen as described above so that $$f_{rA_d} a_{d,(2j)\text{-}tupole} = \cos\left(\frac{j(d-1)\pi}{D}\right)(2j)_p$$

for all $1 \leq d \leq 2D$, and $0 \leq j \leq p \leq D$, then the difference between the corrected amplitudes becomes $$\sum_{d=1}^{D} a_{2d-1,total}^{corrected} - \sum_{d=1}^{D} a_{2d,total}^{corrected} = \left[ \left[ \sum_{d=1}^{D} f_{rA_{2d-1}} a_{2d-1,monopole} - \sum_{d=1}^{D} f_{rA_{2d}} a_{2d,monopole} \right] + \right.$$

$$\left[ \sum_{d=1}^{D} f_{rA_{2d-1}} a_{2d-1,dipole} - \sum_{d=1}^{D} f_{rA_{2d}} a_{2d,dipole} \right] + \ldots +$$

$$\left[ \sum_{d=1}^{D} f_{rA_{2d-1}} a_{2d-1,(2D-1)\text{-}tupole} - \sum_{d=1}^{D} f_{rA_{2d}} a_{2d,(2D)\text{-}tupole} \right] +$$

$$\left. \left[ \sum_{d=1}^{D} f_{rA_{2d-1}} a_{2d-1,(2D)\text{-}tupole} - \sum_{d=1}^{D} f_{rA_{2d}} a_{2d,(2D)\text{-}tupole} \right] + \ldots \right]$$

$$= [[DM_p - DM_p] + \ldots + [2D(2D)_p] + \ldots]$$

$$= [2D(2D)_p + \ldots],$$

since $$\left[ \sum_{d=1}^{D} f_{rA_{2d-1}} a_{2d-1,(2j)\text{-}tupole} - \sum_{d=1}^{D} f_{rA_{2d}} a_{2d,(2j)\text{-}tupole} \right] = \left[ \sum_{k=0}^{D-1} f_{rA_{2k+1}} a_{2k+1,(2j)\text{-}tupole} - \sum_{k=0}^{D-1} f_{rA_{2k+2}} a_{2k+2,(2j)\text{-}tupole} \right]$$

where k=d−1 so that d=k+1, 2d=2k+2, and 2d−1=2k+1, whence $$\begin{bmatrix} \sum_{d=1}^{D} f_{rA_{2d-1}} a_{2d-1,(2j)-tupole} - \\ \sum_{d=1}^{D} f_{rA_{2d}} a_{2d,(2j)-tupole} \end{bmatrix} = \begin{bmatrix} \sum_{k=0}^{D-1} f_{rA_{2k+1}} a_{2k+1,(2j)-tupole} - \\ \sum_{k=0}^{D-1} f_{rA_{2k+2}} a_{2k+2,(2j)-tupole} \end{bmatrix}$$

$$= \left[ \sum_{k=0}^{D-1} \cos\left(\frac{j(2k)\pi}{D}\right)(2j)_p - \sum_{k=0}^{D-1} \cos\left(\frac{j(2k+1)\pi}{D}\right)(2j)_p \right]$$

$$= \left[ (2j)_p \left( \sum_{k=0}^{D-1} \cos\left(\frac{j(2k)\pi}{D}\right) - \sum_{k=0}^{D-1} \cos\left(\frac{j(2k+1)\pi}{D}\right) \right) \right]$$

$$= \left[ (2j)_p \mathrm{Re} \left\{ \left( \sum_{k=0}^{D-1} \exp\left(\frac{ij(2k)\pi}{D}\right) - \sum_{k=0}^{D-1} \exp\left(\frac{ij(2k+1)\pi}{D}\right) \right) \right\} \right]$$

$$= \left[ (2j)_p \mathrm{Re} \left\{ \left( \sum_{k=0}^{D-1} \exp\left(\frac{ij(2k)\pi}{D}\right) - \exp\left(\frac{ij\pi}{D}\right) \sum_{k=0}^{D-1} \exp\left(\frac{ij(2k)\pi}{D}\right) \right) \right\} \right]$$

$$= \left[ (2j)_p \mathrm{Re} \left\{ \left[ 1 - \exp\left(\frac{ij\pi}{D}\right) \right] \sum_{k=0}^{D-1} \exp\left(\frac{ij(2k)\pi}{D}\right) \right\} \right]$$

$$= \left[ (2j)_p \mathrm{Re} \left\{ \left[ 1 - \exp\left(\frac{ij\pi}{D}\right) \right] \sum_{k=0}^{D-1} \left[ \exp\left(\frac{ij2\pi}{D}\right) \right]^k \right\} \right]$$

$$= \left[ (2j)_p \mathrm{Re} \left\{ \left[ 1 - \exp\left(\frac{ij\pi}{D}\right) \right] \frac{1 - \left[ \exp\left(\frac{ij2\pi}{D}\right) \right]^D}{1 - \left[ \exp\left(\frac{ij2\pi}{D}\right) \right]} \right\} \right]$$

$$= \left[ (2j)_p \mathrm{Re} \left\{ \left[ 1 - \exp\left(\frac{ij\pi}{D}\right) \right] \frac{[1 - [\exp(ij2\pi)]]}{1 - \left[ \exp\left(\frac{ij2\pi}{D}\right) \right]} \right\} \right]$$

$$= 0$$

for $j<D$ where $\mathrm{Re}\{z\}=\mathrm{Re}\{a+ib\}=a$ when $z=a+ib$, with $\exp(i\theta)=\cos(\theta)+i\sin(\theta)$ where $i=\sqrt{-1}$ so that $\mathrm{Re}\{\exp(i\theta)\}=\mathrm{Re}\{\cos(\theta)+i\sin(\theta)\}=\cos(\theta)$, and $f_{rA_{2d-1}}a_{2d-1,(2D)-tupole} = f_{rA_{2d}}a_{2d,(2D)-tupole}=(2D)$ for all $1 \leq d \leq D$. Consequently, using the corrected amplitudes enables greater accuracy and sensitivity in detecting the (2D)-tupole component of the wave received at receivers $A_1, A_2, A_3, A_4, \ldots, A_{2D-3}, A_{2D-2}, A_{2D-1}, A_{2D}$.

In various illustrative embodiments, as shown in FIG. 18 and as described above, the adaptive equalization and matching method 1800 may involve estimating effective receiver sensitivities and equalization factors for each of the plurality of receivers using windowed deconvolution of a Stoneley wave received by the plurality of receivers at the first place in the well, as indicated at 1830. For example, at the first place in the well when the arrival times of the first wave are substantially the same at each of the plurality of receivers, the Stoneley wave amplitude, which is affected mainly by receiver sensitivity differences for a substantially centered tool, may be utilized to estimate effective receiver sensitivities and equalization factors $f_{rA}(t)$, $f_{rB}(t)$, $f_{rC}(t)$, $f_{rD}(t)$ for each of the plurality of receivers A, B, C, and D, respectively.

FIG. 29 schematically illustrates the slowness (the reciprocal of the velocity) of a monopole (p=0) component 2910 (including the Stoneley mode) of a wave being detected and the slowness of a dipole (p=1) component 2920 of the wave being detected, both plotted as a function of frequency. A line 2930 (in phantom) shows the slowness $DT_{mud}$ of waves in mud, lying above the slowness $DT_{compression}$ of compression waves and below the slowness $DT_{shear}$ of shear waves. A frequency band of interest 2940 is shown, from a line 2950 (in phantom) showing a frequency minimum $\nu_{min}$ to a line 2960 (in phantom) showing a frequency maximum $\nu_{max}$. As is well-known to those skilled in the art, having the benefit of the present disclosure, the frequency band of interest 2940 may be wider and/or narrower than as shown in FIG. 29, for example. The group velocity has a minimum at an inflection point 2970 of the curve of the slowness of the dipole (p=1) component 2920 of the wave being detected.

FIG. 30 schematically illustrates examples of frequency responses for the amplitudes of the wave received at the receivers A and C within the frequency band of interest 2940, for example. The Fourier Transform of the corrected amplitude $FT_\nu\{a^{corrected}(t)\} = \hat{a}^{corrected}(\nu) = [\hat{a}_{monopole}^{corrected}(\nu) + \hat{a}_{dipole}^{corrected}(\nu) + \hat{a}_{quadrupole}^{corrected}(\nu) + \ldots]$, where the Fourier Transform defined by $$FT_\nu\{a^{corrected}(t)\} = \hat{a}^{corrected}(\nu) = \int_{-\infty}^{\infty} a^{corrected}(t) \exp(-2\pi i \nu t) dt$$

is the amplitude per unit frequency range in the spectrum of the wave at frequency $\nu$, may be given by the convolution $\hat{a}^{corrected}(\nu) = \hat{f}_{rA}(\nu) * \hat{a}(\nu) = \hat{f}_{rA}(\nu) * [\hat{a}_{monopole}(\nu) + \hat{a}_{dipole}(\nu) + \hat{a}_{quadrupole}(\nu) + \ldots]$. A convolution operation applied to the functions $f(t)$ and $g(t)$ may be defined by $$h(t) = f(t) * g(t) = \int_{-\infty}^{\infty} f(u)g(t-u)du.$$

The Fourier Transform $FT_\nu\{h(t)\}=\hat{h}(\nu)$ of the convolution $h(t)$, also known as the deconvolution of the convolution $h(t)$, gives the product of the Fourier Transforms $FT_\nu\{f(t)\}=\hat{f}(\nu)$ and $FT_\nu\{g(t)\}=\hat{g}(\nu)$ as follows:

$$\begin{aligned}FT_\nu\{h(t)\} &= \hat{h}(\nu) \\ &= FT_\nu\{f(t)*g(t)\} \\ &= f(t)*g(t) \\ &= \int_{-\infty}^{\infty} h(t)\exp(-2\pi i\nu t)dt \\ &= \int_{-\infty}^{\infty}\int_{-\infty}^{\infty} f(u)g(t-u)du\,\exp(-2\pi i\nu t)dt \\ &= \int_{-\infty}^{\infty}\int_{-\infty}^{\infty} f(u)g(t-u)du\,\exp(-2\pi i\nu[t-u+u])dt \\ &= \int_{-\infty}^{\infty}\int_{-\infty}^{\infty} f(u)\exp(-2\pi i\nu u)g(t-u)du\,\exp(-2\pi i\nu[t-u])dt \\ &= \int_{-\infty}^{\infty} f(u)\exp(-2\pi i\nu u)du \int_{-\infty}^{\infty} g(t-u)\exp(-2\pi i\nu[t-u])d[t-u] \\ &= \left[\int_{-\infty}^{\infty} f(u)\exp(-2\pi i\nu u)du\right]\left[\int_{-\infty}^{\infty} g(y)\exp(-2\pi i\nu y)dy\right] \\ &= [FT_\nu\{f(u)\}][FT_\nu\{g(y)\}] \\ &= \hat{f}(\nu)\hat{g}(\nu)\end{aligned}$$

where the substitution $y=t-u$ has been used. Similarly, the Inverse Fourier Transform of $$\hat{a}^{corrected}(\nu) = \int_{-\infty}^{\infty} a^{corrected}(t)\exp(-2\pi i\nu t)dt, \text{ where } \hat{a}^{corrected}(\nu)$$

is the Fourier Transform of the corrected amplitude $a^{corrected}(t)=[a_{monopole}^{corrected}(t)+a_{dipole}^{corrected}(t)+a_{quadrupole}^{corrected}(t)+\ldots]$, may be given by the Inverse Fourier Transform of the convolution $\hat{a}^{corrected}(\nu)=\hat{f}_{rA}(\nu)*\hat{a}(\nu)$ where $\hat{a}^{corrected}(\nu)=\hat{f}_{rA}(\nu)*\hat{a}(\nu)=\hat{f}_{rA}(\nu)+[\hat{a}_{monopole}(\nu)+\hat{a}_{dipole}(\nu)+\hat{a}_{quadrupole}(\nu)+\ldots]$. The Inverse Fourier Transform may defined by $$FT_t^{-1}\{\hat{a}^{corrected}(\nu)\} = \tilde{\hat{a}}^{corrected}(t) = a^{corrected}(t)$$

so that $$\begin{aligned}FT_t^{-1}\{\hat{a}^{corrected}(\nu)\} &= \tilde{\hat{a}}^{corrected}(t) \\ &= a^{corrected}(t) \\ &= \int_{-\infty}^{\infty} \hat{a}^{corrected}(\nu)\exp(2\pi i\nu t)d\nu\end{aligned}$$

is the displacement or amplitude of the wave at time t. Note that the Inverse Fourier Transform $$FT_t^{-1}\{\hat{a}^{corrected}(\nu)\} = \tilde{\hat{a}}^{corrected}(t)$$

of the Fourier Transform $FT^\nu\{a^{corrected}(t)\}=\hat{a}^{corrected}(\nu)$ of $a^{corrected}(t)$ is just $a^{corrected}(t)$, since $$\begin{aligned}FT_t^{-1}\{FT_\nu\{a^{corrected}(t)\}\} &= FT_t^{-1}\{\hat{a}^{corrected}(\nu)\} = \tilde{\hat{a}}^{corrected}(t) = a^{corrected}(t) \\ &= \int_{-\infty}^{\infty} \hat{a}^{corrected}(\nu)\exp(2\pi i\nu t)d\nu \\ &= \int_{-\infty}^{\infty}\left[\int_{-\infty}^{\infty} a^{corrected}(u)\exp(-2\pi i\nu u)du\right]\exp(2\pi i\nu t)d\nu \\ &= \int_{-\infty}^{\infty} a^{corrected}(u)\left[\int_{-\infty}^{\infty} \exp(2\pi i\nu\{t-u\})d\nu\right]du \\ &= \int_{-\infty}^{\infty} a^{corrected}(u)\delta(t-u)du \\ &= a^{corrected}(t)\end{aligned}$$

where properties of the generalized function known as the Dirac delta function $$\delta(t-u) = \int_{-\infty}^{\infty} \exp(2\pi i\nu\{t-u\})d\nu$$

have been used, namely, that $\delta(x)=0$ whenever $x\neq 0$ and $$a^{corrected}(t) = \int_{-\infty}^{\infty} a^{corrected}(u)\delta(t-u)du = \int_{t-\varepsilon}^{t+\varepsilon} a^{corrected}(u)\delta(t-u)du$$

for any $\varepsilon>0$, analogous to the Kronecker delta $\delta_{ij}$ used in summations such that $\delta_{ij}=0$ whenever $i\neq j$, $\delta_{ij}=1$ whenever $i=j$, so that $a_j=\Sigma_{i=-\infty}^{i=+\infty} a_i\delta_{ij}$. Similarly, the Fourier Transform $$FT_t\{\tilde{a}^{corrected}(\nu)\} = \hat{\tilde{a}}^{corrected}(t)$$

of the Inverse Fourier Transform $FT_\nu^{-1}\{a^{corrected}(t)\}=\tilde{a}^{corrected}(\nu)$ of $a^{corrected}(t)$ is again just $a^{corrected}(t)$, since $$\begin{aligned}FT_t\{FT_\nu^{-1}\{a^{corrected}(t)\}\} &= FT_t\{\tilde{a}^{corrected}(\nu)\} = \hat{\tilde{a}}^{corrected}(t) = a^{corrected}(t) \\ &= \int_{-\infty}^{\infty} \tilde{a}^{corrected}(\nu)\exp(-2\pi i\nu t)d\nu \\ &= \int_{-\infty}^{\infty}\left[\int_{-\infty}^{\infty} a^{corrected}(u)\exp(2\pi i\nu u)du\right]\exp(-2\pi i\nu t)d\nu \\ &= \int_{-\infty}^{\infty} a^{corrected}(u)\left[\int_{-\infty}^{\infty} \exp(2\pi i\nu\{u-t\})d\nu\right]du \\ &= \int_{-\infty}^{\infty} a^{corrected}(u)\delta(u-t)du \\ &= a^{corrected}(t)\end{aligned}$$

where properties of the Dirac delta function have again been used.

The convolution operation applied to Fourier Transforms is defined similarly by $$\hat{k}(v) = \hat{m}(v) * \hat{n}(v) = \int_{-\infty}^{\infty} \hat{m}(\mu)\hat{n}(v-\mu)d\mu,$$

whose Inverse Fourier Transform $$FT_t^{-1}\{\hat{k}(v)\} = \tilde{k}(t) = k(t)$$

gives the deconvolution of the convolution $\hat{k}(v)=\hat{m}(v)*\hat{n}(v)$ as the product of the Inverse Fourier Transforms $FT_t^{-1}\{\hat{m}(v)\}=m(t)$ and $FT_t^{-1}\{\hat{n}(v)\}=n(t)$ as follows:

$$\begin{aligned}FT_t^{-1}\{\hat{k}(v)\} &= \tilde{k}(t) = k(t) \\ &= FT_t^{-1}\{\hat{m}(v)*\hat{n}(v)\} = \overline{\hat{m}(v)*\hat{n}(v)} = \int_{-\infty}^{\infty} \hat{k}(v)\exp(2\pi i vt)dv \\ &= \int_{-\infty}^{\infty}\int_{-\infty}^{\infty} \hat{m}(\mu)\hat{n}(v-\mu)d\mu\exp(2\pi i vt)dv \\ &= \int_{-\infty}^{\infty}\int_{-\infty}^{\infty} \hat{m}(\mu)\hat{n}(v-\mu)d\mu\exp(2\pi i t[v-\mu+\mu])dt \\ &= \int_{-\infty}^{\infty}\int_{-\infty}^{\infty} \hat{m}(\mu)\exp(2\pi i t\mu)\hat{n}(v-\mu)d\mu\exp(2\pi i t[v-\mu])dt \\ &= \int_{-\infty}^{\infty} \hat{m}(\mu)\exp(2\pi i t\mu)d\mu \int_{-\infty}^{\infty} \hat{n}(v-\mu)\exp(2\pi i t[v-\mu])d[v-\mu] \\ &= \left[\int_{-\infty}^{\infty}\hat{m}(\mu)\exp(2\pi i t\mu)d\mu\right]\left[\int_{-\infty}^{\infty}\hat{n}(\xi)\exp(2\pi i t\xi)d\xi\right] \\ &= [FT_t^{-1}\{\hat{m}(\mu)\}][FT_t^{-1}\{\hat{n}(\xi)\}] = \tilde{m}(t)\tilde{n}(t) \\ &= m(t)n(t)\end{aligned}$$

where the substitution $\xi=v-\mu$ has been used. Consequently, the Inverse Fourier Transform or deconvolution of the convolution $\hat{a}^{corrected}(v)=\hat{f}_{rA}(v)*\hat{a}(v)$ yields the product $$\begin{aligned}FT_t^{-1}\{\hat{a}^{corrected}(v)\} &= \tilde{a}^{corrected}(t) \\ &= a^{corrected}(t) \\ &= FT_t^{-1}\{\hat{f}_{rA}(v)*\hat{a}(v)\} \\ &= FT_t^{-1}\{\hat{f}_{rA}(v)\}FT_t^{-1}\{\hat{a}(v)\}\end{aligned}$$

where $$\begin{aligned}FT_t^{-1}\{\hat{f}_{rA}(v)\}FT_t^{-1}\{\hat{a}(v)\} &= \tilde{f}_{rA}(t)\tilde{a}(t) \\ &= f_{rA}(t)a(t),\end{aligned}$$

similar to various illustrative embodiments described above with respect to FIG. 23.

For the frequency band of interest 2940 shown in FIG. 30, the convolution $\hat{a}^{corrected}(v)=\hat{f}_{rA}(v)*\hat{a}(v)$ may be further convolved with the Fourier Transform $\hat{w}_1(v)$, as indicated at 3050 in FIG. 30, of an appropriate windowing function $w_1(t)$, for example, giving $\hat{a}_{windowed}^{corrected}(v)=\hat{a}^{corrected}(v)*\hat{w}_1(v)=[\hat{f}_{rA}(v)*\hat{a}(v)]*\hat{w}_1(v)$. The Inverse Fourier Transform or deconvolution $$FT_t^{-1}\{\hat{a}_{windowed}^{corrected}(v)\} = \tilde{a}_{windowed}^{corrected}(t) = a_{windowed}^{corrected}(t)$$

of the convolution $\hat{a}_{windowed}^{corrected}(v)=\hat{a}^{corrected}(v)*\hat{w}_1(v)=[\hat{f}_{rA}(v)*\hat{a}(v)]*\hat{w}_1(v)$ yields the product $$\begin{aligned}FT_t^{-1}\{\hat{a}_{windowed}^{corrected}(v)\} &= \tilde{a}_{windowed}^{corrected}(t) \\ &= a_{windowed}^{corrected}(t) \\ &= a^{corrected}(t)w_1(t) \\ &= f_{rA}(t)a(t)w_1(t),\end{aligned}$$

since $$\begin{aligned}FT_t^{-1}\{\hat{a}_{windowed}^{corrected}(v)\} &= \tilde{a}_{windowed}^{corrected}(t) \\ &= a_{windowed}^{corrected}(t) \\ &= FT_t^{-1}\{\hat{a}^{corrected}(v)*\hat{w}_1(v)\} \\ &= \overline{\hat{a}^{corrected}(v)*\hat{w}_1(v)}\end{aligned}$$

and $$\begin{aligned}\overline{\hat{a}^{corrected}(v)*\hat{w}_1(v)} &= \overline{[\hat{f}_{rA}(v)*\hat{a}(v)]*\hat{w}_1(v)} \\ &= \tilde{\tilde{a}}^{corrected}(t)\tilde{w}_1(t) \\ &= \overline{[\hat{f}_{rA}(v)*\hat{a}(v)]}\tilde{w}_1(t)\end{aligned}$$

where $$\begin{aligned}\tilde{\tilde{a}}^{corrected}(t)\tilde{w}_1(t) &= a^{corrected}(t)w_1(t) \\ &= \overline{[\hat{f}_{rA}(v)*\hat{a}(v)]}\tilde{w}_1(t)\end{aligned}$$

and $$\begin{aligned}\overline{[\hat{f}_{rA}(v)*\hat{a}(v)]}\tilde{w}_1(t) &= [\tilde{f}_{rA}(t)\tilde{a}(t)]w_1(t) \\ &= f_{rA}(t)a(t)w_1(t).\end{aligned}$$

FIG. 31 schematically illustrates the Fourier Transform $\hat{w}_1(v)$, as indicated at 3050 in FIG. 30 and at 3110 in FIG. 31, of an appropriate windowing function $w_1(t)$, as indicated at 3210 in FIG. 32, for example, where $$w_1(t) = \frac{1}{2T} \text{ for } -T \le t \le T \text{ and } w_1(t) = 0$$

elsewhere. The windowing function satisfies the condition that $$\int_{-\infty}^{\infty} w_1(t)dt = \int_{-T}^{+T} \frac{1}{2T}dt = \frac{2T}{2T} = 1.$$

Note that the function schematically illustrated in FIG. 31, the sine cardinal, may resemble the firing pulse for a wideband dipole, in various illustrative embodiments. The sine cardinal may be defined by the following, as noted by Euler, $$sinc(x) = \frac{\sin x}{x} = \prod_{n=1}^{\infty}\left(1 - \frac{x^2}{(n\pi)^2}\right) =$$

$$\left(1 - \frac{x}{\pi}\right)\left(1 + \frac{x}{\pi}\right)\left(1 - \frac{x}{2\pi}\right)\left(1 + \frac{x}{2\pi}\right)\left(1 - \frac{x}{3\pi}\right)\left(1 + \frac{x}{3\pi}\right)\ldots,$$

so that $$sinc\left(\frac{\pi}{2}\right) =$$

$$\frac{\sin(\pi/2)}{(\pi/2)} = \frac{2}{\pi} = \left(1 - \frac{\pi}{2\pi}\right)\left(1 + \frac{\pi}{2\pi}\right)\left(1 - \frac{\pi}{4\pi}\right)\left(1 + \frac{\pi}{4\pi}\right)\left(1 - \frac{\pi}{6\pi}\right)\left(1 + \frac{\pi}{6\pi}\right)\ldots,$$

which leads to an expression for $(2/\pi)$ as an infinite product that was first noted by Wallis, namely, that $$\frac{2}{\pi} = \left(1 - \frac{1}{2}\right)\left(1 + \frac{1}{2}\right)\left(1 - \frac{1}{4}\right)\left(1 + \frac{1}{4}\right)\left(1 - \frac{1}{6}\right)\left(1 + \frac{1}{6}\right)\ldots$$

$$= \left(\frac{1}{2}\right)\left(\frac{3}{2}\right)\left(\frac{3}{4}\right)\left(\frac{5}{4}\right)\left(\frac{5}{6}\right)\left(\frac{7}{6}\right)\left(\frac{7}{8}\right)\left(\frac{9}{8}\right)\ldots,$$

featuring the double product of all the odd integers in the numerator and the double product of all the even integers in the denominator, ad infinitum, and, moreover, $$sinc(x) = \frac{\sin x}{x}$$

$$= \prod_{n=1}^{\infty}\left(1 - \frac{x^2}{(n\pi)^2}\right)$$

$$= 1 - \sum_{n=1}^{\infty}\frac{x^2}{(n\pi)^2} + \ldots$$

$$= \frac{\sin x}{x}$$

$$= 1 - \frac{x^2}{3!} + \frac{x^4}{5!} - \frac{x^6}{7!} + \ldots$$

leads, upon equating like powers of x, in particular, $$x^2, \text{ to } -\sum_{n=1}^{\infty}\frac{x^2}{(n\pi)^2} = -\frac{x^2}{3!},$$

which leads to Euler's famous solution of Bernoulli's problem of what $$\sum_{n=1}^{\infty}\frac{1}{n^2}$$

equals, namely, $$\sum_{n=1}^{\infty}\frac{1}{(n)^2} = \frac{\pi^2}{3!} = \frac{\pi^2}{6}.$$

The Fourier Transform $FT_\nu\{w_1(t)\} = \hat{w}_1(\nu)$ of $w_1(t)$ is given by $$FT_\nu\{w_1(t)\} = \hat{w}_1(\nu) = \int_{-\infty}^{\infty} w_1(t)\exp(-2\pi i\nu t)dt$$

$$= \int_{-T}^{T}\frac{1}{2T}\exp(-2\pi i\nu t)dt$$

$$= \frac{1}{2T}\int_{-T}^{T}\exp(-2\pi i\nu t)dt$$

$$= \frac{1}{2T}\left[-\frac{1}{2\pi i\nu}\exp(-2\pi i\nu t)\right]\bigg|_{-T}^{T}$$

$$= \frac{1}{2T}\left[\frac{(\exp(2\pi i\nu T) - \exp(-2\pi i\nu T))}{2\pi i\nu}\right]$$

$$= \frac{1}{(2\pi\nu T)}\left[\frac{(\exp(2\pi i\nu t) - \exp(-2\pi i\nu t))}{2i}\right]$$

$$= \frac{\sin(2\pi\nu T)}{(2\pi\nu T)} = 1 - \frac{(2\pi\nu T)^2}{3!} + \frac{(2\pi\nu T)^4}{5!} + \frac{(2\pi\nu T)^6}{7!} + \ldots$$

where $n! = (1)(2)(3) \ldots (n-2)(n-1)(n)$, the $\lim \nu \to 0$ of $$\frac{\sin(2\pi\nu T)}{(2\pi\nu T)} = 1, \text{ and } \frac{\sin(2\pi\nu T)}{(2\pi\nu T)} = 0 \text{ for } \nu = \pm\frac{1}{2T}, \pm\frac{2}{2T}, \pm\frac{3}{2T}, \ldots,$$

as indicated at 3110 in FIG. 31, for example, for $x = 2\pi\nu T$.

Similarly, for another frequency band of interest 3040 shown in FIG. 30, the convolution $\hat{a}^{corrected}(\nu) = \hat{f}_{rA}(\nu) * \hat{a}(\nu)$ may be further convolved with the Fourier Transform $\hat{w}_2(\nu)$ of another appropriate windowing function $w_2(t)$, for example, giving $\hat{a}_{windowed}^{corrected}(\nu) = \hat{a}^{corrected}(\nu) * \hat{w}_2(\nu) = [\hat{f}_{rA}(\nu) * \hat{a}(\nu)] * \hat{w}_2(\nu)$. The Inverse Fourier Transform or deconvolution $$FT_t^{-1}\{\hat{a}_{windowed}^{corrected}(\nu)\} = \tilde{\hat{a}}_{windowed}^{corrected}(t) = a_{windowed}^{corrected}(t)$$

of the convolution $\hat{a}_{windowed}^{corrected}(\nu) = \hat{a}^{corrected}(\nu) * \hat{w}_2(\nu) = [\hat{f}_{rA}(\nu) * \hat{a}(\nu)] * \hat{w}_2(\nu)$ yields the product $$FT_t^{-1}\{\hat{a}_{windowed}^{corrected}(\nu)\} = \hat{a}_{windowed}^{corrected}(t) = a_{windowed}^{corrected}(t)$$
$$= a^{corrected}(t)w_2(t) = f_{rA}(t)a(t)w_2(t),$$

since $$FT_t^{-1}\{\hat{a}_{windowed}^{corrected}(\nu)\} = \tilde{\hat{a}}_{windowed}^{corrected}(t) = a_{windowed}^{corrected}(t)$$
$$= FT_t^{-1}\{\hat{a}^{corrected}(\nu) * \hat{w}_2(\nu)\}$$
$$= \overline{\hat{a}^{corrected}(\nu) * \hat{w}_2(\nu)}$$

and $$\overline{\hat{a}^{corrected}(\nu) * \hat{w}_2(\nu)} = \overline{[\hat{f}_{rA}(\nu) * \hat{a}(\nu)] * \hat{w}_2(\nu)} = \tilde{\hat{a}}^{corrected}(t)\tilde{\hat{w}}_2(t)$$
$$= [\hat{f}_{rA}(\nu) * \hat{a}(\nu)]\tilde{\hat{w}}_2(\nu)$$

-continued where $$\tilde{\hat{a}}^{corrected}(t)\tilde{w}_2(t) = a^{corrected}(t)w_2(t)$$
$$= \overline{[\hat{f}_{rA}(v) * \hat{a}(v)]}\tilde{\hat{w}}_2(v)$$

and $$\overline{[\hat{f}_{rA}(v) * \hat{a}(v)]}\tilde{\hat{w}}_2(v) = [\tilde{\hat{f}}_{rA}(t)\tilde{\hat{a}}(t)]w_2(t)$$
$$= f_{rA}(t)a(t)w_2(t).$$

FIG. 33, for example, schematically illustrates the Fourier Transform $\hat{w}_2(v)$, as indicated at 3060 in FIG. 30 and at 3310, of an appropriate windowing function $w_2(t)$, as indicated at 3320 (in phantom) in FIG. 33, where $$w_2(t) = \frac{1}{\sqrt{\pi}}\exp(-t^2) \text{ and } \int_{-\infty}^{\infty} w_2(t)dt = \frac{1}{\sqrt{\pi}}\int_{-\infty}^{\infty}\exp(-t^2)dt = 1,$$

with $$I^2 = \left[\frac{1}{\sqrt{\pi}}\int_{-\infty}^{\infty}\exp(-x^2)dx\right]\left[\frac{1}{\sqrt{\pi}}\int_{-\infty}^{\infty}\exp(-y^2)dy\right]$$
$$= \frac{1}{\pi}\int_{-\infty}^{\infty}\int_{-\infty}^{\infty}\exp(-[x^2+y^2])dxdy$$

so that $$I^2 = \frac{1}{\pi}\int_0^{\infty}\int_0^{2\pi}\exp(-r^2)rdrd\theta$$
$$= \frac{2\pi}{\pi}\int_0^{\infty}\exp(-r^2)rdr$$
$$= \int_0^{\infty}\exp(-u)du$$
$$= -\exp(-u)|_0^{\infty} = 1,$$

where $u=r^2$ has been substituted, confirming proper normalization of the windowing function $w_2(t)$. The Fourier Transform $FT_v\{w_2(t)\}=\hat{w}_2(v)$ of $w_2(t)$ is given by $$FT_v\{w_2(t)\} = \hat{w}_2(v) = \int_{-\infty}^{\infty} w_2(t)\exp(-2\pi ivt)dt$$
$$= \frac{1}{\sqrt{\pi}}\int_{-\infty}^{\infty}\exp(-t^2)\exp(-2\pi ivt)dt$$
$$= \frac{1}{\sqrt{\pi}}\int_{-\infty}^{\infty}\exp(-t^2)[\cos(-2\pi vt)+i\sin(-2\pi vt)]dt$$
$$= \frac{1}{\sqrt{\pi}}\int_{-\infty}^{\infty}\exp(-t^2)\cos(2\pi vt)dt - i\frac{1}{\sqrt{\pi}}\int_{-\infty}^{\infty}\exp(-t^2)\sin(2\pi vt)dt$$
$$= \frac{2}{\sqrt{\pi}}\int_0^{\infty}\exp(-t^2)\cos(2\pi vt)dt - i0$$
$$= \frac{2}{\sqrt{\pi}}\int_0^{\infty}\exp(-t^2)\cos(2\pi vt)dt$$

since the integrand in $$\int_{-\infty}^{\infty}\exp(-t^2)\cos(2\pi vt)dt$$

is an even function of t and the integrand in $$\int_{-\infty}^{\infty}\exp(-t^2)\sin(2\pi vt)dt$$

is an odd function of t.

The integral $$\int_0^{\infty}\exp(-x^2)\cos(2ax)dx$$

may be evaluated by integrating the complex function $\exp(-z^2)$, where $z=x+iy$, as shown in FIG. 34, around a rectangle 3410, consisting of the lines 3420, 3430, 3440, and 3450, in the complex plane 3400, using Cauchy's theorem. Cauchy's theorem states that the complex integral $$\oint_C f(z)dz = 0,$$

around a closed contour C that bounds a closed domain D, which consists of all points in the complex plane 3400 within and on the closed contour C, if $f(z)=u(x,y)+iv(x,y)$ is a regular function (also known as an analytic function and/or a holomorphic function) in the closed domain D. A continuous, one-valued function $f(z)=u(x,y)+iv(x,y)$ of $z=x+iy$ is regular (analytic, holomorphic) in a domain D if the four partial derivatives $$\frac{\partial u(x,y)}{\partial x}, \frac{\partial v(x,y)}{\partial x}, \frac{\partial u(x,y)}{\partial y}, \text{ and } \frac{\partial v(x,y)}{\partial y}$$

exist, are continuous, and satisfy the Cauchy-Riemann differential equations $$\frac{\partial u(x,y)}{\partial x} = \frac{\partial v(x,y)}{\partial y} \text{ and } \frac{\partial u(x,y)}{\partial y} = -\frac{\partial v(x,y)}{\partial x}$$

at each point of of the domain D. The Cauchy-Riemann differential equations follow from considerations of the differentiability of the continuous, one-valued function $f(z)=u(x,y)+iv(x,y)$ of $z=x+iy$. If $f(z)=u(x,y)+iv(x,y)$ is differentiable at any given point $z=x+iy$ in the domain D, then the ratio $$\frac{\{f(z+\Delta z)-f(z)\}}{\Delta z}$$

must tend to a definite limit as $\Delta z = \Delta x + i\Delta y \to 0$ in any manner. For example if $\Delta z = \Delta x$ and $\Delta y = 0$, then $$\frac{\{u(x+\Delta x, y) - u(x,y)\}}{\Delta x} + i\frac{\{v(x+\Delta x, y) - v(x,y)\}}{\Delta x}$$

must tend to a definite limit as $\Delta x \to 0$, so that the partial derivatives $$\frac{\partial u(x,y)}{\partial x} \text{ and } \frac{\partial v(x,y)}{\partial x}$$

must exist at the point $(x,y)$ and the limit as $\Delta x \to 0$ is $$\frac{\partial u(x,y)}{\partial x} + i\frac{\partial v(x,y)}{\partial x}.$$

Similarly, if $\Delta z = i\Delta y$ and $\Delta x = 0$, then $$\frac{\{u(x, y+\Delta y) - u(x,y)\}}{i\Delta y} + i\frac{\{v(x, y+\Delta y) - v(x,y)\}}{i\Delta y}$$

must also tend to the same definite limit as $\Delta y \to 0$, so that the partial derivatives $$\frac{\partial u(x,y)}{\partial y} \text{ and } \frac{\partial v(x,y)}{\partial y}$$

must also exist at the point $(x,y)$ and the limit as $\Delta y \to 0$ is $$\frac{\partial u(x,y)}{i\partial y} + \frac{\partial v(x,y)}{\partial y} = -i\frac{\partial u(x,y)}{\partial y} + \frac{\partial v(x,y)}{\partial y}.$$

Equating the real and imaginary parts of the two expressions for the same definite limit gives $$\frac{\partial u(x,y)}{\partial x} = \frac{\partial v(x,y)}{\partial y} \text{ and } \frac{\partial u(x,y)}{\partial y} = -\frac{\partial v(x,y)}{\partial x},$$

the

Cauchy-Riemann differential equations. The complex function $f(z) = u(x,y) + iv(x,y)$ is differentiable at a point $z_0 = x_0 + iy_0$ in the domain D if $$\frac{f(z) - f(z_0)}{z - z_0}$$

tends to a unique limit $f'(z_0)$ the derivative of $f(z)$ at $z = z_0$, as $z \to z_0$, provided $z = x + iy$ is also in the domain D, which means that given any number $\epsilon > 0$, a number $\delta$ can always be found such that $$\left|\frac{f(z) - f(z_0)}{z - z_0} - f'(z_0)\right| < \varepsilon$$

for all $z = x + iy$ and $z_0 = x_0 + iy_0$ in the domain D satisfying the condition that $0 < |z - z_0| < \delta$. If $f(z) = u(x,y) + iv(x,y)$, since $$x = \frac{1}{2}(z + \bar{z}) \text{ and } y = \frac{1}{2i}(z - \bar{z}),$$

where $z = x + iy$ and $\bar{z} = x - iy$, $u(x,y)$ and $\Xi(x,y)$ may formally be regarded as functions of two independent variables $z = x + iy$ and $\bar{z} = x - iy$, so that, if the four partial derivatives $$\frac{\partial u(x,y)}{\partial x}, \frac{\partial u(x,y)}{\partial y}, \frac{\partial v(x,y)}{\partial x}, \text{ and } \frac{\partial v(x,y)}{\partial y}$$

exist and are continuous, the condition that $f(z) = u(x,y) + iv(x, y)$ shall be independent of $\bar{z} = x - iy$ is that $$\begin{aligned}\frac{\partial f(z)}{\partial \bar{z}} &= 0 = \frac{\partial u(x,y)}{\partial \bar{z}} + i\frac{\partial v(x,y)}{\partial \bar{z}} \\ &= \frac{\partial u(x,y)}{\partial x}\frac{\partial x}{\partial \bar{z}} + \frac{\partial u(x,y)}{\partial y}\frac{\partial y}{\partial \bar{z}} + i\left[\frac{\partial v(x,y)}{\partial x}\frac{\partial x}{\partial \bar{z}} + \frac{\partial v(x,y)}{\partial y}\frac{\partial y}{\partial \bar{z}}\right] \\ &= \frac{\partial u(x,y)}{\partial x}\frac{1}{2} + \frac{\partial u(x,y)}{\partial y}\left(-\frac{1}{2i}\right) + i\left[\frac{\partial v(x,y)}{\partial x}\frac{1}{2} + \frac{\partial v(x,y)}{\partial y}\left(-\frac{1}{2i}\right)\right] \\ &= \frac{\partial u(x,y)}{\partial x}\frac{1}{2} + i\frac{\partial u(x,y)}{\partial y}\frac{1}{2} + i\frac{\partial v(x,y)}{\partial x}\frac{1}{2} - \frac{\partial v(x,y)}{\partial y}\frac{1}{2} \\ &= \frac{1}{2}\left[\frac{\partial u(x,y)}{\partial x} - \frac{\partial v(x,y)}{\partial y}\right] + i\frac{1}{2}\left[\frac{\partial u(x,y)}{\partial y} + \frac{\partial v(x,y)}{\partial x}\right] = 0\end{aligned}$$

using $$i = \frac{-1}{i},$$

which gives the Cauchy-Riemann equations when real and imaginary parts are equated, showing that x and y can only occur in the combination $z = x + iy$ in any analytic formula that represents a regular (analytic, holomorphic) function $f(z) = u(x,y) + iv(x,y)$ of $z = x + iy$, so that $\exp(x + 3iy) = \exp(2z - \bar{z}) = \exp(2[x+iy] - [x-iy])$ cannot be a regular (analytic, holomorphic) function $f(z) = u(x,y) + iv(x,y)$ of $z = x + iy$ independent of $\bar{z} = x - iy$, for example.

The exponential function $$\exp(z) = \frac{1}{0!} + \frac{z}{1!} + \frac{z^2}{2!} + \frac{z^3}{3!} + \cdots = \sum_{n=0}^{\infty} \frac{z^n}{n!}$$

(where 0!=1 has been used) converges for all values of $z=x+iy$, so the exponential function is regular (analytic, holomorphic) in the whole complex plane 3400. The derivative of the exponential function $$\exp'(z) = \frac{1}{1!} + \frac{2z}{2!} + \frac{3z^2}{3!} + \ldots$$
$$= \sum_{n=1}^{\infty} \frac{nz^{n-1}}{n!}$$
$$= \sum_{n=1}^{\infty} \frac{z^{n-1}}{(n-1)!}$$
$$= \sum_{m=0}^{\infty} \frac{z^m}{m!}$$
$$= \exp(z)$$

(where $m=n-1$ has been used) is just the exponential function again. The complex function $\exp(-z^2)$, like the Gaussian windowing function $$w_2(t) = \frac{1}{\sqrt{\pi}} \exp(-t^2),$$

is also an exponential function, having the expansion $$\exp(-z^2) = \frac{1}{0!} + \frac{(-z^2)}{1!} + \frac{(-z^2)^2}{2!} + \frac{(-z^2)^3}{3!} + \ldots$$
$$= \sum_{n=0}^{\infty} \frac{(-z^2)^n}{n!},$$

and, consequently, is similarly regular (analytic, holomorphic) in the whole complex plane 3400. Furthermore, the derivative of the complex function $\exp(-z^2)$ has the expansion $$\exp'(-z^2) = \sum_{n=0}^{\infty} \frac{n(-2z)(-z^2)^{n-1}}{n!}$$
$$= -2z \sum_{n=0}^{\infty} \frac{(-z^2)^{n-1}}{(n-1)!}$$

-continued $$= -2z \sum_{m=0}^{\infty} \frac{(-z^2)^m}{(m)!}$$
$$= -2z \exp(-z)^2$$

(where again $m=n-1$ has been used), which is likewise regular (analytic, holomorphic) in the whole complex plane 3400. In particular, the derivative $\exp'(-z^2)$ of the complex function $\exp(-z^2)$ is continuous at each point within and on any closed contour C bounding a closed domain D in the complex plane 3400. Whenever a complex function $f(z)=u(x,y)+iv(x,y)$ is regular at each point within and on any closed contour C bounding a closed domain D, with a derivative $f'(z)$ that is continuous at each point $z=x+iy$ within and on the closed contour C bounding the closed domain D, then an elementary proof of Cauchy's theorem described above may be given. The complex integral $$\oint_C f(z)dz = \oint_C [u(x,y) + iv(x,y)]\{dx + idy\}$$

may be written as $$\oint_C [u(x,y) + iv(x,y)]\{dx + idy\} =$$
$$\oint_C (u(x,y)dx - v(x,y)dy) + i\oint_C (v(x,y)dx + u(x,y)dy),$$

which may be transformed by Green's theorem, which states that, if $P(x,y)$, $Q(x,y)$, $$\frac{\partial Q(x,y)}{\partial x}, \text{ and } \frac{\partial P(x,y)}{\partial y}$$

are all continuous functions of x and y in a domain D bounded by a closed contour C, then $$\oint_C (P(x,y)dx + Q(x,y)dy) = \int\int_D \left(\frac{\partial Q(x,y)}{\partial x} - \frac{\partial P(x,y)}{\partial y}\right)dxdy.$$

For example, $$\oint_C (P(x,y)dx + Q(x,y)dy) = \int\int_D \left(\frac{\partial Q(x,y)}{\partial x} - \frac{\partial P(x,y)}{\partial y}\right)dxdy$$
$$= \int_0^a \int_0^R \left(\frac{\partial Q(x,y)}{\partial x} - \frac{\partial P(x,y)}{\partial y}\right)dxdy$$
$$= \int_0^a \left\{\int_0^R \left(\frac{\partial Q(x,y)}{\partial x}\right)dx\right\}dy -$$
$$\int_0^R \left\{\int_0^a \left(\frac{\partial P(x,y)}{\partial y}\right)dy\right\}dx$$

-continued
$$= \int_0^a \{Q(x,y)|_0^R\}dy - \int_0^R \{P(x,y)|_0^a\}dx$$
$$= \int_0^a \{Q(R,y) - Q(0,y)\}dy -$$
$$\int_0^R \{P(x,a) - P(x,0)\}dx$$
$$= \int_0^a Q(R,y)dy + \int_a^0 Q(0,y)dy +$$
$$\int_R^0 P(x,a)dx + \int_0^R P(x,0)dx$$
$$= \int_0^R P(x,0)dx + \int_0^a Q(R,y)dy +$$
$$\int_R^0 P(x,a)dx + \int_a^0 Q(0,y)dy$$

where the closed contour C is the rectangle 3410 and the line integration is performed in the counter-clockwise direction along lines 3420, 3430, 3440, and 3450, respectively.

Since $$f'(z) = \frac{\partial u(x,y)}{\partial x} + i\frac{\partial v(x,y)}{\partial x} = \frac{\partial v(x,y)}{\partial y} - i\frac{\partial u(x,y)}{\partial y}$$

is continuous at each point $z=x+iy$ within and on the closed contour C bounding the closed domain D, the conditions of Green's theorem are satisfied and $$\oint_C f(z)dz = \oint_C [u(x,y) + iv(x,y)]\{dx + idy\}$$
$$= \oint_C (u(x,y)dx - v(x,y)dy) +$$
$$i\oint_C (v(x,y)dx + u(x,y)dy)$$
$$= \int\int_D \left(-\frac{\partial v(x,y)}{\partial x} - \frac{\partial u(x,y)}{\partial y}\right) +$$
$$i\int\int_D \left(\frac{\partial u(x,y)}{\partial x} - \frac{\partial v(x,y)}{\partial y}\right)$$
$$= -\int\int_D \left(\frac{\partial v(x,y)}{\partial x} + \frac{\partial u(x,y)}{\partial y}\right) +$$
$$i\int\int_D \left(\frac{\partial u(x,y)}{\partial x} - \frac{\partial v(x,y)}{\partial y}\right)$$
$$= 0$$

using the Cauchy-Riemann differential equations $$\frac{\partial u(x,y)}{\partial x} = \frac{\partial v(x,y)}{\partial y} \text{ and } \frac{\partial u(x,y)}{\partial y} = -\frac{\partial v(x,y)}{\partial x}.$$

By Cauchy's theorem, $$\oint_C \exp(-z^2)dz = 0 \text{ with } \oint_C \exp(-z^2)dz = \int_0^R \exp(-x^2)dx +$$

-continued
$$\int_0^a \exp(-[R+iy]^2)idy + \int_R^0 \exp(-[x+ia]^2)dx + \int_a^0 \exp(y^2)idy$$

where the closed contour C is the rectangle 3410 and the line integration is performed in the counter-clockwise direction along lines 3420, 3430, 3440, and 3450, respectively, with $z=x$ along line 3420, $z=R+iy$ along line 3430, $z=x+ia$ along line 3440, and $z=iy$ along line 3440, so that $z^2=(iy)^2=-y^2$ along line 3440. The normalization of the windowing function $$\int_{-\infty}^{\infty} w_2(t)dt = \frac{1}{\sqrt{\pi}}\int_{-\infty}^{\infty} \exp(-t^2)dt = 1 = \frac{2}{\sqrt{\pi}}\int_0^{\infty} \exp(-t^2)dt$$

described above confirms that $$\lim_{R\to\infty} \int_0^R \exp(-x^2)dx = \frac{\sqrt{\pi}}{2}.$$

The absolute value of the integral $$\int_0^a \exp(-[R+iy]^2)idy$$

is bounded from above since $$\left|\int_0^a \exp(-[R+iy]^2)idy\right| = \left|\int_0^a \exp(-[R^2+2iRy-y^2])idy\right|$$

and $$\left|\int_0^a \exp(-[R^2+2iRy-y^2])idy\right| < \exp(-R^2)\int_0^a |\exp(-2iRy)|\exp(y^2)dy$$

where

-continued $$\exp(-R^2)\int_0^a |\exp(-2iRy)||\exp(y^2)dy =$$

$$\exp(-R^2)\int_0^a \exp(y^2)dy < \exp(-R^2)\exp(a^2)a,$$

the integral $$\int_0^a \exp(-[R+iy]^2)i\,dy$$

vanishes in the limit as R→∞. The integral $$\int_R^0 \exp(-[x+ia]^2)dx = -\int_0^R \exp(-[x+ia]^2)dx$$

$$= -\int_0^R \exp(-[x^2+2iax-a^2])dx$$

may be written using Euler's identity $\exp(-i2ax)=\cos(2ax)+i\sin(-2ax)=\cos(2ax)-i\sin(2ax)$ as $$-\int_0^R \exp(-[x^2+2iax-a^2])dx =$$

$$-\exp(a^2)\int_0^R \exp(-x^2)[\cos(2ax)-i\sin(2ax)]dx.$$

In the limit as R→∞, $$\oint_C \exp(-z^2)dz = 0$$

$$= \lim_{R\to\infty}\int_0^R \exp(-x^2)dx +$$

$$\lim_{R\to\infty}\int_0^a \exp(-[R+iy]^2)i\,dy +$$

$$\lim_{R\to\infty}\int_R^0 \exp(-[x+ia]^2)dx + \lim_{R\to\infty}\int_a^0 \exp(y^2)i\,dy$$

$$= \frac{\sqrt{\pi}}{2} + 0 - \exp(a^2)\int_0^\infty \exp(-x^2)\begin{bmatrix}\cos(2ax)-\\i\sin(2ax)\end{bmatrix}dx +$$

$$i\int_a^0 \exp(y^2)dy$$

$$= \frac{\sqrt{\pi}}{2} - \exp(a^2)\int_0^\infty \exp(-x^2)[\cos(2ax)]dx +$$

$$i\exp(a^2)\int_0^\infty \exp(-x^2)[\sin(2ax)]dx +$$

$$i\int_a^0 \exp(y^2)dy$$

whose real part gives $$0 = \frac{\sqrt{\pi}}{2} - \exp(a^2)\int_0^\infty \exp(-x^2)[\cos(2ax)]dx$$

so that $$\int_0^\infty \exp(-x^2)[\cos(2ax)]dx = \frac{\sqrt{\pi}}{2}\exp(-a^2).$$

Therefore, the Fourier Transform $$FT_v\{w_2(t)\} = \hat{w}_2(v)$$

of $$w_2(t) = \frac{1}{\sqrt{\pi}}\exp(-t^2)$$

is $$FT_v\{w_2(t)\} = \hat{w}_2(v) = \int_{-\infty}^\infty w_2(t)\exp(-2\pi ivt)dt$$

$$= \frac{1}{\sqrt{\pi}}\int_{-\infty}^\infty \exp(-t^2)\exp(-2ivt)dt$$

$$= \frac{2}{\sqrt{\pi}}\int_0^\infty \exp(-t^2)\cos(2\pi vt)dt$$

$$= \frac{2}{\sqrt{\pi}}\frac{\sqrt{\pi}}{2}\exp(-[\pi v]^2)$$

$$= \exp(-\pi^2 v^2)$$

where the substitution α=πv has been used, showing that the Fourier Transform $\hat{w}_2(v)$ of a Gaussian windowing function $$w_2(t) = \frac{1}{\sqrt{\pi}}\exp(-t^2)$$

(as shown, for example, in FIG. 33 at 3320) is another Gaussian function $\hat{w}_2(v)=\exp(-\pi^2 v^2)$ (as shown, for example, in FIG. 33 at 3310 for x=πv), having a different half-width and a different maximum. Note that the Inverse Fourier Transform $$FT_t^{-1}\{\hat{w}_2(v) = \exp(-\pi^2 v^2)\} = \tilde{w}_2(t) = \overline{\exp(-\pi^2 v^2)}$$

of the Fourier Transform $$FT_v\left\{w_2(t) = \frac{1}{\sqrt{\pi}}\exp(-t^2)\right\} = \hat{w}_2(v) = \exp(-\pi^2 v^2)$$

of the Gaussian windowing function $$w_2(t) = \frac{1}{\sqrt{\pi}}\exp(-t^2) \text{ is just } w_2(t) = \frac{1}{\sqrt{\pi}}\exp(-t^2),$$

as expected, since $$FT_t^{-1}\left\{FT_v\left\{\begin{array}{c}w_2(t) = \\ \frac{1}{\sqrt{\pi}}\exp(-t^2)\end{array}\right\}\right\} = FT_t^{-1}\left\{\begin{array}{c}\hat{w}_2(v) = \\ \frac{1}{\sqrt{\pi}}\exp(-t^2)\end{array}\right\}$$

$$= FT_t^{-1}\{\hat{w}_2(v) = \exp(-\pi^2 v^2)\}$$

$$= \tilde{w}_2(t) = \overline{\frac{1}{\sqrt{\pi}}\exp(-t^2)} = w_2(t)$$

$$= \overline{\exp(-\pi^2 v^2)} = \frac{1}{\sqrt{\pi}}\exp(-t^2) = w_2(t)$$

$$= \int_{-\infty}^{\infty} \hat{w}_2(v)\exp(2\pi ivt)dv$$

$$= \int_{-\infty}^{\infty} \exp(-\pi^2 v^2)\exp(2\pi ivt)dv$$

$$= \int_{-\infty}^{\infty} \exp(-\pi^2 v^2)\left[\begin{array}{c}\cos(2\pi vt) + \\ i\sin(2\pi vt)\end{array}\right]dv$$

$$= \int_{-\infty}^{\infty} \exp(-\pi^2 v^2)[\cos(2\pi vt)]dv$$

$$= \frac{2}{\pi}\int_0^{\infty} \exp(-\{\pi v\}^2)[\cos(2t\{\pi v\})]d\{\pi v\}$$

$$= \frac{2}{\pi}\int_0^{\infty} \exp(-x^2)[\cos(2tx)]dx$$

$$= \frac{2}{\pi}\frac{\sqrt{\pi}}{2}\exp(-t^2) = \frac{1}{\sqrt{\pi}}\exp(-t^2)$$

$$= w_2(t)$$

since the integrand in $$\int_{-\infty}^{\infty} \exp(-\pi^2 v^2)[\cos(2\pi vt)]dv$$

is an even function of (v) and the integrand in $$\int_{-\infty}^{\infty} \exp(-\pi^2 v^2)[\sin(2\pi vt)]dv$$

is an odd function of v, where the substitution x=π(v) and the previous result that $$\int_0^{\infty} \exp(-x^2)[\cos(2ax)]dx = \frac{\sqrt{\pi}}{2}\exp(-a^2) \text{ (for } a = t\text{)}$$

have been used.

In various alternative illustrative embodiments, as is well-known to those skilled in the art, having the benefit of the present disclosure, discrete versions of the Fourier Transform and/or the Inverse Fourier Transform, such as the Fast Fourier Transform (FFT) and Inverser Fast Fourier Transform (IFFT), may be used. Additionally, any suitable windowing function w(t) may be used, optionally satisfying a normalization condition $$\int_{-\infty}^{\infty} w(t)dt = 1.$$

As shown in FIG. 23, for example, the Stoneley wave 2310 detected and received at receiver A may have an amplitude a(t) having a Fourier Transform â(v), showing a certain frequency response in one or more frequency bands of interest, such as 2940 and 3040, as shown in FIG. 30, whereas the same Stoneley wave 2320 detected and received at receiver B may have an amplitude b(t) having a Fourier Transform ĥ(v) showing a different frequency response in one or more of the frequency bands of interest 2940 and/or 3040, at the first place in the well when the arrival times of the first wave are substantially the same at each of the plurality of receivers A and B. In various illustrative embodiments, the effective receiver sensitivity and equalization factors for receivers A and B, $f_{rA}(t)$ and $f_{rB}(t)$, respectively, may be chosen so that $\hat{a}_{windowed}^{corrected}(v) = \hat{f}_{rA}(v)*\hat{a}(v)*\hat{w}(v) = \hat{f}_{rB}*\hat{b}(v)*\hat{w}(v) = \hat{b}_{windowed}^{corrected}(v)$, using the Fourier Transform $\hat{w}(v)$ of a suitable windowing function w(t) normalized so that $$\int_{-\infty}^{\infty} w(t)dt = 1.$$

The Inverse Fourier Transform or deconvolution $$FT_t^{-1}\{\hat{a}_{windowed}^{corrected}(v)\} = \tilde{a}_{windowed}^{corrected}(t) = a_{windowed}^{corrected}(t)$$

gives a windowed deconvolution $a_{windowed}^{corrected}(t) = f_{rA}(t)a(t)w(t)$ and the Inverse Fourier Transform or deconvolution $$FT_t^{-1}\{\hat{b}_{windowed}^{corrected}(v)\} = \tilde{b}_{windowed}^{corrected}(t) = b_{windowed}^{corrected}(t)$$

gives a windowed deconvolution $b_{windowed}^{corrected}(t) = f_{rB}(t)b(t)w(t)$, so $a_{windowed}^{corrected}(t) = f_{rA}(t)a(t)w(t) = b_{windowed}^{corrected} = f_{rB}(t)b(t)w(t)$. For example, using the Fourier Transform $$\hat{w}_1(v) = \frac{\sin(2\pi vT)}{(2\pi vT)}$$

of the windowing function $$w_1(t) = \frac{1}{2T}$$

for $$-T \leq t \leq T$$

and $w_1(t)=0$ elsewhere, the windowed deconvolutions $a_{windowed}^{corrected}(t)=f_{rA}(t)a(t)w_1(t)=b_{windowed}^{corrected}(t)=f_{rB}(t)b(t)w_1(t)$ are non-zero only for $-T \leq t \leq T$. The effective receiver sensitivity and equalization factor $f_{rA}(t)$ for receiver A may be chosen so that $f_{rA}(t)=1$ for $-T \leq t \leq T$, in which case the effective receiver sensitivity and equalization factor $f_{rB}(t)$ for receiver B may be estimated to be $$f_{rB}(t) = \frac{a(t)}{b(t)}$$

so that $$f_{rB}(t)b(t) = \frac{a(t)}{b(t)}b(t) = a(t) = f_{rA}(t)a(t)$$

for $$f_{rA}(t) = 1$$

when $$-T \leq t \leq T.$$

Multiplying the signal detected and received at receiver B by $$f_{rB}(t) = \frac{a(t)}{b(t)}$$

for $$-T \leq t \leq T$$

will balance and equalize the receivers A and B with respect to each other.

Similarly, in various illustrative embodiments, the effective receiver sensitivity and equalization factors for the receivers A, B, C, and D, $f_{rA}(t)$, $f_{rB}(t)$, $f_{rC}(t)$, and $f_{rD}(t)$, respectively, may be chosen so that $\hat{a}_{windowed}^{corrected}(v) = \hat{b}_{windowed}^{corrected}(v) = \hat{c}_{windowed}^{corrected}(v) = \hat{d}_{windowed}^{corrected}(v)$ where $\hat{a}_{windowed}^{corrected}(v) = \hat{f}_{rA}(v)*\hat{a}(v)*\hat{w}(v)$, $\hat{b}_{windowed}^{corrected}(v) = \hat{f}_{rB}(v)*\hat{b}(v)*\hat{w}(v)$, $\hat{c}_{windowed}^{corrected}(v) = \hat{f}_{rC}(v)*\hat{c}(v)*\hat{w}(v)$, and $\hat{d}_{windowed}^{corrected}(v) = \hat{f}_{rD}(v)*\hat{d}(v)*\hat{w}(v)$, where a(t), b(t), c(t), and d(t) are the amplitudes of the Stoneley wave detected and received at receivers A, B, C, and D, respectively, at the first place in the well when the arrival times of the first wave are substantially the same at each of the plurality of receivers A, B, C, and D, using the Fourier Transform $\hat{w}(v)$ of a suitable windowing function w(t) normalized so that $$\int_{-\infty}^{\infty} w(t)dt = 1.$$

The Inverse Fourier Transform or deconvolution $$FT_t^{-1}\{\hat{a}_{windowed}^{corrected}(v)\} = \hat{a}_{windowed}^{corrected}(t)$$
$$= a_{windowed}^{corrected}(t)$$

gives the windowed deconvolution $$a_{windowed}^{corrected}(t) = f_{rA}(t)a(t)w(t),$$
$$FT_t^{-1}\{\hat{b}_{windowed}^{corrected}(v)\} = \hat{b}_{windowed}^{corrected}(t)$$
$$= b_{windowed}^{corrected}(t)$$

gives the windowed deconvolution $$b_{windowed}^{corrected}(t) = f_{rB}(t)b(t)w(t),$$
$$FT_t^{-1}\{\hat{c}_{windowed}^{corrected}(v)\} = \hat{c}_{windowed}^{corrected}(t)$$
$$= c_{windowed}^{corrected}(t)$$

gives the windowed deconvolution $c_{windowed}^{corrected}(t)=f_{rC}(t)c(t)w(t)$, and $$FT_t^{-1}\{\hat{d}_{windowed}^{corrected}(v)\} = \hat{d}_{windowed}^{corrected}(t)$$
$$= d_{windowed}^{corrected}(t)$$

gives the windowed deconvolution $d_{windowed}^{corrected}(t)=f_{rD}(t)d(t)w(t)$, so the effective receiver sensitivity and equalization factors for the receivers A, B, C, and D, $f_{rA}(t)$, $f_{rB}(t)$, $f_{rC}(t)$, and $f_{rD}(t)$, respectively, may be chosen so that $a_{windowed}^{corrected}(t)=f_{rA}(t)a(t)w(t)=b_{windowed}^{corrected}(t)=f_{rB}(t)b(t)w(t)=c_{windowed}^{corrected}(t)=f_{rC}(t)c(t)w(t)$, and $d_{windowed}^{corrected}(t)=f_{rD}(t)d(t)w(t)=a_{windowed}^{corrected}(t)=f_{rA}(t)a(t)w(t)$.

For example, using the Fourier Transform $$\hat{w}_1(v) = \frac{\sin(2\pi vT)}{(2\pi vT)}$$

of the windowing function $$w_1(t) = \frac{1}{2T}$$

for $-T \leq t \leq T$ and $w_1(t)=0$ elsewhere, the windowed deconvolutions $a_{windowed}^{corrected}(t)=f_{rA}(t)a(t)w_1(t)=b_{windowed}^{corrected}(t)=f_{rB}t)b(t)w_1(t)$, $b_{windowed}^{corrected}(t)=f_{rB}(t)b(t)w_1(t)=c_{windowed}^{corrected}(t)=f_{rC}(t)c(t)w_1(t)$, $c_{windowed}^{corrected}(t)=f_{rC}(t)c(t)w_1(t)=d_{windowed}^{corrected}(t)=f_{rD}(t)d(t)w_1(t)$, and $d_{windowed}^{corrected}(t)=f_{rD}(t)d(t)w_1(t)=a_{windowed}^{corrected}(t)=f_{rA}(t)a(t)w_1(t)$ are non-zero only for $-T \leq t \leq T$. The effective receiver sensitivity and equalization factor $f_{rA}(t)$ for receiver A may be chosen so that $f_{rA}(t)=1$ for $-T \leq t \leq T$, in which case the effective receiver sensitivity and equalization factors for receivers B, C, and D may be estimated to be $$f_{rB}(t) = \frac{a(t)}{b(t)},$$

$$f_{rC}(t) = \frac{a(t)}{c(t)}, \text{ and}$$

$$f_{rD}(t) = \frac{a(t)}{d(t)},$$

respectively, so that $$f_{rB}(t)b(t) = \frac{a(t)}{b(t)}b(t) = a(t) = f_{rA}(t)a(t),$$

$$f_{rC}(t)c(t) = \frac{a(t)}{c(t)}c(t) = a(t) = f_{rA}(t)a(t), \text{ and}$$

$$f_{rD}(t)d(t) = \frac{a(t)}{d(t)}d(t) = a(t) = f_{rA}(t)a(t), \text{ for}$$

$$f_{rA}(t) = 1 \text{ when } -T \leq t \leq T.$$

Multiplying the signal detected and received at receivers B, C, and D by $$f_{rB}(t) = \frac{a(t)}{b(t)},$$

$$f_{rC}(t) = \frac{a(t)}{c(t)}, \text{ and}$$

$$f_{rD}(t) = \frac{a(t)}{d(t)},$$

respectively, for $-T \leq t \leq T$ will balance and equalize the receivers A, B, C, and D with respect to each other.

Likewise, in various illustrative embodiments, the effective receiver sensitivity and equalization factors $f_{rA}(t)$ for a plurality of N receivers $A_n$, where $n=1,2,\ldots,N$, may be chosen so that $\hat{a}_{n,windowed}^{corrected}(v)=\hat{a}_{m,windowed}^{corrected}(v)$ for all $n,m=1,2,\ldots,N$, where $\hat{a}_{n,windowed}^{corrected}(v)=\hat{f}_{rA_n}(v)*\hat{a}_n(v)*\hat{w}(v)$ for $n=1,2,\ldots,N$, and $a_n(t)$ is the amplitude of the Stoneley wave detected and received at receiver $A_n$, for $n=1,2,\ldots,N$, at the first place in the well when the arrival times of the first wave are substantially the same at each of the plurality of receivers $A_n$ for $n=1,2,\ldots,N$, using the Fourier Transform $\hat{w}(v)$ of a suitable windowing function $w(t)$ normalized so that $$\int_{-\infty}^{\infty} w(t)dt = 1.$$

The Inverse Fourier Transforms or deconvolutions $$FT_t^{-1}\{\hat{a}_{n,windowed}^{corrected}(v)\} = \tilde{\hat{a}}_{n,windowed}^{corrected}(t) = a_{n,corrected}^{corrected}(t)$$

give the windowed deconvolutions $a_{n,windowed}^{corrected}(t)=f_{rA_n}(t)a_n(t)w(t)$ for $n=1,2,\ldots,N$, so the effective receiver sensitivity and equalization factors $f_{rA_n}(t)$ for the plurality of N receivers $A_n$ may be chosen so that $a_{n,windowed}^{corrected}(t)=f_{rA_n}(t)a_n(t)w(t)=a_{m,windowed}^{corrected}(t)=f_{rA_m}(t)a_m(t)w(t)$, for all $n,m=1,2,\ldots,N$.

For example, using the Fourier Transform $$\hat{w}_1(v) = \frac{\sin(2\pi vT)}{(2\pi vT)}$$

of the windowing function $$w_1(t) = \frac{1}{2T}$$

for $-T \leq t \leq T$ and $w_1(t)=0$ elsewhere, the windowed deconvolutions $a_{n,windowed}^{corrected}(t)=f_{rA_n}(t)a_n(t)w_1(t)=a_{m,windowed}^{corrected}(t)=f_{rA_m}(t)a_m(t)w_1(t)$ for all $n,m=1,2,\ldots,N$ are non-zero only for $-T \leq t \leq T$. The effective receiver sensitivity and equalization factor $f_{rA_k}(t)$ for any receiver $A_k$ for $k=1,2,\ldots,N$ may be chosen so that $f_{rA_k}(t)=1$ for $-T \leq t \leq T$, in which case the effective receiver sensitivity and equalization factors $f_{rA_n}(t)$ for receivers $A_n$ for $n=1,2,\ldots,k-1,k+1,\ldots,N$ may be estimated to be $$f_{rA_n}(t) = \frac{a_k(t)}{a_n(t)} \text{ so that } f_{rA_n}(t) = \frac{a_k(t)}{a_n(t)}a_n(t) = a_k(t) = f_{rA_n}(t)a_k(t)$$

for $n=1,2,\ldots,N$ when $f_{rA_k}(t)=1$ for $-T \leq t \leq T$. Multiplying the signal detected and received at receivers $A_n$ by $$f_{rA_n}(t) = \frac{a_k(t)}{a_n(t)}$$

for $n=1,2,\ldots,k-1,k+1,\ldots,N$ when $-T \leq t \leq T$ will balance and equalize the plurality of N receivers $A_n$ for $n=1,2,\ldots,N$ with respect to each other.

For example, when $k=1$, the effective receiver sensitivity and equalization factor $f_{rA_1}(t)$ for receiver $A_1$ may be chosen so that $f_{rA_1}(t)=1$ for $-T \leq t \leq T$, in which case the effective receiver sensitivity and equalization factors $f_{rA_n}(t)$ for receivers $A_n$ for $n=2,3,\ldots,N$ may be estimated to be $$f_{rA_n}(t) = \frac{a_1(t)}{a_n(t)} \text{ so that } f_{rA_n}(t) = \frac{a_1(t)}{a_n(t)}a_n(t) = a_1(t) = f_{rA_n}(t)a_1(t)$$

for $n = 1, 2, \ldots, N$ when $f_{rA_1}(t) = 1$ for $-T \leq t \leq T$.

Multiplying the signal detected and received at receivers $A_n$ by $$f_{rA_n}(t) = \frac{a_1(t)}{a_n(t)}$$

for n=2,3, . . . ,N when $-T \leq t \leq T$ will balance and equalize the plurality of N receivers $A_n$ for n=1,2, . . . ,N with respect to each other. Similarly, when k=N, for example, the effective receiver sensitivity and equalization factor $f_{rA_N}(t)$ for receiver $A_N$ may be chosen so that $f_{rA_N}(t)=1$ for $-T \leq t \leq T$, in which case the effective receiver sensitivity and equalization factors $f_{rA_n}(t)$ for n=1,2, . . . ,N−1 may be estimated to be $$f_{rA_n}(t) = \frac{a_N(t)}{a_n(t)} \text{ so that } f_{rA_n}(t) = \frac{a_N(t)}{a_n(t)} a_n(t) = a_N(t) = f_{rA_N}(t)a_N(t)$$

for $n = 1, 2, \ldots, N$ when $f_{rA_N}(t) = 1$ for $-T \leq t \leq T$.

Multiplying the signal detected and received at receivers $A_n$ by $$f_{rA_n}(t) = \frac{a_N(t)}{a_n(t)}$$

for n=1,2, . . . ,N−1 when $-T \leq t \leq T$ will balance and equalize the plurality of N receivers $A_n$ for n=1,2, . . . ,N with respect to each other.

In various illustrative embodiments, as shown in FIG. 18 and as described above, the adaptive equalization and matching method 1800 may also comprise correcting amplitudes of a second wave received by the plurality of receivers using the estimated effective receiver sensitivities and equalization factors for each of the plurality of receivers, as indicated at 1840. For example, the effective receiver sensitivity and equalization factors $f_{rA_n}(t)$ for a plurality of N receivers $A_n$ where n=1,2, . . . ,N may be chosen so that $\hat{a}_{n,windowed}^{corrected}(\nu) = \hat{a}_{m,windowed}^{corrected}(\nu)$ for all n,m=1,2, . . . ,N, where $\hat{a}_{n,windowed}^{corrected}(\nu) = \hat{f}_{rA_n}(\nu) * \hat{a}_n(\nu) * \hat{w}(\nu)$ for n=1,2, . . . ,N, and $a_n(t)$ is the amplitude of the Stoneley wave detected and received at receiver $A_n$ for n=1,2, . . . ,N, at the first place in the well when the arrival times of the first wave are substantially the same at each of the plurality of N receivers $A_n$, using the Fourier Transform $\hat{w}(\nu)$ of a suitable windowing function w(t) normalized so that $$\int_{-\infty}^{\infty} w(t) \, dt = 1.$$

The Inverse Fourier Transforms or deconvolutions $$FT_t^{-1}\{\hat{a}_{n,windowed}^{corrected}(\nu)\} = \tilde{a}_{n,windowed}^{corrected}(t) = a_{n,windowed}^{corrected}(t)$$

give the windowed deconvolutions $a_{n,windowed}^{corrected}(t) = f_{rA_n}(t) a_n(t) w(t)$ for n=1,2, . . . ,N, so the effective receiver sensitivity and equalization factors $f_{rA_n}(t)$ for the plurality of N receivers $A_n$ may be chosen so that $a_{n,windowed}^{corrected}(t) = f_{rA_n}(t) a_n(t) w(t) = a_{m,windowed}^{corrected}(t) = f_{rA_m}(t) a_m(t) w(t)$ for all n,m=1,2, . . . ,N. Subsequently, these effective receiver sensitivity and equalization factors $f_{rA_n}(t)$ for n=1,2, . . . ,N may be used to correct the amplitudes of all waves received at the plurality of N receivers $A_n$ for n=1,2, . . . ,N, at least until the next substantially centered or essentially centered place or spot in the well is located.

For example, using the Fourier Transform $$\hat{w}_1(\nu) = \frac{\sin(2\pi\nu T)}{(2\pi\nu T)}$$

for the windowing function $$w_1(t) = \frac{1}{2T}$$

for $-T \leq t \leq T$ and $w_1(t)=0$ elsewhere, the windowed deconvolutions $a_{n,windowed}^{corrected}(t) = f_{rA_n}(t) a_n(t) w_1(t) = a_{m,windowed}^{corrected}(t) = f_{rA_m}(t) a_m(t) w_1(t)$ for all n,m=1,2, . . . ,N are non-zero only for $-T \leq t \leq T$. The effective receiver sensitivity and equalization factors $f_{rA_n}(t)$ for the plurality of N receivers $A_n$ may be chosen so that $a_{n,windowed}^{corrected}(t) = a_{m,windowed}^{corrected}$, giving $a_{n,windowed}^{corrected}(t) = f_{rA_n}(t) a_n(t) w_1(t) = f_{rA_m}(t) a_m(t) w_1(t)$ for all n,m=1,2, . . . ,N when $-T \leq t \leq T$. Subsequently, these effective receiver sensitivity and equalization factors $f_{rA_n}(t)$ for n=1,2, . . . ,N may be used to correct the amplitudes of all waves received at the plurality of N receivers $A_n$ for n=1,2, . . . ,N when $-T \leq t \leq T$, at least until the next substantially centered or essentially centered place or spot in the well is located.

For example, as shown in FIG. 24, and as described above, the dipole component 2410 (shown in phantom) of a wave received at the receivers A, B, C, and D may be detected by detecting the positive displacement of the borehole fluid in one direction at receiver A and the substantially equal but negative displacement in the opposite direction at receiver C, with substantially no positive or negative displacement detected at either of the receivers B and D. The radiation pattern of the dipole component 2410 of the pressure detected in the borehole 2420 is illustrated in FIG. 24, corresponding to the radiation pattern 8302 of the pressure generated in the borehole by the dipole source 8304 illustrated in FIG. 8, for example.

The total uncorrected amplitude of the wave received at receiver A may be given by $a_{total}(t) = [a_{monopole}(t) + a_{dipole}(t) + a_{quadrupole}(t) + \ldots]$ and the total uncorrected amplitude of the wave received at receiver C may be given by $c_{total}(t) = [c_{monopole}(t) + c_{dipole}(t) + c_{quadrupole}(t) + \ldots]$. The energy of the monopole components $a_{monopole}(t)$ and $c_{monopole}(t)$ of the wave (generally proportional to the intensity, the square of the amplitude) is typically at least about 10 to about 100 times greater than the energy of the dipole components $a_{dipole}(t)$ and $c_{dipole}(t)$ of the wave. In order to increase the sensitivity to the less energetic dipole components $a_{dipole}(t)$ and $c_{dipole}(t)$ of the wave, the amplitude $c_{total}(t)$ of the wave received at receiver C may be subtracted from the amplitude $a_{total}(t)$ of the wave received at receiver A, giving $a_{total}(t) - c_{total}(t) = [\{a_{monopole}(t) - c_{monopole}(t)\} + \{a_{dipole}(t) - c_{dipole}(t)\} + \ldots]$. If the uncorrected amplitudes are used, then it is quite likely that the first term $\{a_{monopole}(t) - c_{monopole}(t)\}$ will be non-zero and may well still be about the same size or even bigger than the term of interest, the dipole term $\{a_{dipole}(t) - c_{dipole}(t)\}$.

However, if the corrected amplitudes are used, where $a_{total,windowed}^{corrected}(t) = f_{rA}(t) a_{total}(t) w(t) = f_{rA}(t) \{a_{monopole}(t) + a_{dipole}(t) + a_{quadrupole}(t) + \ldots\} w(t)$ and $c_{total,windowed}^{corrected}(t) = f_{rC}(t) c_{total}(t) w(t) = f_{rC}(t) \{c_{monopole}(t) + c_{dipole}(t) + c_{quadrupole}(t) + \ldots\} w(t)$, with $f_{rA}(t)$ and $f_{rC}(t)$ chosen as described above from the windowed deconvolutions so that $f_{rA}(t) a_{monopole}(t) w(t) = f_{rC}(t) c_{monopole}(t) w(t) = M_p(t) w(t)$, then the difference between the corrected amplitudes becomes $$a_{total,windowed}^{corrected}(t) - c_{total,windowed}^{corrected}(t) = w(t) \begin{bmatrix} \left\{ \begin{array}{c} f_{rA}(t) a_{monopole}(t) - \\ f_{rC}(t) c_{monopole}(t) \end{array} \right\} + \\ \left\{ \begin{array}{c} f_{rA}(t) a_{dipole}(t) - \\ f_{rC}(t) c_{dipole}(t) \end{array} \right\} + \ldots \end{bmatrix}$$

$$= w(t) \begin{bmatrix} \{M_p(t) - M_p(t)\} + \\ \left\{ \begin{array}{c} f_{rA}(t) a_{dipole}(t) - \\ f_{rC}(t) c_{dipole}(t) \end{array} \right\} + \ldots \end{bmatrix}$$

$$= w(t)[2 f_{rA}(t) a_{dipole}(t) + \ldots]$$

$$= w(t)[2 D_p(t) + \ldots],$$

since $f_{rA}(t) a_{dipole}(t) w(t) = -f_{rC}(t) c_{dipole}(t) w(t) = D_p(t) w(t)$. Consequently, using the corrected amplitudes enables greater accuracy and sensitivity in detecting the dipole component of the wave received at receivers A and C.

Similarly, as shown in FIG. 25, and as described above, the dipole component 2510 (shown in phantom) of a wave received at the receivers A, B, C, and D may be detected by detecting the positive displacement of the borehole fluid in one direction at receiver D and the substantially equal but negative displacement in the opposite direction at receiver B, with substantially no positive or negative displacement detected at either of the receivers A and C. The radiation pattern of the dipole component 2510 of the pressure detected in the borehole 2520 is illustrated in FIG. 25, corresponding to the radiation pattern 8302 of the pressure generated in the borehole by the dipole source 8304 illustrated in FIG. 8, for example.

The total uncorrected amplitude of the wave received at receiver D may be given by $d_{total}(t) = [d_{monopole}(t) + d_{dipole}(t) + d_{quadrupole}(t) + \ldots]$ and the total uncorrected amplitude of the wave received at receiver B may be given by $b_{total}(t) = [b_{monopole}(t) + b_{dipole}(t) + b_{quadrupole}(t) + \ldots]$. The energy of the monopole components $d_{monopole}(t)$ and $b_{monopole}(t)$ of the wave (generally proportional to the intensity, the square of the amplitude) is typically at least about 10 to about 100 times greater than the energy of the dipole components $d_{dipole}(t)$ and $b_{dipole}(t)$ of the wave. In order to increase the sensitivity to the less energetic dipole components $d_{dipole}(t)$ and $b_{dipole}(t)$ of the wave, the amplitude $b_{total}(t)$ of the wave received at receiver B may be subtracted from the amplitude $d_{total}(t)$ of the wave received at receiver D, giving $d_{total}(t) - b_{total}(t) = [\{d_{monopole}(t) - b_{monopole}(t)\} + \{d_{dipole}(t) - b_{dipole}(t)\} + \ldots]$. If the uncorrected amplitudes are used, then it is quite likely that the first term $\{d_{monopole}(t) - b_{monopole}(t)\}$ will be non-zero and may well still be about the same size or even bigger than the term of interest, the dipole term $\{d_{dipole}(t) - b_{dipole}(t)\}$.

However, if the corrected amplitudes are used, where $d_{total,windowed}^{corrected}(t) = f_{rD}(t) d_{total}(t) w(t) = f_{rD}(t) \{d_{monopole}(t) + d_{dipole}(t) + d_{quadrupole}(t) + \ldots\} w(t)$ and $b_{total,windowed}^{corrected}(t) = f_{rB}(t) b_{total}(t) w(t) = f_{rB}(t) \{b_{monopole}(t) + b_{dipole}(t) + b_{quadrupole}(t) + \ldots\} w(t)$, with $f_{rD}(t)$ and $f_{rB}(t)$ chosen as described above from the windowed deconvolutions so that $f_{rD}(t) d_{monopole}(t) w(t) = f_{rB}(t) b_{monopole}(t) w(t) = M_p(t) w(t)$, then the difference between the corrected amplitudes becomes $$a_{total,windowed}^{corrected}(t) - b_{total,windowed}^{corrected}(t) = w(t) \begin{bmatrix} \left\{ \begin{array}{c} f_{rD}(t) a_{monopole}(t) - \\ f_{rB}(t) b_{monopole}(t) \end{array} \right\} + \\ \left\{ \begin{array}{c} f_{rD}(t) d_{dipole}(t) - \\ f_{rB}(t) b_{dipole}(t) \end{array} \right\} + \ldots \end{bmatrix}$$

$$= w(t) \begin{bmatrix} \{M_p(t) - M_p(t)\} + \\ \left\{ \begin{array}{c} f_{rD}(t) d_{dipole}(t) - \\ f_{rB}(t) b_{dipole}(t) \end{array} \right\} + \ldots \end{bmatrix}$$

$$= w(t)[2 f_{rD}(t) d_{dipole}(t) + \ldots]$$

$$= w(t)[2 D_p(t) + \ldots],$$

since $f_{rD}(t) d_{dipole}(t) w(t) = -f_{rB}(t) b_{dipole}(t) w(t) = D_p(t) w(t)$. Consequently, using the corrected amplitudes enables greater accuracy and sensitivity in detecting the dipole component of the wave received at receivers D and B.

Likewise, as shown in FIG. 26, and as described above, the quadrupole component 2610 (shown in phantom) of a wave received at the receivers A, B, C, and D may be detected by detecting the positive displacement of the borehole fluid in one direction at receivers A and C and the substantially equal but negative displacement in the opposite direction at receivers B and D. The radiation pattern of the quadrupole component 2610 of the pressure detected in the borehole 2620 is illustrated in FIG. 26, corresponding to the radiation pattern 9306 of the pressure generated in the borehole by the quadrupole source 9308 illustrated in FIG. 9, for example.

The energy of the dipole components $a_{dipole}(t)$, $b_{dipole}(t)$, $c_{dipole}(t)$, and $d_{dipole}(t)$ of the wave (generally proportional to the intensity, the square of the amplitude) is typically at least about 10 to about 100 times greater than the energy of the quadrupole components $a_{quadrupole}(t)$, $b_{quadrupole}(t)$, $c_{quadrupole}(t)$, and $d_{quadrupole}(t)$ of the wave. In order to increase the sensitivity to the less energetic quadrupole components $a_{quadrupole}(t)$, $b_{quadrupole}(t)$, $c_{quadrupole}(t)$, and $d_{quadrupole}(t)$ of the wave, the amplitudes $b_{total}(t)$ and $d_{total}(t)$ of the wave received at receivers B and D may be subtracted from the sum of the amplitudes $a_{total}(t)$ and $c_{total}(t)$ of the wave received at receivers A and C, giving $$\begin{array}{c} a_{total}(t) + c_{total}(t) - \\ b_{total}(t) - d_{total}(t) \end{array} = \begin{bmatrix} \left\{ \begin{array}{c} a_{monopole}(t) + c_{monopole}(t) - \\ b_{monopole}(t) - d_{monopole}(t) \end{array} \right\} + \\ \left\{ \begin{array}{c} a_{dipole}(t) + c_{dipole}(t) - \\ b_{dipole}(t) - d_{dipole}(t) \end{array} \right\} + \\ \left\{ \begin{array}{c} a_{quadrupole}(t) + c_{quadrupole}(t) - \\ b_{quadrupole}(t) - d_{quadrupole}(t) \end{array} \right\} + \ldots \end{bmatrix}.$$

If the uncorrected amplitudes are used, then it is quite likely that the first term $\{a_{monopole}(t)+c_{monopole}(t)-b_{monopole}(t)-d_{monopole}(t)\}$ and the second term $\{a_{dipole}(t)+c_{dipole}(t)-b_{dipole}(t)-d_{dipole}(t)\}$ will both be non-zero and may well still be about the same size or even bigger than the term of interest, the quadrupole term $\{a_{quadrupole}(t)+c_{quadrupole}(t)-b_{quadrupole}(t)-d_{quadrupole}(t)\}$.

However, if the corrected amplitudes are used, where $a_{total,windowed}^{corrected}(t)=f_{rA}(t)a_{total}(t)w(t)=f_{rA}(t)\{a_{monopole}(t)+a_{dipole}(t)+a_{quadrupole}(t)+ \ldots \}w(t)$, $b_{total,windowed}^{corrected}(t)=f_{rB}(t)b_{total}(t)w(t)=f_{rB}(t)\{b_{monopole}(t)+b_{dipole}(t)+b_{quadrupole}(t)+ \ldots \}w(t)$, $c_{total,windowed}^{corrected}(t)=f_{rC}(t)c_{total}(t)w(t)=f_{rC}(t)\{c_{monopole}(t)+c_{dipole}(t)+c_{quadrupole}(t)+ \ldots \}w(t)$, and $d_{total,windowed}^{corrected}(t)=f_{rD}(t)d_{total}(t)w(t)=f_{rD}(t)\{d_{monopole}(t)+d_{dipole}(t)+d_{quadrupole}(t)+ \ldots \}w(t)$, with $f_{rA}(t)$, $f_{rB}(t)$, $f_{rC}(t)$, and $f_{rD}(t)$ chosen as described above from the windowed deconvolutions so that $f_{rA}(t)a_{monopole}(t)w(t)=f_{rB}(t)b_{monopole}(t)w(t)=M_p(t)w(t)$, $f_{rA}(t)a_{monopole}(t)w(t)=f_{rC}(t)c_{monopole}(t)w(t)=M_p(t)w(t)$, and $f_{rA}(t)a_{monopole}(t)w(t)=f_{rD}(t)d_{monopole}(t)w(t)=M_p(t)w(t)$, and $f_{rA}(t)a_{dipole}(t)w(t)=-f_{rC}(t)c_{dipole}(t)e(t)=D_p(t)w(t)$, with $f_{rD}(t)d_{dipole}(t)w(t)=-f_{rB}(t)b_{dipole}(t)w(t)=0$, then the difference between the corrected amplitudes becomes $$\begin{aligned}
&a_{total}^{corrected}(t)+ \\
&c_{total}^{corrected}(t)- \\
&b_{total}^{corrected}(t)- \\
&d_{total}^{corrected}(t)
\end{aligned} = w(t)\begin{bmatrix} w(t)\left\{\begin{array}{l}f_{rA}(t)a_{monopole}(t)+f_{rC}(t)c_{monopole}(t)- \\ f_{rB}(t)b_{monopole}(t)-f_{rD}(t)d_{monopole}(t)\end{array}\right\}+ \\ w(t)\left\{\begin{array}{l}f_{rA}(t)a_{dipole}(t)+f_{rC}(t)c_{dipole}(t)- \\ f_{rB}(t)b_{dipole}(t)-f_{rD}(t)d_{dipole}(t)\end{array}\right\}+ \\ w(t)\left\{\begin{array}{l}f_{rA}(t)a_{quadrupole}(t)+f_{rC}(t)c_{quadrupole}(t)- \\ f_{rB}(t)b_{quadrupole}(t)-f_{rD}(t)d_{quadrupole}(t)\end{array}\right\}+\ldots \end{bmatrix}$$

$$= w(t)\begin{bmatrix}\{M_p(t)+M_p(t)-M_p(t)-M_p(t)\}+ \\ w(t)\{D_p(t)-D_p(t)+0-0\}+ \\ w(t)\left\{\begin{array}{l}f_{rA}(t)a_{quadrupole}(t)+f_{rC}(t)c_{quadrupole}(t)- \\ f_{rB}(t)b_{quadrupole}(t)-f_{rD}(t)d_{quadrupole}(t)\end{array}\right\}+\ldots\end{bmatrix}$$

$$= w(t)[4f_{rA}(t)a_{quadrupole}(t)+\ldots]$$

$$= w(t)[4Q_p(t)+\ldots],$$

since $f_{rA}(t)a_{quadrupole}(t)w(t)=f_{rC}(t)c_{quadrupole}(t)w(t)=Q_p(t)w(t)$ and $f_{rB}(t)b_{quadrupole}(t)w(t)=f_{rD}(t)d_{quadrupole}(t)w(t)=-Q_p(t)w(t)$. Consequently, using the corrected amplitudes enables greater accuracy and sensitivity in detecting the quadrupole component of the wave received at receivers A, B, C and D.

Similarly, as shown in FIG. 27, and as described above, the sextupole component 2710 (shown in phantom) of a wave received at the receivers A, B, C, D, E, and F may be detected by detecting the positive displacement of the borehole fluid in one direction at receivers A, C, and E and the substantially equal but negative displacement in the opposite direction at receivers B, D, and F. The radiation pattern of the sextupole component 2710 of the pressure detected in the borehole 2720 is illustrated in FIG. 27, corresponding to the radiation pattern 10310 of the pressure generated in the borehole by the quadrupole source 10312 illustrated in FIG. 10, for example.

The energy of the quadrupole components $a_{quadrupole}(t)$, $b_{quadrupole}(t)$, $c_{quadrupole}(t)$, $d_{quadrupole}(t)$, $e_{quadrupole}(t)$ and $f_{quadrupole}(t)$ of the wave (generally proportional to the intensity, the square of the amplitude) is typically at least about 10 to about 100 times greater than the energy of the sextupole components $a_{sextupole}(t)$, $b_{sextupole}(t)$, $c_{sextupole}(t)$, $d_{sextupole}(t)$, $e_{sextupole}(t)$, and $f_{sextupole}(t)$ of the wave. In order to increase the sensitivity to the less energetic sextupole components $a_{sextupole}(t)$, $b_{sextupole}(t)$, $c_{sextupole}(t)$, $d_{sextupole}(t)$, $e_{sextupole}(t)$, and $f_{sextupole}(t)$ of the wave, the amplitudes $d_{total}(t)$, $f_{total}(t)$, and $b_{total}(t)$ of the wave received at receivers D, F, and B may be subtracted from the sum of the amplitudes $a_{total}(t)$, $c_{total}(t)$, and $e_{total}(t)$ of the wave received at receivers A, C, and E, giving $$\begin{aligned}a_{total}(t)+ \\ c_{total}(t)+ \\ e_{total}(t)- \\ d_{total}(t)- \\ f_{total}(t)- \\ b_{total}(t)\end{aligned} = \begin{bmatrix}\left\{\begin{array}{l}a_{monopole}(t)+c_{monopole}(t)+e_{monopole}(t)- \\ d_{monopole}(t)-f_{monopole}(t)-b_{monopole}(t)\end{array}\right\}+ \\ \left\{\begin{array}{l}a_{dipole}(t)+c_{dipole}(t)+e_{dipole}(t)- \\ d_{dipole}(t)-f_{dipole}(t)-b_{dipole}(t)\end{array}\right\}+ \\ \left\{\begin{array}{l}a_{quadrupole}(t)+c_{quadrupole}(t)+e_{quadrupole}(t)- \\ d_{quadrupole}(t)-f_{quadrupole}(t)-b_{quadrupole}(t)\end{array}\right\}+ \\ \left\{\begin{array}{l}a_{sextupole}(t)+c_{sextupole}(t)+e_{sextupole}(t)- \\ d_{sextupole}(t)-f_{sextupole}(t)-b_{sextupole}(t)\end{array}\right\}+\ldots\end{bmatrix}.$$

If the uncorrected amplitudes are used, then it is quite likely that the first term $$\left\{\begin{array}{l}a_{monopole}(t)+c_{monopole}(t)+e_{monopole}(t)- \\ d_{monopole}(t)-f_{monopole}(t)-b_{monopole}(t)\end{array}\right\}$$

the second term $$\{a_{dipole}(t)+c_{dipole}(t)+e_{dipole}(t)-d_{dipole}(t)-f_{dipole}(t)-b_{dipole}(t)\},$$

and the third term $$\left\{\begin{array}{l}a_{quadrupole}(t)+c_{quadrupole}(t)+e_{quadrupole}(t)- \\ d_{quadrupole}(t)-f_{quadrupole}(t)-b_{quadrupole}(t)\end{array}\right\}$$

will all be non-zero and may well still be about the same size or even bigger than the term of interest, the sextupole term $$\left\{\begin{array}{l}a_{sextupole}(t)+c_{sextupole}(t)+e_{sextupole}(t)- \\ d_{sextupole}(t)-f_{sextupole}(t)-b_{sextupole}(t)\end{array}\right\}.$$

However, if the corrected amplitudes are used, where $a_{total,windowed}^{corrected}(t)=f_{rA}(t)a_{total}(t)w(t)=f_{rA}(t)\{a_{monopole}(t)+a_{dipole}(t)+a_{quadrupole}(t)+ \ldots \}w(t)$, $b_{total,windowed}^{corrected}(t)=f_{rB}(t)b_{total}(t)w(t)=f_{rB}(t)\{b_{monopole}(t)+b_{dipole}(t)+b_{quadrupole}(t)+ \ldots \}w(t)$, $c_{total,windowed}^{corrected}(t)=f_{rC}(t)c_{total}(t)w(t)=f_{rC}(t)\{c_{monopole}(t)+c_{dipole}(t)+c_{quadrupole}(t)+ \ldots \}w(t)$, $d_{total,windowed}^{corrected}(t)=f_{rD}(t)d_{total}(t)w(t)=f_{rD}(t)\{d_{monopole}(t)+d_{dipole}(t)+d_{quadrupole}(t)+ \ldots \}w(t)$, $e_{total,windowed}^{corrected}(t)=f_{rE}(t)e_{total}(t)w(t)=f_{rE}(t)\{e_{monopole}(t)+e_{dipole}(t)+e_{quadrupole}(t)+ \ldots \}w(t)$, and $f_{total,windowed}^{corrected}(t) = f_{rF}(t)f_{total}(t)w(t) = f_{rF}(t)\{f_{monopole}(t) + f_{dipole}(t) + f_{quadrupole}(t) + \ldots\}w(t)$, with $f_{rA}(t)$, $f_{rB}(t)$, $f_{rC}(t)$, $f_{rD}(t)$, $f_{rE}(t)$ and $f_{rF}(t)$ chosen as described above from th windowed deconvolutions so that $f_{rA}(t)a_{monopole}(t)w(t) = f_{rB}(t)b_{monopole}(t)w(t) = M_p(t)w(t)$, $f_{rA}(t)a_{monopole}(t)w(t) = f_{rC}(t)c_{monopole}(t)w(t) = M_p(t)w(t)$, $f_{rA}(t)a_{monopole}(t)w(t) = f_{rD}(t)d_{monopole}(t)w(t) = M_p(t)w(t)$, $f_{rA}(t)a_{monopole}(t)w(t) = f_{rE}(t)e_{monopole}(t)w(t) = M_p(t)w(t)$, and $f_{rA}(t)a_{monopole}(t)w(t) = f_{rF}(t)f_{monopole}(t)w(t) = M_p(t)w(t)$, $f_{rA}(t)a_{dipole}(t)w(t) = 2f_{rB}(t)b_{dipole}(t)w(t) = D_p(t)w(t)$, $f_{rA}(t)a_{dipole}(t)w(t) = -2f_{rC}(t)c_{dipole}(t)w(t) = D_p(t)w(t)$, $f_{rA}(t)a_{dipole}(t)w(t) = -f_{rD}(t)d_{dipole}(t)w(t) = D_p(t)w(t)$, $f_{rA}(t)a_{dipole}(t)w(t) = -2f_{rE}(t)e_{dipole}(t)w(t) = D_p(t)w(t)$, and $f_{rA}(t)a_{dipole}(t)w(t) = 2f_{rF}(t)f_{dipole}(t)w(t) = D_p(t)w(t)$, and $f_{rA}(t)a_{quadrupole}(t)w(t) = -2f_{rB}(t)b_{quadrupole}(t)w(t) = Q_p(t)w(t)$, $f_{rA}(t)a_{quadrupole}(t)w(t) = -2f_{rC}(t)c_{quadrupole}(t)w(t) = Q_p(t)w(t)$, $f_{rA}(t)a_{quadrupole}(t)w(t) = f_{rD}(t)d_{quadrupole}(t)w(t) = Q_p(t)w(t)$, $f_{rA}(t)a_{quadrupole}(t)w(t) = -2f_{rE}(t)e_{quadrupole}(t)w(t) = Q_p(t)w(t)$, and $f_{rA}(t)a_{quadrupole}(t)w(t) = -2f_{rF}(t)f_{quadrupole}(t)w(t) = Q_p(t)w(t)$, then the difference between the corrected amplitudes becomes $$\begin{bmatrix} a_{total}^{corrected}(t) + \\ c_{total}^{corrected}(t) + \\ e_{total}^{corrected}(t) - \\ b_{total}^{corrected}(t) - \\ d_{total}^{corrected}(t) - \\ f_{total}^{corrected}(t) \end{bmatrix} = w(t) \begin{bmatrix} \begin{Bmatrix} f_{rA}(t)a_{monopole}(t) + f_{rC}(t)c_{monopole}(t) + \\ f_{rE}(t)e_{monopole}(t) - f_{rB}(t)b_{monopole}(t) - \\ f_{rD}(t)d_{monopole}(t) - f_{rF}(t)f_{monopole}(t) \end{Bmatrix} + \\ w(t) \begin{Bmatrix} f_{rA}(t)a_{dipole}(t) + f_{rC}(t)c_{dipole}(t) + \\ f_{rE}(t)e_{dipole}(t) - f_{rB}(t)b_{dipole}(t) - \\ f_{rD}(t)d_{dipole}(t) - f_{rF}(t)f_{dipole}(t) \end{Bmatrix} + \\ w(t) \begin{Bmatrix} f_{rA}(t)a_{quadrupole}(t) + f_{rC}(t)c_{quadrupole}(t) + \\ f_{rE}(t)e_{quadrupole}(t) - f_{rB}(t)b_{quadrupole}(t) - \\ f_{rD}(t)d_{quadrupole}(t) - f_{rF}(t)f_{quadrupole}(t) \end{Bmatrix} + \\ w(t) \begin{Bmatrix} f_{rA}(t)a_{sextupole}(t) + f_{rC}(t)c_{sextupole}(t) + \\ f_{rE}(t)e_{sextupole}(t) - f_{rB}(t)b_{sextupole}(t) - \\ f_{rD}(t)d_{sextupole}(t) - f_{rF}(t)f_{sextupole}(t) \end{Bmatrix} + \ldots \end{bmatrix}$$

$$= w(t) \begin{bmatrix} \{M_p(t) + M_p(t) + M_p(t) - M_p(t) - M_p(t) - M_p(t)\} + \\ w(t) \begin{Bmatrix} D_p(t) - \frac{1}{2}D_p(t) - \frac{1}{2}D_p(t) + \\ \frac{1}{2}D_p(t) - D_p(t) + \frac{1}{2}D_p(t) \end{Bmatrix} + \\ w(t) \begin{Bmatrix} Q_p(t) - \frac{1}{2}Q_p(t) - \frac{1}{2}Q_p(t) + Q_p(t) - \\ \frac{1}{2}Q_p(t) - \frac{1}{2}Q_p(t) - \frac{1}{2}Q_p(t) \end{Bmatrix} + \\ w(t) \begin{Bmatrix} f_{rA}(t)a_{sextupole}(t) + f_{rC}(t)c_{sextupole}(t) + \\ f_{rE}(t)e_{sextupole}(t) - f_{rB}(t)b_{sextupole}(t) - \\ f_{rD}(t)d_{sextupole}(t) - f_{rF}(t)f_{sextupole}(t) \end{Bmatrix} + \ldots \end{bmatrix}$$

$= w(t)[6f_{rA}(t)a_{sextupole}(t) + \ldots]$ $= w(t)[6S_p(t) + \ldots]$, since $f_{rA}(t)a_{sextuple}(t)w(t) = f_{rC}(t)c_{sextupole}(t)w(t) = f_{rE}(t)e_{sextupole}(t)w(t) = S_p(t)w(t)$ and $f_{rB}(t)b_{sextupole}(t)w(t) = f_{rD}(t)d_{sextupole}(t)w(t) = f_{rF}(t)f_{sextupole}(t)e(t) = -S_p(t)w(t)$. Consequently, using the corrected amplitudes enables greater accuracy and sensitivity in detecting the sextupole component of the wave received at receivers A, B, C, D, E, and F.

Likewise, as shown in FIG. 28, and as described above, the octupole component 2810 (shown in phantom) of a wave received at the receivers A, B, C, D, E, F, G and H may be detected by detecting the positive displacement of the borehole fluid in one direction at receivers A, C, E, and G and the substantially equal but negative displacement in the opposite direction at receivers B, D, F, and H. The radiation pattern of the quadrupole component 2810 of the pressure detected in the borehole 2820 is illustrated in FIG. 28, corresponding to the radiation pattern 11314 of the pressure generated in the borehole by the quadrupole source 11316 illustrated in FIG. 11, for example.

The energy of the sextupole components $a_{sextupole}(t)$, $b_{sextupole}(t)$, $c_{sextupole}(t)$, $d_{sextupole}(t)$, $e_{sextupole}(t)$, $f_{sextupole}(t)$, $g_{sextupole}(t)$, and $h_{sextupole}(t)$ of the wave (generally proportional to the intensity, the square of the amplitude) is typically at least about 10 to about 100 times greater than the energy of the octupole components $a_{octupole}(t)$, $b_{octupole}(t)$, $c_{octupole}(t)$, $d_{octupole}(t)$, $e_{octupole}(t)$, $f_{octupole}(t)$, $g_{octupole}(t)$, and $h_{octupole}(t)$ of the wave. In order to increase the sensitivity to the less energetic octupole components $a_{octupole}(t)$, $b_{octupole}(t)$, $c_{octupole}(t)$, $d_{octupole}(t)$, $e_{octupole}(t)$, $f_{octupole}(t)$, $g_{octupole}(t)$, and $h_{octupole}(t)$ of the wave, the amplitudes $b_{total}(t)$, $d_{total}(t)$, $f_{total}(t)$, and $h_{total}(t)$ of the wave received at receivers B, D, F, and H may be subtracted from the sum of the amplitudes $a_{total}(t)$, $c_{total}(t)$, $e_{total}(t)$, and $g_{total}(t)$ of the wave received at receivers A, C, E, and G, giving $$\begin{bmatrix} a_{total}(t) + c_{total}(t) + \\ e_{total}(t) + g_{total}(t) - \\ b_{total}(t) - d_{total}(t) - \\ f_{total}(t) - h_{total}(t) \end{bmatrix} = \begin{bmatrix} \begin{Bmatrix} a_{monopole}(t) + c_{monopole}(t) + e_{monopole}(t) + \\ g_{monopole}(t) - b_{monopole}(t) - d_{monopole}(t) - \\ f_{monopole}(t) - h_{monopole}(t) \end{Bmatrix} \\ \begin{Bmatrix} a_{dipole}(t) + c_{dipole}(t) + \\ e_{dipole}(t) + g_{dipole}(t) - \\ b_{dipole}(t) - d_{dipole}(t) - f_{dipole}(t) - h_{dipole}(t) \end{Bmatrix} + \\ \begin{Bmatrix} a_{quadrupole}(t) + c_{quadrupole}(t) + \\ e_{quadrupole}(t) + g_{quadrupole}(t) - \\ b_{quadrupole}(t) - d_{quadrupole}(t) - \\ f_{quadrupole}(t) - h_{quadrupole}(t) \end{Bmatrix} + \\ \begin{Bmatrix} a_{sextupole}(t) + c_{sextupole}(t) + e_{sextupole}(t) + \\ g_{sextupole}(t) - b_{sextupole}(t) - d_{sextupole}(t) - \\ f_{sextupole}(t) - h_{sextupole}(t) \end{Bmatrix} + \\ \begin{Bmatrix} a_{octupole}(t) + c_{octupole}(t) + e_{octupole}(t) + \\ g_{octupole}(t) - b_{octupole}(t) - d_{octupole}(t) - \\ f_{octupole}(t) - h_{octupole}(t) \end{Bmatrix} + \ldots \end{bmatrix}.$$

If the uncorrected amplitudes are used, then it is quite likely that the first term $$\begin{Bmatrix} a_{monopole}(t) + c_{monopole}(t) + e_{monopole}(t) + g_{monopole}(t) - \\ b_{monopole}(t) - d_{monopole}(t) - f_{monopole}(t) - h_{monopole}(t) \end{Bmatrix},$$

the second term $$\begin{Bmatrix} a_{dipole}(t) + c_{dipole}(t) + e_{dipole}(t) + g_{dipole}(t) - \\ b_{dipole}(t) - d_{dipole}(t) - f_{dipole}(t) - h_{dipole}(t) \end{Bmatrix},$$

the third term $$\left\{\begin{array}{l}a_{quadrupole}(t)+c_{quadrupole}(t)+e_{quadrupole}(t)+g_{quadrupole}(t)-\\ b_{quadrupole}(t)-d_{quadrupole}(t)-f_{quadrupole}(t)-h_{quadrupole}(t)\end{array}\right\},$$

and the fourth term $$\left\{\begin{array}{l}a_{sextupole}(t)+c_{sextupole}(t)+e_{sextupole}(t)+g_{sextupole}(t)-\\ b_{sextupole}(t)-d_{sextupole}(t)-f_{sextupole}(t)-h_{sextupole}(t)\end{array}\right\}$$

will all be non-zero and may well still be about the same size or even bigger than the term of interest, the octupole term $$\left\{\begin{array}{l}a_{octupole}(t)+c_{octupole}(t)+e_{octupole}(t)+g_{octupole}(t)-\\ b_{octupole}(t)-d_{octupole}(t)-f_{octupole}(t)-h_{octupole}(t)\end{array}\right\}.$$

However, if the corrected amplitudes are used, where $a_{total,windowed}^{corrected}(t)=f_{rA}(t)a_{total}(t)w(t)=f_{rA}(t)\{a_{monopole}(t)+a_{dipole}(t)+a_{quadrupole}(t)+\ldots\}w(t)$, $b_{total,windowed}^{corrected}(t)=f_{rB}(t)b_{total}(t)w(t)=f_{rB}(t)\{b_{monopole}(t)+b_{dipole}(t)+b_{quadrupole}(t)+\ldots\}w(t)$, $c_{total,windowed}^{corrected}(t)=f_{rC}(t)c_{total}(t)w(t)=f_{rC}(t)\{c_{monopole}(t)+c_{dipole}(t)+c_{quadrupole}(t)+\ldots\}w(t)$, $d_{total,windowed}^{corrected}(t)=f_{rD}(t)d_{total}(t)w(t)=f_{rD}(t)\{d_{monopole}(t)+d_{dipole}(t)+d_{quadrupole}(t)+\ldots\}w(t)$, $e_{total,windowed}^{corrected}(t)=f_{rE}(t)e_{total}(t)w(t)=f_{rE}(t)\{e_{monopole}(t)+e_{dipole}(t)+e_{quadrupole}(t)+\ldots\}w(t)$, $f_{total,windowed}^{corrected}(t)=f_{rF}(t)f_{total}(t)w(t)=f_{rF}(t)\{f_{monopole}(t)+f_{dipole}(t)+f_{quadrupole}(t)+\ldots\}w(t)$, $g_{total,windowed}^{corrected}(t)=f_{rG}(t)g_{total}(t)w(t)=f_{rG}(t)\{g_{monopole}(t)+g_{dipole}(t)+g_{quadrupole}(t)+\ldots\}w(t)$, and $h_{total,windowed}^{corrected}(t)=f_{rH}(t)h_{total}(t)w(t)=f_{rH}(t)\{h_{monopole}(t)+h_{dipole}(t)+h_{quadrupole}(t)+\ldots\}w(t)$, with $f_{rA}(t)$, $f_{rB}(t)$, $f_{rC}(t)$, $f_{rD}(t)$, $f_{rE}(t)$, $f_{rF}(t)$, $f_{rG}(t)$, and $f_{rH}(t)$ chosen as described above from the windowed deconvolutions so that $f_{rA}(t)a_{monopole}(t)w(t)=f_{rB}(t)b_{monopole}(t)w(t)=M_P(t)$, $f_{rA}(t)a_{monopole}(t)w(t)=f_{rC}(t)c_{monopole}(t)w(t)=M_P(t)w(t)$, $f_{rA}(t)a_{monopole}(t)w(t)=f_{rD}(t)d_{monopole}(t)w(t)=M_P(t)w(t)$, $f_{rA}(t)a_{monopole}(t)w(t)=f_{rE}(t)e_{monopole}(t)w(t)=M_P(t)w(t)$, $f_{rA}(t)a_{monopole}(t)w(t)=f_{rF}(t)f_{monopole}(t)w(t)=M_P(t)w(t)$, $f_{rA}(t)a_{monopole}(t)w(t)=f_{rG}(t)g_{monopole}(t)w(t)=M_P(t)w(t)$, and $f_{rA}(t)a_{monopole}(t)w(t)=f_{rH}(t)h_{monopole}(t)w(t)=M_P(t)w(t)$, $f_{rA}(t)a_{dipole}(t)w(t)=\sqrt{2}f_{rB}(t)b_{dipole}(t)w(t)D_P(t)w(t)$, $f_{rA}(t)a_{dipole}(t)w(t)=-\sqrt{2}f_{rD}(t)d_{dipole}(t)w(t)D_P(t)w(t)$, $f_{rA}(t)a_{dipole}(t)w(t)=-f_{rE}(t)e_{dipole}(t)w(t)D_P(t)w(t)$, $f_{rA}(t)a_{dipole}(t)w(t)=-\sqrt{2}f_{rF}(t)f_{dipole}(t)w(t)D_P(t)w(t)$, and $f_{rA}(t)a_{dipole}(t)w(t)=\sqrt{2}f_{rH}(t)h_{dipole}(t)w(t)D_P(t)w(t)$, with $c_{dipole}(t)=g_{dipole}(t)=0$, $f_{rA}(t)a_{quadrupole}(t)w(t)=-f_{rC}(t)c_{quadrupole}(t)w(t)=Q_P(t)w(t)$, $f_{rA}(t)a_{quadrupole}(t)w(t)=f_{rE}(t)e_{quadrupole}(t)w(t)=Q_P(t)w(t)$, $f_{rA}(t)a_{quadrupole}(t)w(t)=-f_{rG}(t)g_{quadrupole}(t)w(t)=Q_P(t)w(t)$, with $b_{quadrupole}(t)=d_{quadrupole}(t)=f_{quadrupole}(t)=h_{quadrupole}(t)=0$, and $f_{rA}(t)a_{sextupole}(t)w(t)=-\sqrt{2}f_{rB}(t)b_{sextupole}(t)w(t)=S_P(t)w(t)$, $f_{rA}(t)a_{sextupole}(t)w(t)=\sqrt{2}f_{rD}(t)d_{sextupole}(t)w(t)=S_P(t)w(t)$, $f_{rA}(t)a_{sextupole}(t)w(t)=-f_{rE}(t)e_{sextupole}(t)w(t)=S_P(t)w(t)$, $f_{rA}(t)a_{sextupole}(t)w(t)=\sqrt{2}f_{rF}(t)f_{sextupole}(t)w(t)=S_P(t)w(t)$, and $f_{rA}(t)a_{sextupole}(t)w(t)=-\sqrt{2}f_{rH}(t)h_{sextupole}(t)w(t)=S_P(t)w(t)$, with $c_{sextupole}(t)=g_{sextupole}(t)=0$, then the difference between the corrected amplitudes becomes $$\begin{aligned}&a_{total}^{corrected}(t)+\\&c_{total}^{corrected}(t)+\\&e_{total}^{corrected}(t)+\\&g_{total}^{corrected}(t)-\\&b_{total}^{corrected}(t)-\\&d_{total}^{corrected}(t)-\\&f_{total}^{corrected}(t)-\\&h_{total}^{corrected}(t)\end{aligned} = w(t)\begin{bmatrix}w(t)\left\{\begin{array}{l}f_{rA}(t)a_{monopole}(t)+f_{rC}(t)c_{monopole}(t)+\\ f_{rE}(t)e_{monopole}(t)+f_{rG}(t)g_{monopole}(t)-\\ f_{rB}(t)b_{monopole}(t)-f_{rD}(t)d_{monopole}(t)-\\ f_{rF}(t)f_{monopole}(t)-f_{rH}(t)h_{monopole}(t)\end{array}\right\}+\\ w(t)\left\{\begin{array}{l}f_{rA}(t)a_{dipole}(t)+f_{rC}(t)c_{dipole}(t)+\\ f_{rE}(t)e_{dipole}(t)+f_{rG}(t)g_{dipole}(t)-\\ f_{rB}(t)b_{dipole}(t)-f_{rD}(t)d_{dipole}(t)-\\ f_{rF}(t)f_{dipole}(t)-f_{rH}(t)h_{dipole}(t)\end{array}\right\}+\\ w(t)\left\{\begin{array}{l}f_{rA}(t)a_{quadrupole}(t)+f_{rC}(t)c_{quadrupole}(t)+\\ f_{rE}(t)e_{quadrupole}(t)+f_{rG}(t)g_{quadrupole}(t)-\\ f_{rB}(t)b_{quadrupole}(t)-f_{rD}(t)d_{quadrupole}(t)-\\ f_{rF}(t)f_{quadrupole}(t)-f_{rH}(t)h_{quadrupole}(t)\end{array}\right\}+\\ w(t)\left\{\begin{array}{l}f_{rA}(t)a_{sextupole}(t)+f_{rC}(t)c_{sextupole}(t)+\\ f_{rE}(t)e_{sextupole}(t)+f_{rG}(t)g_{sextupole}(t)-\\ f_{rB}(t)b_{sextupole}(t)-f_{rD}(t)d_{sextupole}(t)-\\ f_{rF}(t)f_{sextupole}(t)-f_{rH}(t)h_{sextupole}(t)\end{array}\right\}+\\ w(t)\left\{\begin{array}{l}f_{rA}(t)a_{octupole}(t)+f_{rC}(t)c_{octupole}(t)+\\ f_{rE}(t)e_{octupole}(t)+f_{rG}(t)g_{octupole}(t)-\\ f_{rB}(t)b_{octupole}(t)-f_{rD}(t)d_{octupole}(t)-\\ f_{rF}(t)f_{octupole}(t)-f_{rH}(t)h_{octupole}(t)\end{array}\right\}+\ldots\end{bmatrix}$$

$$= w(t)\begin{bmatrix}\left\{\begin{array}{l}M_P(t)+M_P(t)+M_P(t)+(t)M_P(t)-\\ M_P(t)-M_P(t)-M_P(t)-M_P(t)\end{array}\right\}\\ w(t)\left\{\begin{array}{l}D_P(t)-D_P(t)-\frac{\sqrt{2}}{2}D_P(t)+\frac{\sqrt{2}}{2}\\ D_P(t)+\frac{\sqrt{2}}{2}D_P(t)-\frac{\sqrt{2}}{2}D_P(t)\end{array}\right\}+\\ w(t)\{Q_P(t)-Q_P(t)+Q_P(t)-Q_P(t)\}\\ w(t)\left\{\begin{array}{l}S_P(t)-S_P(t)+\frac{\sqrt{2}}{2}S_P(t)-\frac{\sqrt{2}}{2}\\ S_P(t)-\frac{\sqrt{2}}{2}S_P(t)+\frac{\sqrt{2}}{2}S_P(t)\end{array}\right\}+\\ w(t)\left\{\begin{array}{l}f_{rA}(t)a_{octupole}(t)+f_{rC}(t)c_{octupole}(t)+\\ f_{rE}(t)e_{octupole}(t)+f_{rG}(t)g_{octupole}(t)-\\ f_{rB}(t)b_{octupole}(t)-f_{rD}(t)d_{octupole}(t)-\\ f_{rF}(t)f_{octupole}(t)-f_{rH}(t)h_{octupole}(t)\end{array}\right\}+\ldots\end{bmatrix}$$

$$= w(t)[8f_{rA}(t)a_{octupole}(t)+\ldots]$$
$$= w(t)[8O_P(t)+\ldots],$$

since $f_{rA}(t)a_{octupole}(t)w(t)=f_{rC}(t)c_{octupole}(t)w(t)=O_P(t)w(t)$, $f_{rE}(t)e_{octupole}(t)w(t)=f_{rG}(t)g_{octupole}(t)w(t)=O_P(t)w(t)$, $f_{rB}(t)b_{octupole}(t)w(t)=f_{rD}(t)d_{octupole}(t)w(t)=O_P(t)w(t)$, and $f_{rF}(t)f_{octupole}(t)w(t)=f_{rH}(t)d_{octupole}(t)w(t)=O_P(t)w(t)$. Consequently, using the corrected amplitudes enables greater accuracy and sensitivity in detecting the octupole component of the wave received at receivers A, B, C, D, E, F, G, and H.

Generally, as described above, the (2p)-tupole component of a wave received at the receivers $A_1, A_2, A_3, A_4, \ldots, A_{2D-3}, A_{2D-2}, A_{2D-1}, A_{2D}$ may be detected by detecting the positive displacement of the borehole fluid in one direction at an appropriate subset (which may be the whole set itself or the empty set) of the receivers $A_1, A_2, A_3, A_4, \ldots, A_{2D-3}, A_{2D-2}, A^{2D-1}, A^{2D}$, and the substantially equal but negative displacement in the opposite direction at another appropriate complementary subset of the receivers $A_1, A_2, A_3, A_4, \ldots, A_{2D-3}, A^{2D-2}, A_{2D-1}, A_{2D}$, where the 2D receivers $A_1, A_2, \ldots, A^{2D}$ with $D \geq p$ are disposed at respective positions $$\frac{(d-1)\pi}{D},$$

where d=1,2,3, . . . ,2D, in the clockwise direction of increasing θ, as shown in FIG. 28. For example, the (2D)-tupole component of a wave received at the receivers $A_1, A_2, A_3, A_4, \ldots, A_{2D-3}, A_{2D-2}, A_{2D-1}, A_{2D}$ may be detected by detecting the positive displacement of the borehole fluid in one direction at receivers $A_1, A_3, \ldots, A^{2D-3}, A_{2D-1}$, and the substantially equal but negative displacement in the opposite direction at receivers $A_2, A_4, \ldots, A^{2D-2}, A^{2D}$.

The energy of the (2D−2)-tupole components $a_{1,2D-2)\text{-}tuple}(t), a_{2,(2D-2)\text{-}tuple}(t), \ldots, a_{2D,(2D-2)\text{-}tuple}(t)$ of the wave (generally proportional to the intensity, the square of the amplitude) is typically at least about 10 to about 100 times greater than the energy of the (2D)-tupole components $a_{1,(2D)\text{-}tuple}(t), a_{2,(2D)\text{-}tuple}(t), \ldots, a_{2D,(2D)\text{-}tuple}(t)$ of the wave. In order to increase the sensitivity to the less energetic (2D)-tupole components $a_{1,(2D)\text{-}tuple}(t), a_{2,(2D)\text{-}tuple}(t), \ldots, a_{2D,(2D)\text{-}tuple}(t)$ of the wave, the amplitudes $a_{2,total}(t), a_{4,total}(t), \ldots, a_{2D-2,total}(t), a_{2D,total}(t)$ of the wave received at receivers $A_2, A_4, \ldots, A^{2D-2}, A^{2D}$ may be subtracted from the sum of the amplitudes $a_{1,total}(t), a_{3,total}(t), \ldots, a_{2D-3,total}(t), a_{2D-1,total}(t)$ of the wave received at receivers $A_1, A_3, \ldots, A_{2D-3}, A_{2D-1}$, giving $$\begin{aligned}&a_{1,total}(t)+\\&a_{3,total}(t)+\ldots+\\&a_{2D-3,total}(t)+\\&a_{2D-1,total}(t)-\\&a_{2,total}(t)-\\&a_{4,total}(t)-\ldots-\\&a_{2D-2,total}(t)-\\&a_{2D,total}(t)\end{aligned} = \begin{bmatrix}\left\{\begin{array}{l}a_{1,monopole}(t)+a_{3,monopole}(t)+\ldots+\\a_{2D-3,monopole}(t)+a_{2D-1,monopole}(t)-\\a_{2,monopole}(t)-a_{4,monopole}(t)-\ldots-\\a_{2D-2,monopole}(t)-a_{2D,monopole}(t)\end{array}\right\}+\\\left\{\begin{array}{l}a_{1,dipole}(t)+a_{3,dipole}(t)+\ldots+\\a_{2D-3,dipole}(t)+a_{2D-1,dipole}(t)-\\a_{2,dipole}(t)-a_{4,dipole}(t)-\ldots-\\a_{2D-2,dipole}(t)-a_{2D,dipole}(t)\end{array}\right\}+\ldots+\\\left\{\begin{array}{l}a_{1,(2D-2)\text{-}tupole}(t)+a_{3,(2D-2)\text{-}tupole}(t)+\ldots+\\a_{2D-3,(2D-2)\text{-}tupole}(t)+a_{2D-1,(2D-2)\text{-}tupole}(t)-\\a_{2,(2D-2)\text{-}tupole}(t)-a_{4,(2D-2)\text{-}tupole}(t)-\ldots-\\a_{2D-2,(2D-2)\text{-}tupole}(t)-a_{2D,(2D-2)\text{-}tupole}(t)\end{array}\right\}+\\\left\{\begin{array}{l}a_{1,(2D)\text{-}tupole}(t)+a_{3,(2D)\text{-}tupole}(t)+\ldots+\\a_{2D-3,(2D)\text{-}tupole}(t)+a_{2D-1,(2D)\text{-}tupole}(t)-\\a_{2,(2D)\text{-}tupole}(t)-a_{4,(2D)\text{-}tupole}(t)-\ldots-\\a_{2D-2,(2D)\text{-}tupole}(t)-a_{2D,(2D)\text{-}tupole}(t)\end{array}\right\}+\ldots\end{bmatrix}.$$

If the uncorrected amplitudes are used, then it is quite likely that the first term $$\left\{\begin{array}{l}a_{1,monopole}(t)+a_{3,monopole}(t)+\ldots+a_{2D-3,monopole}(t)+a_{2D-1,monopole}(t)-\\a_{2,monopole}(t)-a_{4,monopole}(t)-\ldots-a_{2D-2,monopole}(t)-a_{2D,monopole}(t)\end{array}\right\},$$

the second term $$\left\{\begin{array}{l}a_{1,dipole}(t)+a_{3,dipole}(t)+\ldots+a_{2D-3,dipole}(t)+a_{2D-1,dipole}(t)-\\a_{2,dipole}(t)-a_{4,dipole}(t)-\ldots-a_{2D-2,dipole}(t)-a_{2D,dipole}(t)\end{array}\right\},$$

and all the other terms up to and including the (2D−2)-th term $$\left\{\begin{array}{l}a_{1,(2D-2)\text{-}tupole}(t)+a_{3,(2D-2)\text{-}tupole}(t)+\ldots+\\a_{2D-3,(2D-2)\text{-}tupole}(t)+a_{2D-1,(2D-2)\text{-}tupole}(t)-\\a_{2,(2D-2)\text{-}tupole}(t)-a_{4,(2D-2)\text{-}tupole}(t)-\ldots-\\a_{2D-2,(2D-2)\text{-}tupole}(t)-a_{2D,(2D-2)\text{-}tupole}(t)\end{array}\right\}.$$

will be non-zero and may well still be about the same size or even bigger than the term of interest, the (2D)-tupole term $$\left\{\begin{array}{l}a_{1,(2D)\text{-}tupole}(t)+a_{3,(2D)\text{-}tupole}(t)+\ldots+\\a_{2D-3,(2D)\text{-}tupole}(t)+a_{2D-1,(2D)\text{-}tupole}(t)-\\a_{2,(2D)\text{-}tupole}(t)-a_{4,(2D)\text{-}tupole}(t)-\ldots-\\a_{2D-2,(2D)\text{-}tupole}(t)-a_{2D,(2D)\text{-}tupole}(t)\end{array}\right\}.$$

However, if the corrected amplitudes are used, where $a_{1,total,windowed}^{corrected}(t)=f_{rA_1}(t)a_{total}(t)w(t)=f_{rA_1}(t)\{a_{1,monopole}(t)+a_{1,dipole}(t)+a_{1,quadrupole}(t)+\ldots\}w(t)$, $a_{2,windowed}^{corrected}(t)=f_{rA_2}(t)a_{2,total}(t)w(t)$ with $f_{rA_2}(t)a_{2,total}(t)w(t)=f_{rA_2}(t)\{a_{2,monopole}(t)+a_{2,dipole}(t)+a_{2,quadrupole}(t)+\ldots\}w(t), \ldots$, and $a_{2D,total,windowed}^{corrected}(t)=f_{rA_{2D}}(t)a_{2D,total}(t)w(t)$ with $f_{rA_{2D}}(t)a_{2D,total}(t)w(t)=f_{rA_{2D}}(t)\{a_{2D,monopole}(t)+a_{2D,dipole}(t)+a_{2D,quadrupole}(t)+\ldots\}w(t)$, with $f_{rA_1}(t), f_{rA_2}(t), \ldots,$ and $f_{rA_{2D}}(t)$ chosen as described above from the windowed deconvolutions so that $$f_{rA_d}(t)a_{d,(2j)\text{-}tupole}(t)w(t)=\cos\left(\frac{j(d-1)\pi}{D}\right)(2j)_p(t)w(t)$$

for all 1≤d≤2D, and 0≤j≤n≤D, then the difference between the corrected amplitudes becomes $$\sum_{d=1}^{D}a_{2d-1,total}^{corrected}(t)-\sum_{d=1}^{D}a_{2d,total}^{corrected} = w(t)\begin{bmatrix}\left[\sum_{d=1}^{D}f_{rA_{2d-1}}(t)a_{2d-1,monopole}(t)-\sum_{d=1}^{D}f_{rA_{2d}}(t)a_{2d,monopole}(t)\right]+\\\left[\sum_{d=1}^{D}f_{rA_{2d-1}}(t)a_{2d-1,dipole}(t)-\sum_{d=1}^{D}f_{rA_{2d}}(t)a_{2d,dipole}(t)\right]+\ldots+\\\left[\sum_{d=1}^{D}f_{rA_{2d-1}}(t)a_{2d-1,(2D-1)\text{-}tupole}(t)-\sum_{d=1}^{D}f_{rA_{2d}}(t)a_{2d,(2D-1)\text{-}tupole}(t)\right]+\\\left[\sum_{d=1}^{D}f_{rA_{2d-1}}(t)a_{2d-1,(2D)\text{-}tupole}(t)-\sum_{d=1}^{D}f_{rA_{2d}}(t)a_{2d,(2D)\text{-}tupole}(t)\right]+\ldots\end{bmatrix}$$

$$= w(t)[[DM_p(t)-DM_p(t)]+\ldots+[2D(2D)_p(t)+\ldots]$$

$$= w(t)[2D(2D)_p(t)+\ldots],$$

since $$w(t)\left[\sum_{d=1}^{D}f_{rA_{2d-1}}(t)a_{2d-1,(2j)\text{-}tupole}(t)-\sum_{d=1}^{D}f_{rA_{2d}}(t)a_{2d,(2j)\text{-}tupole}(t)\right] =$$

$$w(t)\left[\sum_{k=0}^{D-1}f_{rA_{2k+1}}(t)a_{2k+1,(2j)\text{-}tupole}(t)-\sum_{k=0}^{D-1}f_{rA_{2k+2}}(t)a_{2k+2,(2j)\text{-}tupole}(t)\right]$$

where k=d−1 so that d=k+1, 2d=2k+2, and 2d−1=2k+1, whence $$w(t)\begin{bmatrix}\sum_{d=1}^{D}f_{rA_{2d-1}}(t)\\a_{2d-1,(2j)-tupole}(t)\\\sum_{d=1}^{D}f_{rA_{2d}}(t)\\a_{2d,(2j)-tupole}(t)\end{bmatrix}(t)-\\=w(t)\begin{bmatrix}\sum_{k=0}^{D-1}f_{rA_{2k+1}}(t)a_{2k+1,(2j)-tupole}(t)-\\\sum_{k=0}^{D-1}f_{rA_{2k+2}}(t)a_{2k+2,(2j)-tupole}(t)\end{bmatrix}$$

$$=w(t)\begin{bmatrix}\sum_{k=0}^{D-1}\cos\left(\frac{j(2k)\pi}{D}\right)(2j)_p(t)-\\\sum_{k=0}^{D-1}\cos\left(\frac{j(2k+1)\pi}{D}\right)(2j)_p(t)\end{bmatrix}$$

$$=w(t)(2j)_p(t)\begin{bmatrix}\sum_{k=0}^{D-1}\cos\left(\frac{j(2k)\pi}{D}\right)-\\\sum_{k=0}^{D-1}\cos\left(\frac{j(2k+1)\pi}{D}\right)\end{bmatrix}$$

$$=w(t)(2j)_p(t)\text{Re}\left\{\begin{pmatrix}\sum_{k=0}^{D-1}\exp\left(\frac{ij(2k)\pi}{D}\right)-\\\sum_{k=0}^{D-1}\exp\left(\frac{ij(2k+1)\pi}{D}\right)\end{pmatrix}\right\}$$

$$=w(t)(2j)_p(t)\text{Re}\left\{\begin{pmatrix}\sum_{k=0}^{D-1}\exp\left(\frac{ij(2k)\pi}{D}\right)-\\\exp\left(\frac{ij\pi}{D}\right)\\\sum_{k=0}^{D-1}\exp\left(\frac{ij(2k)\pi}{D}\right)\end{pmatrix}\right\}$$

$$=w(t)(2j)_p(t)\text{Re}\left\{\begin{pmatrix}\left[1-\exp\left(\frac{ij\pi}{D}\right)\right]\\\sum_{k=0}^{D-1}\exp\left(\frac{ij(2k)\pi}{D}\right)\end{pmatrix}\right\}$$

$$=w(t)(2j)_p(t)\text{Re}\left\{\begin{pmatrix}\left[1-\exp\left(\frac{ij\pi}{D}\right)\right]\\\sum_{k=0}^{D-1}\left[\exp\left(\frac{ij2\pi}{D}\right)\right]^k\end{pmatrix}\right\}$$

$$=w(t)(2j)_p(t)\text{Re}\left\{\begin{pmatrix}\left[1-\exp\left(\frac{ij\pi}{D}\right)\right]\\\frac{1-\left[\exp\left(\frac{ij\pi}{D}\right)\right]^D}{1-\left[\exp\left(\frac{ij\pi}{D}\right)\right]}\end{pmatrix}\right\}$$

$$=w(t)(2j)_p(t)\text{Re}\left\{\begin{pmatrix}\left[1-\exp\left(\frac{ij\pi}{D}\right)\right]\\\frac{[1-[\exp(ij\pi)]]}{1-\left[\exp\left(\frac{ij\pi}{D}\right)\right]}\end{pmatrix}\right\}$$

$$=0$$

for j<D where Re{z}=Re{a+ib}=a when z=a+ib, with exp(iθ)=cos(θ)+i sin(θ) where i=$\sqrt{-1}$ so that Re{exp(iθ)}=Re{cos(θ)+i sin(θ)}=cos(θ), and $f_{rA_{2d-1}}(t)a_{2d-1,(2D)-tupole}(t)w(t)=-f_{rA_{2d}}(t)a_{2d,(2D)-tupole}(t)w(t)=(2D)_p(t)w(t)$ for all 1≦d≦D. Consequently, using the corrected amplitudes enables greater accuracy and sensitivity in detecting the (2D)-tupole component of the wave received at receivers $A_1, A_2, A_3, A_4, \ldots, A_{2D-3}, A_{2D-2}, A_{2D-1}, A_{2D}$.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, in the sense of Georg Cantor. Accordingly, the protection sought herein is as set forth in the claims below.

Therefore, the present invention is well adapted to attain the ends and advantages mentioned as well as those that are inherent therein. While numerous changes may be made by those skilled in the art, such changes are encompassed within the spirit of this present invention as defined by the appended claims.

What is claimed is:

1. A method comprising:
    detecting arrival times of a first wave at each of a plurality of receivers, wherein:
        the plurality of receivers is disposed within a well bore in a plane that is substantially perpendicular to an axis of the well bore; and
        the plurality of receivers comprises at least one pair of receivers substantially diametrically opposed about an axis of a well bore tool;
    determining a first place in a well when the arrival times of the first wave are substantially the same at each of the plurality of receivers;
    estimating effective receiver sensitivities and equalization factors for each of the plurality of receivers using a Stoneley wave amplitude received by the plurality of receivers at the first place in the well;
    storing the estimated effective receiver sensitivities and equalization factors for one or more of the plurality of receivers for correcting the amplitudes of at least one subsequent wave received by the plurality of receivers; and
    correcting amplitudes of a second wave received by the plurality of receivers using the estimated effective receiver sensitivities and equalization factors for each of the plurality of receivers.

2. The method of claim 1, further comprising:
    determining at least one subsequent place in the well when the arrival times of the first wave are substantially the same at each of the plurality of receivers.

3. The method of claim 1, wherein estimating effective receiver sensitivities and equalization factors for each of the plurality of receivers using the Stoneley wave amplitude received by the plurality of receivers at the first place in the well further comprises choosing the effective receiver sensitivity and equalization factors $f_{rA_n}$ for the plurality of receivers $A_n$ for n=1,2, . . . ,N so that $f_{rA_n}^2 a_n = f_{rA_m}^2 a_m$ for all n,m=1, 2, . . . ,N, where $a_n$ is the amplitude of the Stoneley wave detected and received at receiver $A_n$ at the first place in the well.

4. The method of claim 3, wherein estimating effective receiver sensitivities and equalization factors for each of the plurality of receivers using the Stoneley wave amplitude received by the plurality of receivers at the first place in the well further comprises choosing the effective receiver sensitivity and equalization factor $f_{rA_k}$ for one of the plurality of receivers $A_k$ where k=1,2, ..., N so that $f_{rA_k}=1$ and estimating the effective receiver sensitivity and equalization factors $f_{rA_n}$ for n=1,2, ..., k−1, k+1, ..., N for the remainder of the plurality of receivers $A_n$ to be $$f_{rA_n} = \frac{a_k}{a_n}$$

for n=1,2, ..., N.

5. The method of claim 3, wherein correcting amplitudes of the second wave received by the plurality of receivers using the estimated effective receiver sensitivities and equalization factors for each of the plurality of receivers further comprises correcting amplitudes of the second wave received by the plurality of receivers $A_n$ for n=1,2, ..., N using the estimated effective receiver sensitivities and equalization factors $f_{rA_n}$ for each of the plurality of receivers $A_n$ for n=1,2, ..., N.

6. The method of claim 5, further comprising:
detecting the (2p)-tupole component of the second wave received by the plurality of receivers $A_1, A_2, ..., A_{2D}$ where N=2D≧2p by detecting a positive displacement of the borehole fluid in a first direction at a first subset of the plurality of receivers $A_1, ..., A_{2D}$ and by detecting a negative displacement of the borehole fluid in a second direction substantially opposite to the first direction at a second subset of the plurality of receivers $A_1, A_2, ..., A_{2D}$ wherein the second subset is substantially complementary to the first subset.

7. The method of claim 6, wherein the receivers $A_1, A_2, ..., A_{2D}$ are disposed at respective positions $$\frac{(d-1)\pi}{D},$$

where d=1,2, ..., 2D, and the estimated effective receiver sensitivities and equalization factors satisfy $$f_{rA_d} a_{d,(2j)-tupole} = \cos\left(\frac{j(d-1)\pi}{D}\right)(2j)_p$$

for all 1≦d≦2D and 0≦j≦p≦D.

8. A method comprising:
detecting arrival times of a first wave comprising at least one of compressional, refracted shear, and Stoneley waves at each of a plurality of receivers, wherein:
the plurality of receivers is disposed within a well bore in a plane that is substantially perpendicular to an axis of the well bore; and
the plurality of receivers comprises at least one pair of receivers substantially diametrically opposed about an axis of a well bore tool;
determining a first place in a well when the arrival times of the waves are substantially the same at each of the plurality of receivers;
estimating effective receiver sensitivities and equalization factors for each of the plurality of receivers using a Stoneley wave amplitude received by the plurality of receivers at the first place in the well;
storing the estimated effective receiver sensitivities and equalization factors for one or more of the plurality of receivers for correcting the amplitudes of at least one subsequent wave received by the plurality of receivers; and correcting amplitudes of a second wave received by the plurality of receivers using the estimated effective receiver sensitivities and equalization factors for each of the plurality of receivers.

9. The method of claim 8, further comprising:
determining at least one subsequent place in the well when the arrival times of the first wave are substantially the same at each of the plurality of receivers.

10. The method of claim 8, wherein estimating effective receiver sensitivities and equalization factors for each of the plurality of receivers using the Stoneley wave amplitude received by the plurality of receivers at the first place in the well further comprises choosing the effective receiver sensitivity and equalization factors $f_{rA_n}$ for the plurality of receivers $A_n$ for n=1,2, ..., N so that $f_{rA_n}a_n = f_{rA_m}a_m$ for all n,m=1, 2, ..., N, where $a_n$ is the amplitude of the Stoneley wave detected and received at receiver $A_n$ at the first place in the well.

11. The method of claim 10, wherein estimating effective receiver sensitivities and equalization factors for each of the plurality of receivers using the Stoneley wave amplitude received by the plurality of receivers at the first place in the well further comprises choosing the effective receiver sensitivity and equalization factor $f_{rA_k}$ for any one of the plurality of receivers $A_k$ where k=1,2, ..., N so that $f_{rA_k}=1$ and estimating the effective receiver sensitivity and equalization factors $f_{rA_n}$ for n=1,2, ..., k−1,k+1, ..., N for the remainder of the plurality of receivers $A_n$ to be $$f_{rA_n} = \frac{a_k}{a_n}$$

for n=1,2, ..., N.

12. The method of claim 10, wherein correcting amplitudes of the second wave received by the plurality of receivers using the estimated effective receiver sensitivities and equalization factors for each of the plurality of receivers further comprises correcting amplitudes of the second wave received by the plurality of receivers $A_n$ for n=1,2, ..., N using the estimated effective receiver sensitivities and equalization factors $f_{rA_n}$ for each of the plurality of receivers $A_n$ for n=1,2, ..., N.

13. The method of claim 12, further comprising:
detecting the (2p)-tupole component of the second wave received by the plurality of receivers $A_1, A_2, ..., A_{2D}$ where N=2D≧2p by detecting a positive displacement of the borehole fluid in a first direction at a first subset of the plurality of receivers $A_1, A_2, ..., A_{2D}$ and by detecting a negative displacement of the borehole fluid in a second direction substantially opposite to the first direction at a second subset of the plurality of receivers $A_1, A_2, ..., A_{2D}$, wherein the second subset is substantially complementary to the first subset.

14. The method of claim 13, wherein the receivers $A_1, A_2, ..., A^{2D}$ are disposed at respective positions $$\frac{(d-1)\pi}{D},$$

where d=1,2, ..., 2D, and the estimated effective receiver sensitivities and equalization factors satisfy $$f_{rA_d} a_{d,(2j)-tupole} = \cos\left(\frac{j(d-1)\pi}{D}\right)(2j)_p$$

for all $1 \leq d \leq 2D$ and $0 \leq j \leq p \leq D$.

15. A method comprising:
   detecting arrival times of a first wave comprising at least one of compressional, refracted shear, and Stoneley waves at each of a plurality of receivers, wherein:
   the plurality of receivers is disposed within a well bore in a plane that is substantially perpendicular to an axis of the well bore; and
   the plurality of receivers comprises at least one pair of receivers substantially diametrically opposed about an axis of a well bore tool;
   determining a first place in a well when the arrival times of the waves are substantially the same at each of the plurality of receivers;
   estimating effective receiver sensitivities and equalization factors for each of the plurality of receivers using windowed deconvolution of a Stoneley wave received by the plurality of receivers at the first place in the well;
   storing the estimated effective receiver sensitivities and equalization factors for one or more of the plurality of receivers for correcting the amplitudes of at least one subsequent wave received by the plurality of receivers; and
   correcting amplitudes of a second wave received by the plurality of receivers using the estimated effective receiver sensitivities and equalization factors for each of the plurality of receivers.

16. The method of claim 15, further comprising:
   determining at least one subsequent place in the well when the arrival times of the first wave are substantially the same at each of the plurality of receivers.

17. The method of claim 15, wherein estimating effective receiver sensitivities and equalization factors for each of the plurality of receivers using windowed deconvolution of the Stoneley wave received by the plurality of receivers at the first place in the well further comprises choosing the effective receiver sensitivity and equalization factors $f_{rA_n}(t)$ for a plurality of receivers $A_n$, where $n=1,2,\ldots,N$, so that $\hat{a}_{n,windowed}^{corrected}(\nu) = \hat{a}_{m,windowed}^{corrected}(\nu)$ for all $n,m=1,2,\ldots,N$, where $\hat{a}_{n,windowed}^{corrected}(\nu) = \hat{f}_{rA_n}(\nu) * \hat{a}_n(\nu) * \hat{w}(\nu)$ is the Fourier Transform of $a_{n,windowed}^{corrected}(t)$, $\hat{f}_{rA_n}(\nu)$ is the Fourier Transform of $f_{rA_n}(t)$, $\hat{a}_n(\nu)$ is the Fourier Transform of the amplitude $a_n(t)$ of the Stoneley wave detected and received at receiver $A_n$ at the first place in the well, and $\hat{w}(\nu)$ is the Fourier Transform of a windowing function $w(t)$ and the Inverse Fourier Transformation of $\hat{a}_{n,windowed}^{corrected}(\nu) = \hat{f}_{rA_n}(\nu) * \hat{a}_n(v\$\$ )*\hat{w}(\nu)$ gives the windowed deconvolution $a_{n,windowed}^{corrected}(t) = f_{rA_n}(t) a_n(t) w(t)$ for $n=1,2,\ldots,N$, wherein the effective receiver sensitivity and equalization factors $f_{rA_n}(t)$ are chosen so that $a_{n,windowed}^{corrected}(t) = f_{rA_n}(t) a_n(t) w(t) = a_{m,windowed}^{corrected}(t) = f_{rA_m}(t) a_m(t) w(t)$ for all $n,m=1,2,\ldots,N$.

18. The method of claim 17, wherein estimating effective receiver sensitivities and equalization factors for each of the plurality of receivers using windowed deconvolution of the Stoneley wave received by the plurality of receivers at the first place in the well further comprises choosing the effective receiver sensitivity and equalization factor $f_{rA_k}(t)$ for any one of the plurality of receivers $A_k$ for $k=1,2,\ldots,N$ so that $f_{rA_k}(t) = 1$ and estimating the effective receiver sensitivity and equalization factors $f_{rA_n}(t)$ for $n=1,2,\ldots,k-1,k+1,\ldots,N$ for the remainder of the plurality of receivers $A_n$ to be $$f_{rA_n}(t) = \frac{a_k(t)}{a_n(t)}$$

for $n=1,2,\ldots,N$.

19. The method of claim 17, wherein correcting amplitudes of the second wave received by the plurality of receivers using the estimated effective receiver sensitivities and equalization factors for each of the plurality of receivers further comprises correcting amplitudes of the second wave received by the plurality of receivers $A_n$ for $n=1,2,\ldots,N$ using the estimated effective receiver sensitivities and equalization factors $f_{rA_n}(t)$ for each of the plurality of receivers $A_n$, for $n=1,2,\ldots,N$.

20. The method of claim 19, further comprising:
   detecting the (2p)-tupole component of the second wave received by the plurality of receivers $A_1, A_2, \ldots, A^{2D}$ where $N=2D \geq 2p$ by detecting a positive displacement of the borehole fluid in a first direction at a first subset of the plurality of receivers $A_1, A_2, \ldots, A_{2D}$ and by detecting a negative displacement of the borehole fluid in a second direction substantially opposite to the first direction at a second subset of the plurality of receivers $A_1, A_2, \ldots, A_{2D}$, wherein the second subset is substantially complementary to the first subset.

21. The method of claim 20, wherein the receivers $A_1, A_2, \ldots, A^{2D}$ are disposed at respective positions $$\frac{(d-1)\pi}{D},$$

where $d=1,2,\ldots,2D$, and the estimated effective receiver sensitivities and equalization factors satisfy $$f_{rA_d}(t) a_{d,(2j)-tupole}(t) w(t) = \cos\left(\frac{j(d-1)\pi}{D}\right)(2j)_p(t) w(t)$$

for all $1 \leq d \leq 2D$ and $0 \leq j \leq p \leq D$.

* * * * *